US012750594B2

(12) United States Patent
Fujikawa et al.

(10) Patent No.: US 12,750,594 B2
(45) Date of Patent: Sep. 29, 2026

(54) IMAGING SYSTEM, CONTROL OPERATION METHOD OF IMAGING SYSTEM, AND PROGRAM

(71) Applicant: FUJIFILM Corporation, Tokyo (JP)

(72) Inventors: Tetsuya Fujikawa, Saitama (JP); Masahiko Sugimoto, Saitama (JP); Junichi Tanaka, Saitama (JP)

(73) Assignee: FUJIFILM Corporation, Tokyo (JP)

(*) Notice: Subject to any disclaimer, the term of this patent is extended or adjusted under 35 U.S.C. 154(b) by 17 days.

(21) Appl. No.: 18/679,413

(22) Filed: May 30, 2024

(65) Prior Publication Data

US 2024/0323547 A1 Sep. 26, 2024

Related U.S. Application Data

(63) Continuation of application No. 18/153,360, filed on Jan. 12, 2023, now Pat. No. 12,052,512, which is a continuation of application No. PCT/JP2021/023650, filed on Jun. 22, 2021.

(30) Foreign Application Priority Data

Jul. 30, 2020 (JP) ................................ 2020-129562

(51) Int. Cl.
*H04N 23/80* (2023.01)
*G03B 15/00* (2021.01)
*H04N 23/90* (2023.01)

(52) U.S. Cl.
CPC ............. *H04N 23/80* (2023.01); *G03B 15/00* (2013.01); *H04N 23/90* (2023.01)

(58) Field of Classification Search
CPC ........ H04N 23/80; H04N 23/90; H04N 23/69; H04N 23/698; H04N 23/673; H04N 23/695; G03B 15/00; G03B 13/36; G03B 35/08
See application file for complete search history.

(56) References Cited

U.S. PATENT DOCUMENTS 5,005,083 A * 4/1991 Grage .................... H04N 23/20 348/588
6,445,814 B2 * 9/2002 Iijima .................. H04N 13/128 348/51

(Continued)

FOREIGN PATENT DOCUMENTS

JP 2000032319 1/2000
JP 2004213355 7/2004

(Continued)

OTHER PUBLICATIONS

"International Search Report (Form PCT/ISA/210) of PCT/JP2021/023650," mailed on Sep. 21, 2021, with English translation thereof, pp. 1-5.

(Continued)

*Primary Examiner* — Hung H Lam
(74) *Attorney, Agent, or Firm* — JCIPRNET

(57) ABSTRACT

An imaging system includes a processor, a first imaging apparatus including a first optical system, and a second imaging apparatus including a second optical system. A focal length of the first optical system is longer than a focal length of the second optical system. The processor performs registration between a first captured image obtained by imaging with the first imaging apparatus and a second captured image obtained by imaging with the second imaging apparatus, acquires information that is related to a registration result, and output the first captured image, the second captured image, and the information to a display.

23 Claims, 29 Drawing Sheets

(56) References Cited

U.S. PATENT DOCUMENTS

| | | | | |
|---|---|---|---|---|
| 10,306,186 | B2 | 5/2019 | Chuang et al. | |
| 2002/0152557 | A1* | 10/2002 | Elberbaum | H04N 23/54 348/E7.086 |
| 2005/0159916 | A1 | 7/2005 | Anabuki | |
| 2007/0058961 | A1 | 3/2007 | Kobayashi et al. | |
| 2008/0030592 | A1* | 2/2008 | Border | H04N 23/45 348/E5.042 |
| 2013/0038700 | A1* | 2/2013 | Horita | G02B 7/36 348/E13.005 |
| 2014/0002688 | A1* | 1/2014 | Inoue | H04N 23/959 348/222.1 |
| 2017/0289461 | A1* | 10/2017 | Ono | H04N 23/76 |
| 2021/0084346 | A1 | 3/2021 | Tsukagoshi | |
| 2022/0006957 | A1 | 1/2022 | Ashitani | |
| 2023/0388476 | A1 | 11/2023 | Ito | |

FOREIGN PATENT DOCUMENTS

| | | |
|---|---|---|
| JP | 2005099265 | 4/2005 |
| JP | 2007074696 | 3/2007 |
| JP | 2007081473 | 3/2007 |
| JP | 2008283258 | 11/2008 |
| JP | 2011250022 | 12/2011 |
| JP | 2012168299 | 9/2012 |
| JP | 2013201603 | 10/2013 |
| JP | 5610867 | 10/2014 |
| JP | 2016134817 | 7/2016 |
| JP | 2017026940 | 2/2017 |
| WO | 2017009621 | 1/2017 |

OTHER PUBLICATIONS

"Written Opinion of the International Searching Authority (Form PCT/ISA/237) of PCT/JP2021/023650," mailed on Sep. 21, 2021, with English translation thereof, pp. 1-6.

"Notice of Allowance of U.S. Appl. No. 18/153,360", issued on Apr. 8, 2024, pp. 1-13.

"Office Action of Japan Counterpart Application", issued on Aug. 6, 2024, with English translation thereof, pp. 1-5.

"Office Action of China Counterpart Application", issued on Jun. 9, 2025, with English translation thereof, pp. 1-14.

* cited by examiner

IMAGING SYSTEM, CONTROL OPERATION METHOD OF IMAGING SYSTEM, AND PROGRAM

CROSS-REFERENCE TO RELATED APPLICATIONS

This application is a continuation application of and claims the priority benefit of a prior application Ser. No. 18/153,360 filed on Jan. 12, 2023, now allowed. The prior application Ser. No. 18/153,360 is a continuation application of International Application No. PCT/JP2021/023650, filed Jun. 22, 2021, the disclosure of which is incorporated herein by reference in its entirety. Further, this application claims priority under 35 USC 119 from Japanese Patent Application No. 2020-129562 filed Jul. 30, 2020, the disclosure of which is incorporated by reference herein.

BACKGROUND

1. Technical Field

The technology of the present disclosure relates to an imaging system, an operation method of an imaging system, and a program.

2. Related Art

JP5610867B discloses an imaging apparatus comprising a first imaging optical system, and a second imaging optical system having an angle of view different from that of the first imaging optical system, in which each of the first imaging optical system and the second imaging optical system includes a focus lens for focus adjustment. The imaging apparatus disclosed in JP5610867B comprises a subject distance calculation unit that calculates a distance to a main subject specified as an imaging target by a focusing operation of the focus lenses of the first imaging optical system and the second imaging optical system, and a control unit that drives the focus lenses to control the focus adjustment based on the distance to the main subject calculated by the subject distance calculation unit.

In the imaging apparatus disclosed in JP5610867B, in a case in which the main subject is present within the angle of view of the first imaging optical system, the control unit performs control of driving the focus lenses of the first imaging optical system and the second imaging optical system to perform focusing on the main subject based on the distance to the main subject calculated by the subject distance calculation unit by the focusing operation of the first imaging optical system. In addition, in a case in which the main subject is present outside the angle of view of the first imaging optical system and in a determination region including a range corresponding to the angle of view of the first imaging optical system within the angle of view of the second imaging optical system, the control unit performs the control of driving the focus lenses of the first imaging optical system and the second imaging optical system to perform focusing on the main subject based on the distance to the main subject calculated by the subject distance calculation unit by the focusing operation of the second imaging optical system. Further, in a case in which the main subject is present outside the angle of view of the first imaging optical system and outside the determination region, the control unit performs control of notification of that effect.

JP2007-081473A discloses an imaging apparatus including a plurality of optical systems comprising a first optical system that has a relatively wide angle of view, a second optical system that is disposed to be spaced from the first optical system and has a relatively narrow angle of view, and a display unit that displays an image obtained by the first optical system. The imaging apparatus including the plurality of optical systems disclosed in JP2007-081473A includes a first operation unit that inputs a desired angle of view, a display control unit that cuts out an imaging region calculated in consideration of a parallax from the desired angle of view input from the first operation unit and a distance between optical axes of the first optical system and the second optical system from the image displayed on the display unit and displays the cut out imaging region, a second operation unit that inputs an imaging instruction, and a storage unit that stores the image obtained by the second optical system corresponding to the imaging region as a captured image in response to the imaging instruction input from the second operation unit.

SUMMARY

According to one embodiment of the present invention provides an imaging system, an operation method of an imaging system, and a program capable of obtaining information related to an angle of view required in a case in which first and second imaging apparatuses having different focal lengths of optical systems are used in cooperation with each other.

A first aspect according to the technology of the present disclosure relates to an imaging system comprising a processor, a first imaging apparatus including a first optical system, and a second imaging apparatus including a second optical system, in which a focal length of the first optical system is longer than a focal length of the second optical system, and the processor performs registration between a first captured image obtained by imaging with the first imaging apparatus and a second captured image obtained by imaging with the second imaging apparatus, in at least two locations including an end part of an angle of view used for imaging with the imaging system, and acquires angle-of-view related information that is related to the angle of view based on a registration result.

A second aspect according to the technology of the present disclosure relates to the imaging system according to the first aspect, in which the processor acquires the angle-of-view related information based on an end part registration result obtained by performing registration between a first end part of an angle of view of the first imaging apparatus or a center of the angle of view of the first imaging apparatus and a second end part on an end part side of the angle of view of the first imaging apparatus among both end parts of an angle of view of the second imaging apparatus.

A third aspect according to the technology of the present disclosure relates to the imaging system according to the second aspect, in which the processor acquires the angle-of-view related information based on an angle-of-view center registration result obtained by performing registration between the center of the angle of view of the first imaging apparatus and a center of the angle of view of the second imaging apparatus.

A fourth aspect according to the technology of the present disclosure relates to the imaging system according to the third aspect, in which the processor derives the angle-of-view center registration result and the end part registration result based on position specification information for specifying a positional relationship between the first imaging apparatus and the second imaging apparatus.

A fifth aspect according to the technology of the present disclosure relates to the imaging system according to the fourth aspect, in which the position specification information is information including a deviation amount between the first imaging apparatus and the second imaging apparatus.

A sixth aspect according to the technology of the present disclosure relates to the imaging system according to the fourth or fifth aspect, in which the position specification information includes information related to a height difference between the first imaging apparatus and the second imaging apparatus.

A seventh aspect according to the technology of the present disclosure relates to the imaging system according to any one of the fourth to sixth aspects, in which the processor performs an angle-of-view center registration process of performing the registration between the center of the angle of view of the first imaging apparatus and the center of the angle of view of the second imaging apparatus by using the position specification information in a case in which a first subject distance is less than a first threshold value, and performs an end part registration process of performing the registration between the first end part or the center of the angle of view of the first imaging apparatus and the second end part by using the position specification information in a case in which a second subject distance is less than a second threshold value.

An eighth aspect according to the technology of the present disclosure relates to the imaging system according to the seventh aspect, in which the processor derives at least one of the first subject distance or the second subject distance.

A ninth aspect according to the technology of the present disclosure relates to the imaging system according to the eighth aspect, in which the first imaging apparatus has an auto focus function, and is installed on a revolution table to allow revolution, and the processor derives, in a case in which at least one subject distance of the first subject distance or the second subject distance is derived, the subject distance by using the auto focus function, and matches the center of the angle of view of the first imaging apparatus with a subject having high contrast in a vicinity of the center of the angle of view of the first imaging apparatus and then derives the subject distance by using the auto focus function by controlling the revolution table based on the first captured image in a case in which the derivation of the subject distance using the auto focus function has failed.

A tenth aspect according to the technology of the present disclosure relates to the imaging system according to the eighth or ninth aspect, in which the processor causes the first imaging apparatus to perform focusing in a state in which the focal length of the first optical system is included in a longest side zone among a plurality of zones in which the focal length of the first optical system is divided and defined in a stepwise manner, and derives at least one of the first subject distance or the second subject distance based on a result of the focusing.

An eleventh aspect according to the technology of the present disclosure relates to the imaging system according to the tenth aspect, in which the processor causes the first imaging apparatus to perform focusing in a state in which the focal length of the first optical system is longest, and derives at least one of the first subject distance or the second subject distance based on a result of the focusing.

A twelfth aspect according to the technology of the present disclosure relates to the imaging system according to any one of the seventh to eleventh aspects, in which the processor performs the angle-of-view center registration process and then performs the end part registration process.

A thirteenth aspect according to the technology of the present disclosure relates to the imaging system according to any one of the seventh to twelfth aspects, in which the processor performs at least one of the angle-of-view center registration process or the end part registration process by using an image analysis based on the first captured image and the second captured image.

A fourteenth aspect according to the technology of the present disclosure relates to the imaging system according to the thirteenth aspect, in which, in the end part registration process, the processor performs the registration between the first end part or the center of the angle of view of the first imaging apparatus and the second end part based on a scale ratio between the first captured image and the second captured image used in the image analysis in the angle-of-view center registration process.

A fifteenth aspect according to the technology of the present disclosure relates to the imaging system according to any one of the seventh to fourteenth aspects, in which the processor further performs an opposite side end part registration process of performing registration between a first opposite side end part positioned on an opposite side to the first end part among both end parts of the angle of view of the first imaging apparatus or the center of the angle of view of the first imaging apparatus and a second opposite side end part positioned on an opposite side to the second end part among both end parts of the angle of view of the second imaging apparatus, and acquires the angle of view of the second imaging apparatus as the angle-of-view related information based on at least one of a first result obtained by matching a position of the first end part or the center of the angle of view of the first imaging apparatus with a position of the second end part in the end part registration process or a second result obtained by matching a position of the first opposite side end part or the center of the angle of view of the first imaging apparatus with a position of the second opposite side end part in the opposite side end part registration process.

A sixteenth aspect according to the technology of the present disclosure relates to the imaging system according to the fifteenth aspect, in which, under a condition that a third subject distance is equal to or more than a third threshold value, in a case in which the position of the first opposite side end part or the center of the angle of view of the first imaging apparatus is matched with the position of the second opposite side end part, the processor acquires the angle of view of the second imaging apparatus as the angle-of-view related information based on the second result.

A seventeenth aspect according to the technology of the present disclosure relates to the imaging system according to any one of the first to sixteenth aspects, in which optical information related to the first optical system is known, and optical information related to the second optical system is unknown.

An eighteenth aspect according to the technology of the present disclosure relates to the imaging system according to any one of the first to seventeenth aspects, in which the focal length of the first optical system is at least twice the focal length of the second optical system.

A nineteenth aspect according to the technology of the present disclosure relates to an imaging system comprising a processor, and a first imaging apparatus that is used together with a second imaging apparatus including a second optical system and includes a first optical system, in which a focal length of the first optical system is longer than a focal length of the second optical system, and the processor performs registration between a first captured image obtained by imaging with the first imaging apparatus and a second captured image obtained by imaging with the second imaging apparatus, in at least two locations including an end part of an angle of view used for imaging with the imaging system, and acquires angle-of-view related information that is related to the angle of view based on a registration result.

A twentieth aspect according to the technology of the present disclosure relates to an operation method of an imaging system including a processor, a first imaging apparatus including a first optical system, and a second imaging apparatus including a second optical system, in which a focal length of the first optical system is longer than a focal length of the second optical system, the method comprising performing registration between a first captured image obtained by imaging with the first imaging apparatus and a second captured image obtained by imaging with the second imaging apparatus, in at least two locations including an end part of an angle of view used for imaging with the imaging system, and acquiring angle-of-view related information that is related to the angle of view based on a registration result.

A twenty-first aspect according to the technology of the present disclosure relates to an program causing a computer that is applied to an imaging system including a processor, a first imaging apparatus including a first optical system, and a second imaging apparatus including a second optical system, in which a focal length of the first optical system is longer than a focal length of the second optical system, to execute a process comprising performing registration between a first captured image obtained by imaging with the first imaging apparatus and a second captured image obtained by imaging with the second imaging apparatus, in at least two locations including an end part of an angle of view used for imaging with the imaging system, and acquiring angle-of-view related information that is related to the angle of view based on a registration result.

BRIEF DESCRIPTION OF THE DRAWINGS

Exemplary embodiments of the technology of the disclosure will be described in detail based on the following figures, wherein.

DETAILED DESCRIPTION

Figure 1:
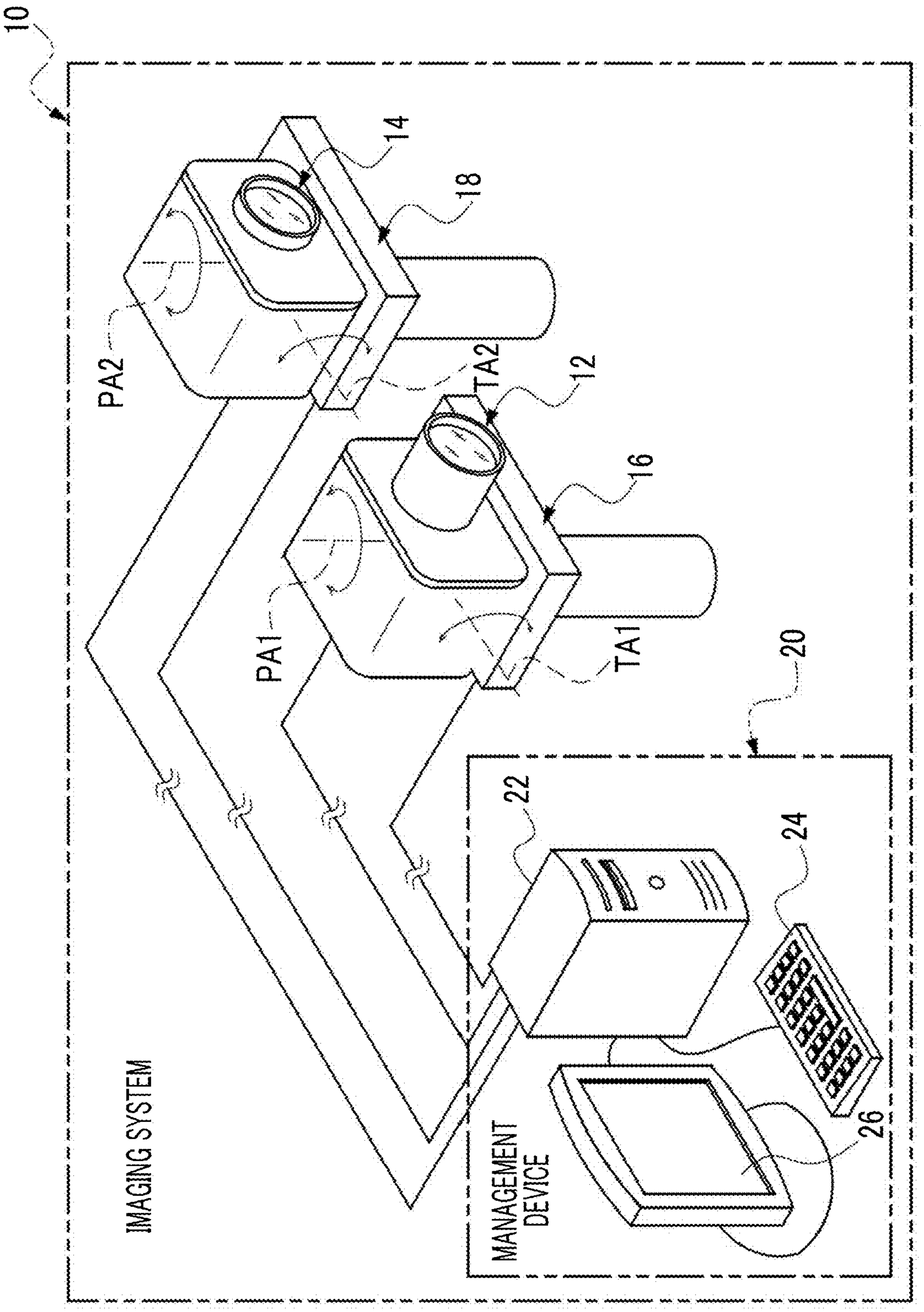
FIG. 1 is a schematic perspective view showing an example of an external configuration of an imaging system.

In the following, an example of an embodiment of an imaging system, an operation method of an imaging system, and a program according to the technology of the present disclosure will be described with reference to the accompanying drawings.

First, the terms used in the following description will be described.

CPU refers to an abbreviation of "Central Processing Unit". RAM refers to an abbreviation of "Random Access Memory". DRAM refers to an abbreviation of "Dynamic Random Access Memory". SRAM refers to an abbreviation of "Static Random Access Memory". NVM refers to an abbreviation of "Non-Volatile Memory". SSD refers to an abbreviation of "Solid State Drive". HDD refers to an abbreviation of "Hard Disk Drive". EEPROM refers to an abbreviation of "Electrically Erasable and Programmable Read Only Memory". USB refers to an abbreviation of "Universal Serial Bus". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-chip". CMOS refers to an abbreviation of "Complementary Metal Oxide Semiconductor". CCD refers to an abbreviation of "Charge-Coupled Device". EL refers to an abbreviation of "Electro-Luminescence". I/F refers to an abbreviation of "Interface". fps refers to an abbreviation of "frames per second". TOF refers to an abbreviation of "Time-of-Flight". AF refers to an abbreviation of "Auto Focus". In the following, for convenience of description, a CPU is described as an example of a "processor" according to the technology of the present disclosure. However, the "processor" according to the technology of the present disclosure may be a combination of a plurality of processing devices, such as the CPU and a GPU. In a case in which the combination of the CPU and the GPU is applied as an example of the "processor" according to the technology of the present disclosure, the GPU is operated under the control of the CPU and is responsible for executing image processing.

In addition, in the description of the present specification, "orthogonal" refers to the orthogonality in the sense of including an error generally allowed in the technical field to which the technology of the present disclosure belongs, which is an error allowed in a range that does not deviate from the technology of the present disclosure, in addition to the exact orthogonality. In addition, in the description of the present specification, "vertical" refers to the verticality in the sense of including an error generally allowed in the technical field to which the technology of the present disclosure belongs, which is an error allowed in a range that does not deviate from the technology of the present disclosure, in addition to the exact verticality. In addition, in the description of the present specification, "match" refers to the match in the sense of including an error generally allowed in the technical field to which the technology of the present disclosure belongs, which is an error allowed in a range that does not deviate from the technology of the present disclosure, in addition to the exact match. In addition, in the following, a numerical range represented by using "to" means a range including numerical values denoted before and after "to" as a lower limit value and an upper limit value.

As shown in FIG. 1 as an example, an imaging system 10 comprises a telephoto camera 12, a wide angle camera 14, a biaxial revolution table 16, a biaxial revolution table 18, and a management device 20. Here, the telephoto camera 12 is an example of a "first imaging apparatus" according to the technology of the present disclosure, the wide angle camera 14 is an example of a "second imaging apparatus" according to the technology of the present disclosure, and the biaxial revolution table 16 is an example of a "revolution table" according to the technology of the present disclosure.

The management device 20 manages the telephoto camera 12, the wide angle camera 14, the biaxial revolution table 16, and the biaxial revolution table 18. In the following, for convenience of description, in a case in which the distinction is not required, the telephoto camera 12, the wide angle camera 14, the biaxial revolution table 16, and the biaxial revolution table 18 are also referred to as a "management target device" without a reference numeral.

The management device 20 comprises a management device body 22, a reception device 24, and a display 26. The management device body 22 includes a computer 104 (see FIG. 3) and controls the entire imaging system 10. The reception device 24 and the display 26 are connected to the management device body 22. The reception device 24 receives various instructions from a user of the imaging system 10. Examples of the reception device 24 include a keyboard, a mouse, and/or a touch panel. Various instructions received by the reception device 24 are grasped by the management device body 22. The display 26 displays various information (for example, an image and a text) under the control of the management device body 22. Examples of the display 26 include a liquid crystal display or an EL display.

The management target device is communicably connected to the management device body 22 and is operated under the control of the management device body 22. A connection method between the management target device and the management device body 22 may be a wired connection method or may be a wireless connection method.

The telephoto camera 12 is also referred to as a long-focus camera, and is a digital camera having a focal length longer than that of the wide angle camera 14. The telephoto camera 12 is installed on the biaxial revolution table 16 to allow revolution. The management device 20 operates the biaxial revolution table 16 to pan or tilt the telephoto camera 12. The biaxial revolution table 16 has a pan axis PA1 and a tilt axis TA1, realizes the pan of the telephoto camera 12 by revolving the telephoto camera 12 around the pan axis PA1, and realizes the tilt of the telephoto camera 12 by revolving the telephoto camera 12 around the tilt axis TA1 under the control of the management device 20.

The wide angle camera 14 is a digital camera capable of imaging an imaging target region (see FIG. 7) having a wider angle of view than the telephoto camera 12. The wide angle camera 14 is installed on the biaxial revolution table 18 to allow revolution. The management device 20 operates the biaxial revolution table 18 to pan or tilt the wide angle camera 14. That is, the biaxial revolution table 18 has a pan axis PA2 and a tilt axis TA2, realizes the pan of the wide angle camera 14 by revolving the wide angle camera 14 around the pan axis PA2, and realizes the tilt of the wide angle camera 14 by revolving the wide angle camera 14 around the tilt axis TA2 under the control of the management device 20.

The management device body 22 acquires telephoto camera image data which is image data obtained by imaging with the telephoto camera 12, and acquires wide angle camera image data which is image data obtained by imaging with the wide angle camera 14.

Figure 2:
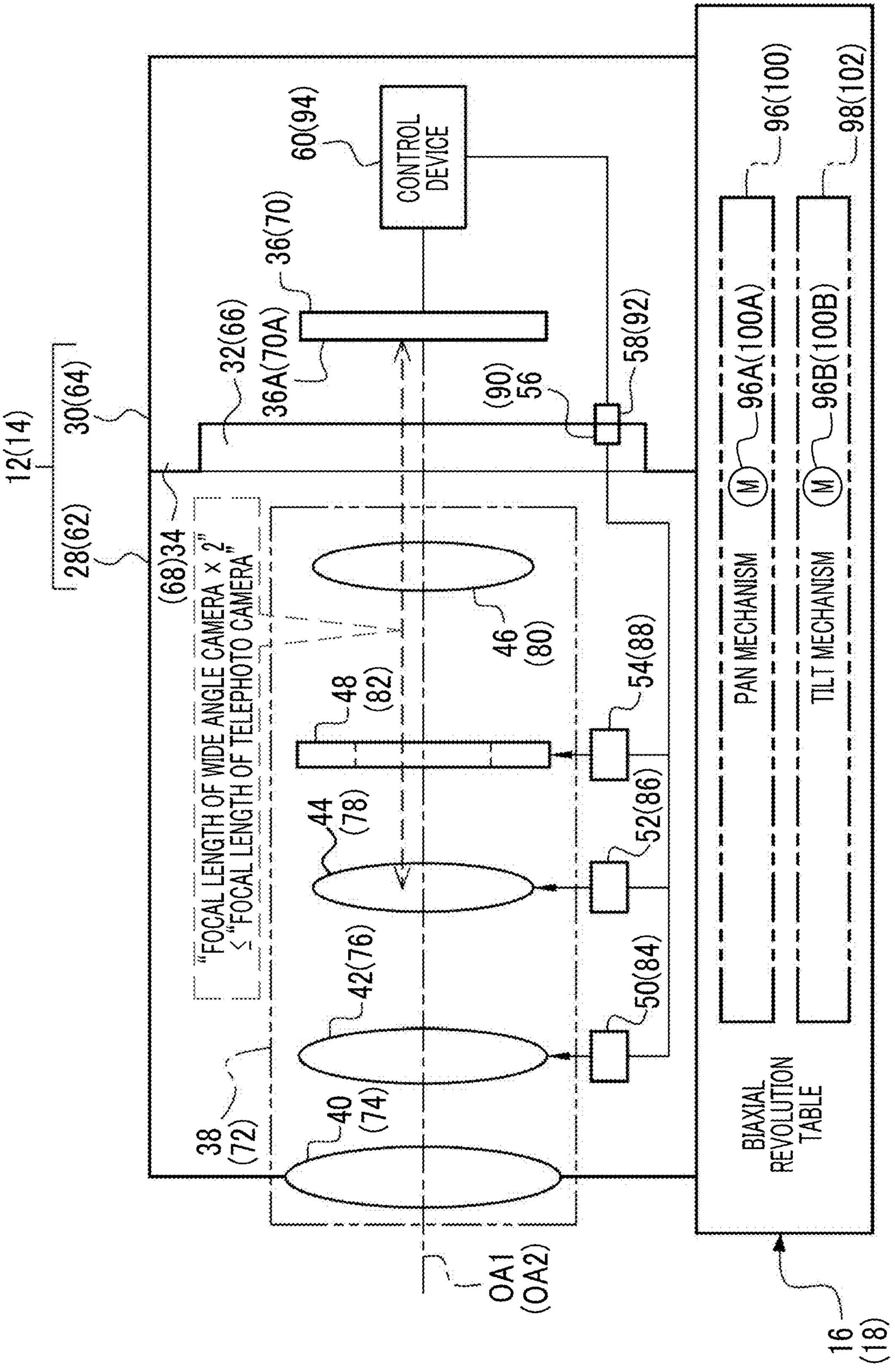
FIG. 2 is a conceptual diagram showing an example of a configuration of a telephoto camera, a wide angle camera, and a biaxial revolution table provided in an imaging system.

As shown in FIG. 2 as an example, the telephoto camera 12 comprises a lens barrel 28 and a telephoto camera body 30. The lens barrel 28 is provided with a lens barrel side mount 32, and the telephoto camera body 30 is provided with a body side mount 34. The lens barrel 28 is attached to the telephoto camera body 30 by the lens barrel side mount 32 and the body side mount 34. An imaging optical system 38 is built in the lens barrel 28, and an image sensor 36 is built in the telephoto camera body 30.

The imaging optical system 38 is an example of a "first optical system" according to the technology of the present disclosure. The imaging optical system 38 images subject light indicating a subject on the image sensor 36. The imaging optical system 38 includes a plurality of types of lenses. Specifically, the imaging optical system 38 includes an objective lens 40, a focus lens 42, a zoom lens 44, and a master lens 46. Although the example shown in FIG. 2 is simplified, each of the objective lens 40, the focus lens 42, the zoom lens 44, and the master lens 46 is actually a lens group in which a plurality of lenses are combined.

The objective lens 40, the focus lens 42, the zoom lens 44, and the master lens 46 are disposed in an order of the objective lens 40, the focus lens 42, the zoom lens 44, and the master lens 46 from an object side (subject side) to an image side (image sensor 36 side). The imaging optical system 38 also includes a stop 48. The stop 48 is disposed between the zoom lens 44 and the master lens 46.

The lens barrel 28 is provided with a focus lens drive mechanism 50, a zoom lens drive mechanism 52, and a stop drive mechanism 54. The focus lens drive mechanism 50 includes a focus cam ring (not shown) having a cam groove formed on an outer periphery thereof, a focus motor (not shown), and the like. The focus lens drive mechanism 50 holds the focus lens 42. The focus cam ring is rotated around an optical axis OA1 of the imaging optical system 38 by receiving power from the focus motor. The focus lens 42 is moved along the optical axis OA1 by receiving a propulsive force in an optical axis OA1 direction caused by the rotation of the focus cam ring around the optical axis OA1.

The zoom lens drive mechanism 52 includes a zoom cam ring (not shown) having a cam groove formed on an outer periphery thereof, a zoom motor (not shown), and the like. The zoom lens drive mechanism 52 holds the zoom lens 44. The zoom cam ring is rotated around the optical axis OA1 by receiving power from the zoom motor. The zoom lens 44 is moved along the optical axis OA1 by receiving a propulsive force in the optical axis OA1 direction caused by the rotation of the zoom cam ring around the optical axis OA1.

The stop drive mechanism 54 includes a stop motor (not shown) and the like. The stop 48 includes a plurality of blades that can be opened and closed. The plurality of blades are opened and closed by receiving power from the stop motor.

The lens barrel side mount 32 is provided with a lens barrel side contact 56. Each of the focus lens drive mechanism 50, the zoom lens drive mechanism 52, and the stop drive mechanism 54 incorporates electric components, such as the stepping motor described above. Each of the electric components of the focus lens drive mechanism 50, the zoom lens drive mechanism 52, and the stop drive mechanism 54 is connected to the lens barrel side contact 56.

The body side mount 34 is provided with a body side contact 58. In the body side mount 34, the body side contact 58 is positioned at a location corresponding to a location of the lens barrel side contact 56 in the lens barrel side mount 32.

A control device 60 is built in the telephoto camera body 30, and the control device 60 is connected to the body side contact 58. In a case in which the lens barrel 28 is attached to the telephoto camera body 30 via the lens barrel side mount 32 and the body side mount 34, the lens barrel side contact 56 and the body side contact 58 come into contact with each other. As a result, each of the electric components of the focus lens drive mechanism 50, the zoom lens drive mechanism 52, and the stop drive mechanism 54 is electrically connected to the control device 60.

The control device 60 controls each of the electric components of the focus lens drive mechanism 50, the zoom lens drive mechanism 52, and the stop drive mechanism 54.

The control device 60 surveils a drive amount of the focus motor and a drive amount of the zoom motor. The control device 60 derives a position of the focus lens 42 on the optical axis OA1 from the drive amount of the focus motor, and derives a position of the zoom lens 44 on the optical axis OA1 from the drive amount of the zoom motor.

In the telephoto camera 12, an in-focus position is adjusted by the focus lens 42. Therefore, the focus lens 42 is moved along the optical axis OA1 direction on a light-receiving surface 36A of the image sensor 36, so that the subject light is imaged at the in-focus position corresponding to a distance to the subject. Here, the "in-focus position" refers to a position of the focus lens 42 on the optical axis OA1 in an in-focus state. The in-focus position is derived from the drive amount of the focus motor by the control device 60. The control device 60 operates the focus lens drive mechanism 50 to perform control of matching the focus lens 42 with the in-focus position. It should be noted that, in the following, for convenience of description, the control of matching the focus lens 42 with the in-focus position is also referred to as an "AF control".

The image sensor 36 is disposed such that the center of the light-receiving surface 36A is matched with the optical axis OA1 and the light-receiving surface 36A is orthogonal to the optical axis OA1. It should be noted that examples of the image sensor 36 include a CMOS image sensor or a CCD image sensor.

The image sensor 36 is driven under the control of the control device 60. The image sensor 36 images the subject at a predetermined frame rate (for example, 30 fps) in response to a timing signal supplied from the control device 60. The control device 60 acquires image data obtained by imaging the subject with the image sensor 36, that is, the telephoto camera image data from the image sensor 36.

It should be noted that, in the example shown in FIG. 2, an example of a configuration of the wide angle camera 14 is also shown. The wide angle camera 14 comprises a lens barrel 62 and a wide angle camera body 64. The lens barrel 62 corresponds to the lens barrel 28 of the telephoto camera 12, and the wide angle camera body 64 corresponds to the telephoto camera body 30 of the telephoto camera 12. The lens barrel 62 is provided with a lens barrel side mount 66, and the wide angle camera body 64 is provided with a body side mount 68. In the wide angle camera 14, the lens barrel side mount 66 corresponds to the lens barrel side mount 32 of the telephoto camera 12, and the body side mount 68 corresponds to the body side mount 34 of the telephoto camera 12. An imaging optical system 72 is built in the lens barrel 62, and an image sensor 70 is built in the wide angle camera body 64. In the wide angle camera 14, the image sensor 70 corresponds to the image sensor 36 of the telephoto camera 12. A light-receiving surface 70A is formed on the image sensor 70. In the wide angle camera 14, the light-receiving surface 70A corresponds to the light-receiving surface 36A of the telephoto camera 12.

A basic configuration of the wide angle camera 14 is the same as that of the telephoto camera 12 except that the focal lengths are different. Here, "the focal lengths are different" means that the focal length of the imaging optical system 38 of the telephoto camera 12 is longer than the focal length of the imaging optical system 72 of the wide angle camera 14. The fact that the focal length of the imaging optical system 38 of the telephoto camera 12 is longer than the focal length of the imaging optical system 72 of the wide angle camera 14 means that a magnitude relationship of "the focal length of the imaging optical system 38 of the telephoto camera 12≥the focal length of the imaging optical system 72 of the wide angle camera 14×2" is satisfied between the telephoto camera 12 and the wide angle camera 14 as a relationship of the focal length.

It should be noted that, on the premise that the focal length of the imaging optical system 38 of the telephoto camera 12 is at least twice the focal length of the imaging optical system 72 of the wide angle camera 14, an actual focal length of the imaging optical system 72 of the wide angle camera 14 is preferably 6 mm to 20 mm, and an actual focal length of the imaging optical system 38 of the telephoto camera 12 is preferably 12.5 mm to 2000 mm. In addition, a ratio of the focal lengths (=(the focal length of the imaging optical system 38 of the telephoto camera 12)/(the focal length of the imaging optical system 72 of the wide angle camera 14)) is preferably twice to 333 times.

The imaging optical system 72 is an example of a "second optical system" according to the technology of the present disclosure, and includes an optical axis OA2, an objective lens 74, a focus lens 76, a master lens 80, and a stop 82. In the wide angle camera 14, the optical axis OA2 corresponds to the optical axis OA1 of the telephoto camera 12. In the wide angle camera 14, the objective lens 74 corresponds to the objective lens 40 of the telephoto camera 12. In the wide angle camera 14, the focus lens 76 corresponds to the focus lens 42 of the telephoto camera 12. In the wide angle camera 14, the master lens 80 corresponds to the master lens 46 of the telephoto camera 12. In the wide angle camera 14, the stop 82 corresponds to the stop 48 of the telephoto camera 12.

The lens barrel 62 is provided with a focus lens drive mechanism 84, a zoom lens drive mechanism 86, and a stop drive mechanism 88. In the wide angle camera 14, the focus lens drive mechanism 84 corresponds to the focus lens drive mechanism 50 of the telephoto camera 12. In the wide angle camera 14, the zoom lens drive mechanism 86 corresponds to the zoom lens drive mechanism 52 of the telephoto camera 12. In the wide angle camera 14, the stop drive mechanism 88 corresponds to the stop drive mechanism 54 of the telephoto camera 12.

The lens barrel side mount 66 is provided with a lens barrel side contact 90. The body side mount 68 is provided with a body side contact 92. In the wide angle camera 14, the lens barrel side contact 90 corresponds to the lens barrel side contact 56 of the telephoto camera 12. In the wide angle camera 14, the body side contact 92 corresponds to the body side contact 58 of the telephoto camera 12.

A control device 94 is built in the wide angle camera body 64. In the wide angle camera 14, the control device 94 corresponds to the control device 60 of the telephoto camera body 30. The control device 94 acquires image data obtained by imaging the subject with the image sensor 70, that is, wide angle camera image data from the image sensor 70.

The biaxial revolution table 16 comprises a pan mechanism 96 and a tilt mechanism 98. The pan mechanism 96 includes a telephoto camera side pan motor 96A. The telephoto camera side pan motor 96A is driven under the control of the management device 20 (see FIG. 1). In a case in which the telephoto camera 12 is installed on the biaxial revolution table 16, the pan mechanism 96 transmits a drive force of the telephoto camera side pan motor 96A to the telephoto camera 12 as power around the pan axis PA1 (see FIG. 1) to pan the telephoto camera 12. The tilt mechanism 98 includes a telephoto camera side tilt motor 96B. The telephoto camera side tilt motor 96B is driven under the control of the management device 20 (see FIG. 1). In a case in which the telephoto camera 12 is installed on the biaxial revolution table 16, the tilt mechanism 98 transmits a drive force of the telephoto camera side tilt motor 96B to the telephoto camera 12 as power around the tilt axis TA1 (see FIG. 1) to tilt the telephoto camera 12.

The biaxial revolution table 18 comprises a pan mechanism 100 and a tilt mechanism 102. The pan mechanism 100 includes a wide angle camera side pan motor 100A. The wide angle camera side pan motor 100A is driven under the control of the management device 20 (see FIG. 1). In a case in which the wide angle camera 14 is installed on the biaxial revolution table 18, the pan mechanism 100 transmits a drive force of the wide angle camera side pan motor 100A to the wide angle camera 14 as power around the pan axis PA2 (see FIG. 1) to pan the wide angle camera 14. The tilt mechanism 102 includes a wide angle camera side tilt motor 100B. The wide angle camera side tilt motor 100B is driven under the control of the management device 20 (see FIG. 1). In a case in which the wide angle camera 14 is installed on the biaxial revolution table 16, the tilt mechanism 102 transmits a drive force of the wide angle camera side tilt motor 100B to the wide angle camera 14 as power around the tilt axis TA2 (see FIG. 1) to tilt the wide angle camera 14.

Figure 3:
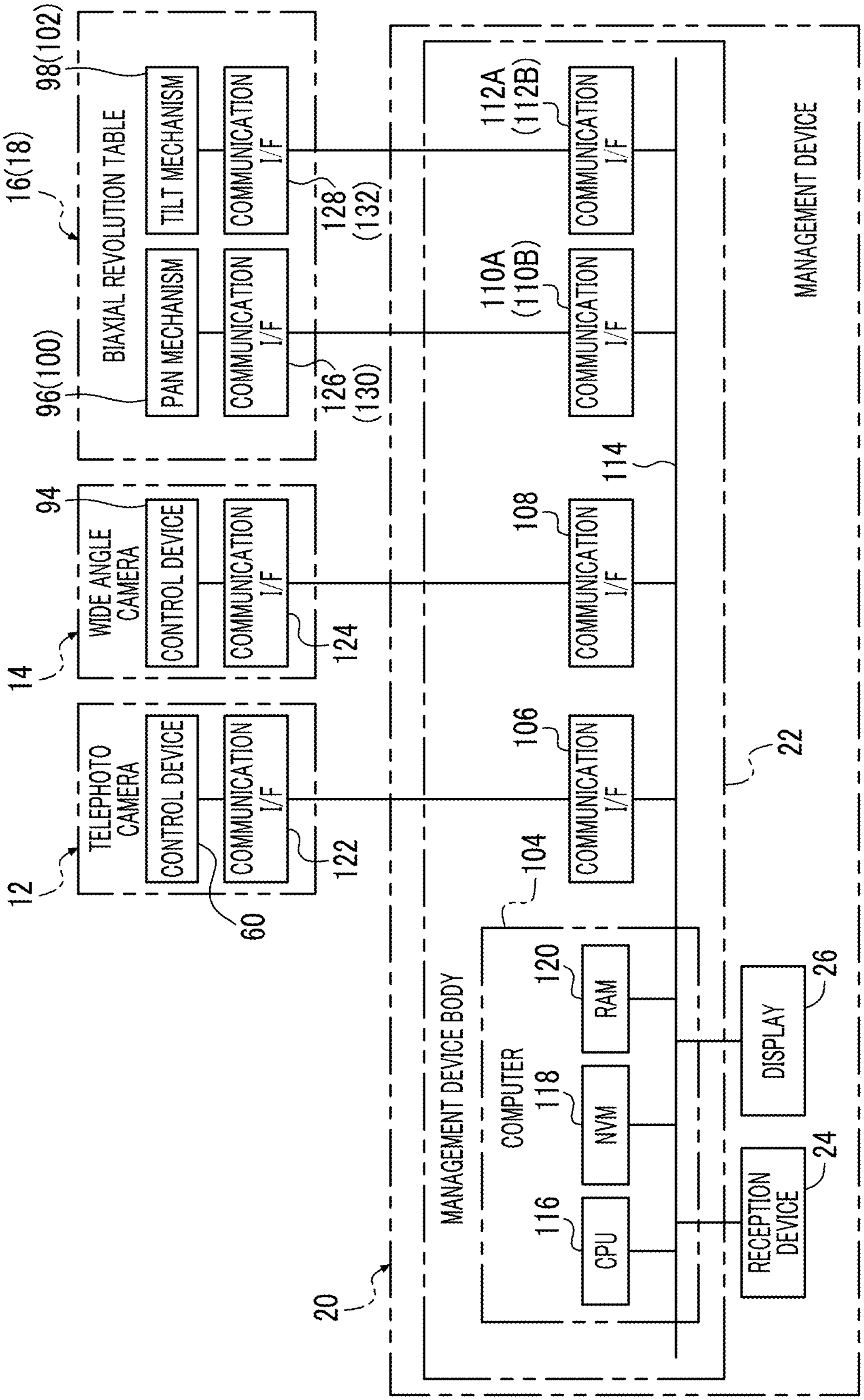
FIG. 3 is a conceptual diagram showing an example of a hardware configuration of an electric system of a management device, the telephoto camera, the wide angle camera, and the biaxial revolution table provided in the imaging system.

As shown in FIG. 3 as an example, the management device body 22 comprises the computer 104. In addition, the management device body 22 comprises communication I/Fs 106, 108, 110A, 110B, 112A, and 112B.

The computer 104 includes a CPU 116, an NVM 118, and a RAM 120. The computer 104 is an example of a "computer that is applied to an imaging system" according to the technology of the present disclosure, and the CPU 116 is an example of a "processor" according to the technology of the present disclosure.

The CPU 116, the NVM 118, and the RAM 120 are connected to a bus 114. In the example shown in FIG. 3, one bus is shown as the bus 114 for convenience of illustration, but a plurality of buses may be used. The bus 114 may be a serial bus, or may be a parallel bus, which includes a data bus, an address bus, a control bus, and the like.

Various parameters and various programs are stored in the NVM 118. Here, examples of the NVM 118 include various non-volatile storage devices, such as an EEPROM, an SSD, and/or an HDD. The RAM 120 transitorily stores various information, and is used as a work memory. Examples of the RAM 120 include a DRAM or an SRAM.

Various programs are stored in the NVM 118. The CPU 116 reads out a required program from the NVM 118 and executes the read out program on the RAM 120. The CPU 116 controls the entire imaging system 10 including the management device 20 in accordance with the program executed on the RAM 120.

The reception device 24 and the display 26 are connected to the bus 114, and the CPU 116 grasps the instruction received by the reception device 24 and displays various information on the display 26.

The telephoto camera 12 comprises a communication I/F 122, and the communication I/F 122 is connected to the control device 60. In addition, the wide angle camera 14 also comprises a communication I/F 124, and the communication I/F 124 is connected to the control device 94

The biaxial revolution table 16 comprises communication I/Fs 126 and 128. The communication I/F 126 is connected to the pan mechanism 96, and the communication I/F 128 is connected to the tilt mechanism 98. In addition, the biaxial revolution table 18 also comprises communication I/Fs 130 and 132. The communication I/F 130 is connected to the pan mechanism 100, and the communication I/F 132 is connected to the tilt mechanism 102.

The communication I/Fs 106, 108, 110A, 110B, 112A, and 112B are connected to the bus 114. The communication I/F 106 is connected to the communication I/F 122 of the telephoto camera 12, and the CPU 116 exchanges information to and from the control device 60 via the communication I/Fs 106 and 122. The communication I/F 108 is connected to the communication I/F 124 of the wide angle camera 14, and the CPU 116 exchanges information to and from the control device 94 via the communication I/Fs 108 and 124.

The communication I/F 110A is connected to the communication I/F 126 of the biaxial revolution table 16, and the CPU 116 controls an electric system device (for example, the telephoto camera side pan motor 96A or the like) of the pan mechanism 96 via the communication I/Fs 110A and 126. The communication I/F 112A is connected to the communication I/F 128 of the biaxial revolution table 16, and the CPU 116 controls an electric system device (for example, the telephoto camera side tilt motor 96B or the like) of the tilt mechanism 98 via the communication I/Fs 112A and 128.

The communication I/F 110B is connected to the communication I/F 130 of the biaxial revolution table 18, and the CPU 116 controls an electric system device (for example, the wide angle camera side pan motor 100A or the like) of the pan mechanism 100 via the communication I/Fs 110B and 130. The communication I/F 112B is connected to the communication I/F 132 of the biaxial revolution table 18, and the CPU 116 controls an electric system device (for example, the wide angle camera side tilt motor 100B or the like) of the tilt mechanism 102 via the communication I/Fs 112B and 132.

Figure 4:
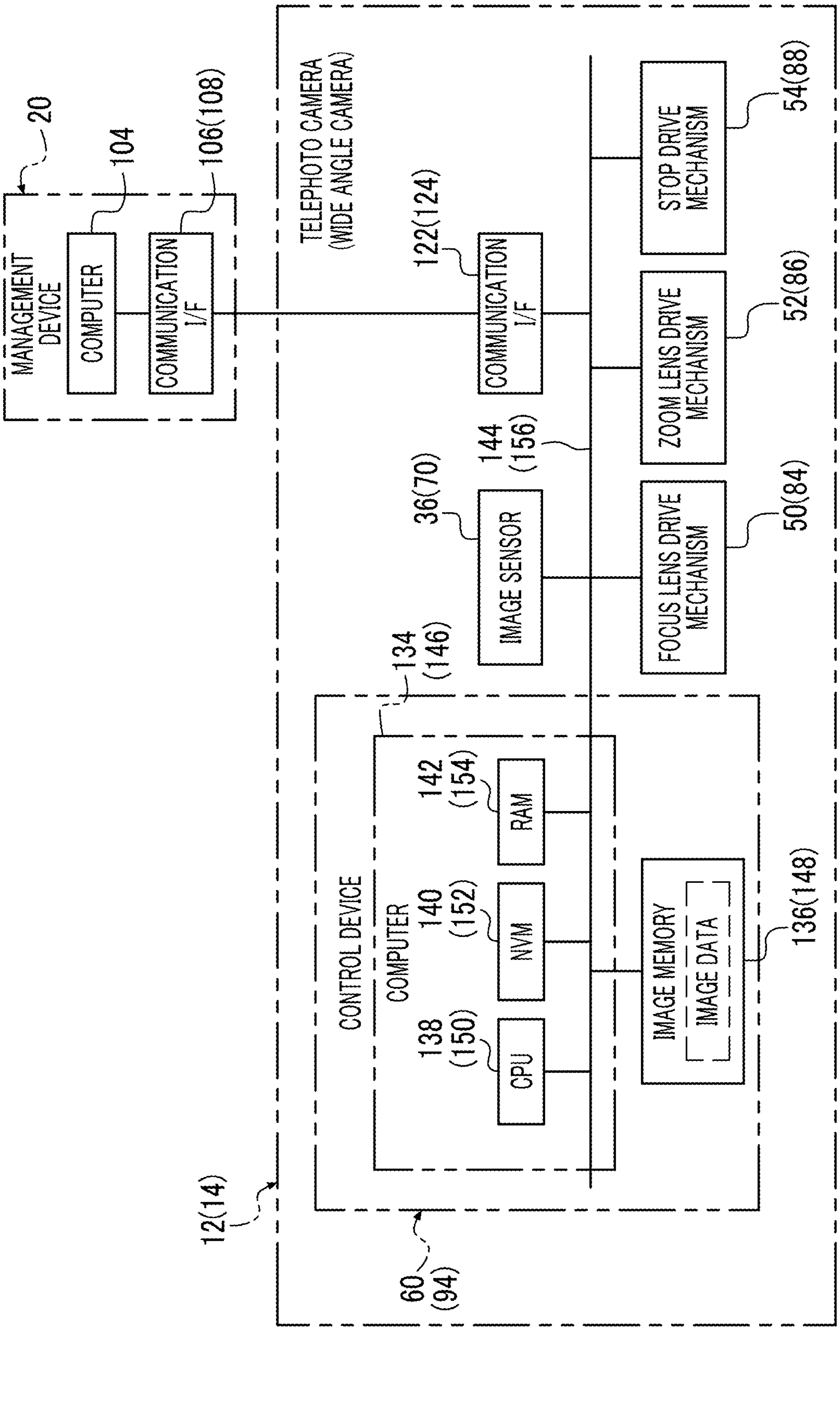
FIG. 4 is a conceptual diagram showing an example of a hardware configuration of an electric system of the telephoto camera and the wide angle camera provided in the imaging system.

As shown in FIG. 4 as an example, in the telephoto camera 12, the control device 60 comprises a computer 134 and an image memory 136. The computer 134 includes a CPU 138, an NVM 140, and a RAM 142.

The CPU 138, the NVM 140, and the RAM 142 are connected to a bus 144. In the example shown in FIG. 4, one bus is shown as the bus 144 for convenience of illustration, but a plurality of buses may be used. The bus 114 may be a serial bus, or may be a parallel bus, which includes a data bus, an address bus, a control bus, and the like.

Various parameters and various programs are stored in the NVM 140. Here, examples of the NVM 140 include various non-volatile storage devices, such as an EEPROM, an SSD, and/or an HDD. The RAM 142 transitorily stores various information, and is used as a work memory. Examples of the RAM 142 include a DRAM or an SRAM.

Various programs are stored in the NVM 140. The CPU 138 reads out a required program from the NVM 140 and executes the read out program on the RAM 142. The CPU 138 controls the entire telephoto camera 12 in accordance with the program executed on the RAM 142.

The image sensor 36 and the image memory 136 are connected to the bus 144. The image memory 136 transitorily holds the telephoto camera image data. That is, the CPU 138 acquires the telephoto camera image data from the image sensor 36 and transitorily stores the acquired telephoto camera image data in the image memory 136. Then, the CPU 138 acquires the telephoto camera image data from the image memory 136 as needed.

Each electric system device of the focus lens drive mechanism 50, the zoom lens drive mechanism 52, and the stop drive mechanism 54 is connected to the bus 144. The CPU 138 controls each electric system device of the focus lens drive mechanism 50, the zoom lens drive mechanism 52, and the stop drive mechanism 54.

The communication I/F 122 is connected to the bus 144, and the CPU 138 exchanges information with and from the computer 140 of the management device 20 via the communication I/Fs 122 and 106.

In the wide angle camera 14, the control device 94 comprises a computer 146 and an image memory 148. The computer 140 includes a CPU 150, an NVM 152, and a RAM 154. In the wide angle camera 14, the computer 140 corresponds to the computer 146 of the telephoto camera 12. That is, in the wide angle camera 14, the CPU 150, the NVM 152, and the RAM 154 correspond to the CPU 138, the NVM 140, and the RAM 154 of the telephoto camera 12.

The wide angle camera 14 comprises a bus 156. In the wide angle camera 14, the bus 156 corresponds to the bus 144 of the telephoto camera 12.

The image sensor 70 and the image memory 148 are connected to the bus 156. The image memory 148 transitorily holds the wide angle camera image data. That is, the CPU 150 acquires the wide angle camera image data from the image sensor 70 and stores the acquired wide angle camera image data in the image memory 148. Then, the CPU 150 acquires the wide angle camera image data from the image memory 148 as needed.

Each electric system device of the focus lens drive mechanism 84, the zoom lens drive mechanism 86, and the stop drive mechanism 88 is connected to the bus 156. The CPU 150 controls each electric system device of the focus lens drive mechanism 84, the zoom lens drive mechanism 86, and the stop drive mechanism 88.

The communication I/F 124 is connected to the bus 156, and the CPU 150 exchanges information to and from the computer 104 of the management device 20 via the communication I/Fs 124 and 108.

By the way, in recent years, as a method of surveilling a surveillance target region while using a surveillance camera, a method of surveilling the surveillance target region while using both the telephoto camera 12 and the wide angle camera 14 (hereinafter, also referred to as a "telephoto/wide angle camera cooperation surveillance method") in cooperation with each other has been studied. In the telephoto/wide angle camera cooperation surveillance method, a surveillant can surveil a wide range through a wide angle camera image indicated by the wide angle camera image data and can also surveil a distant subject through a telephoto camera image indicated by the telephoto camera image data. In addition, as a method of improving the convenience for the surveillant, a method of controlling a variable magnification of the telephoto camera 12 and the revolution of the telephoto camera 12 by designating a location to be zoomed in by the surveillant through the wide angle camera image has been also studied.

However, in order to use the telephoto camera 12 and the wide angle camera 14 in cooperation with each other, in addition to detailed optical information of the telephoto camera 12, detailed optical information of the wide angle camera 14 is also required. In order for the telephoto camera 12 to appropriately image a designated real space area through the wide angle camera image, at least information related to the angle of view of the wide angle camera 14 is required as the detailed optical information of the wide angle camera 14. In addition, in a case in which a short-distance subject is imaged by the telephoto camera 12 and the wide angle camera 14, it is also expected that the telephoto camera 12 cannot appropriately image the real space area designated by the surveillant through the wide angle camera image due to the parallax that occurs between the telephoto camera 12 and the wide angle camera 14.

Figure 5:
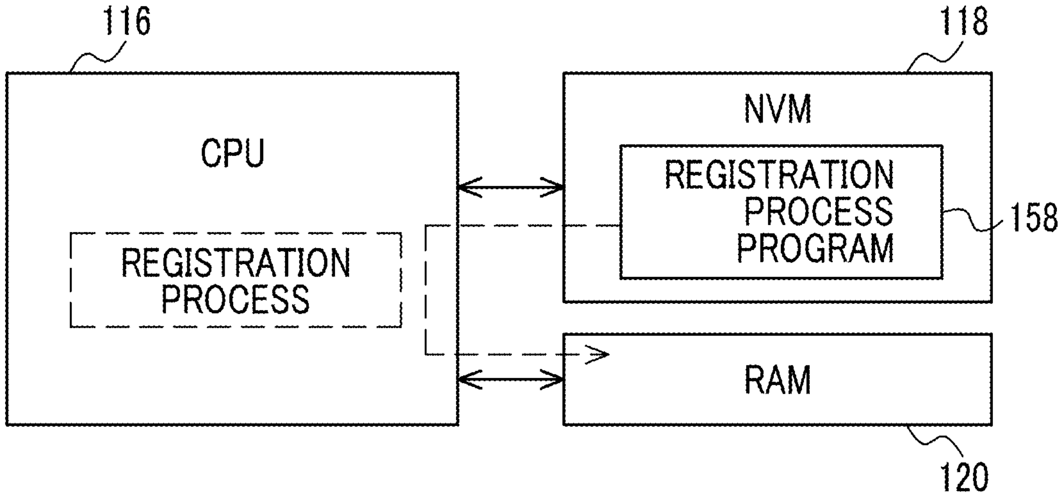
FIG. 5 is a block diagram showing an example of an aspect in which a CPU executes a registration process in the management device in accordance with a registration process program.
Figure 19:
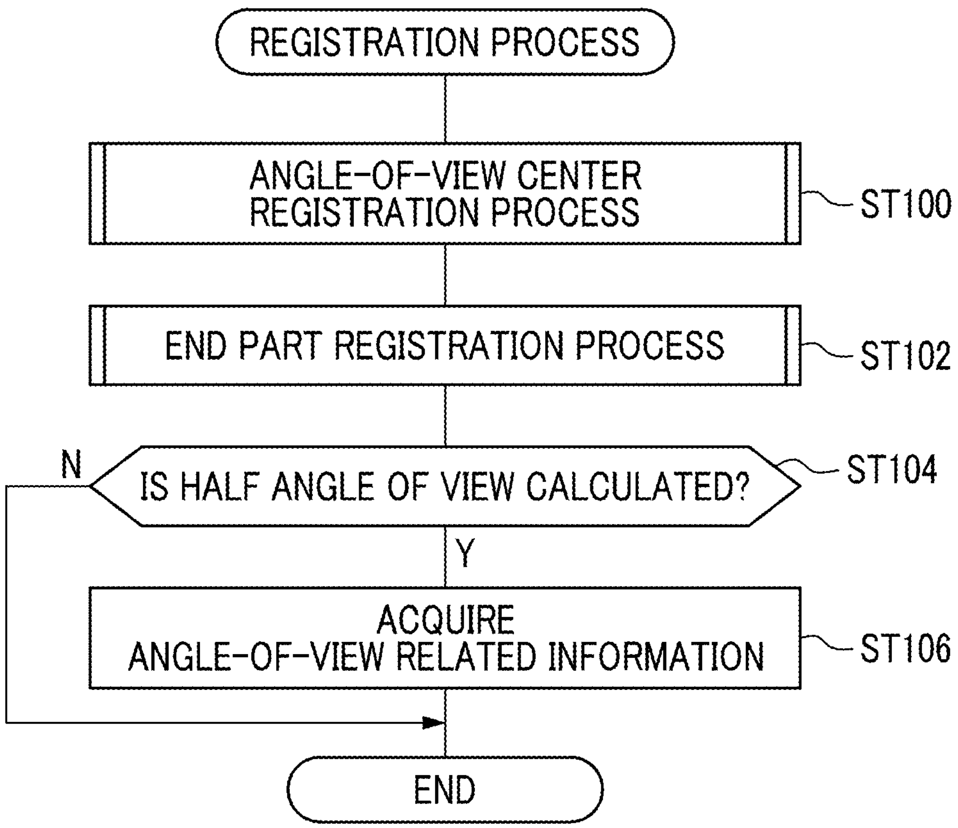
FIG. 19 is a flowchart showing an example of a flow of the registration process.

Therefore, in view of such circumstances, the imaging system 10 executes a registration process (see FIGS. 5 and 19). As shown in FIG. 5 as an example, the registration process is realized by executing a registration process program 158 by the CPU 116. The registration process program 158 is an example of a "program" according to the technology of the present disclosure. In the example shown in FIG. 5, the registration process program 158 is stored in the NVM 118, and the CPU 116 reads out the registration process program 158 from the NVM 118 and executes the read out registration process program 158 on the RAM 120. The CPU 116 performs the registration process in accordance with the registration process program 158 executed on the RAM 120.

By performing the registration process, first, the CPU 116 performs registration between the telephoto camera image obtained by imaging with the telephoto camera 12 and the wide angle camera image obtained by imaging with the wide angle camera 14 in at least two locations including an end part of the angle of view used in imaging with the imaging system 10. Then, the CPU 116 acquires angle-of-view related information that is related to the angle of view used in the imaging with the imaging system 10 based on a registration result. In the following, the contents of the registration process will be described in more detail.

Figure 6:
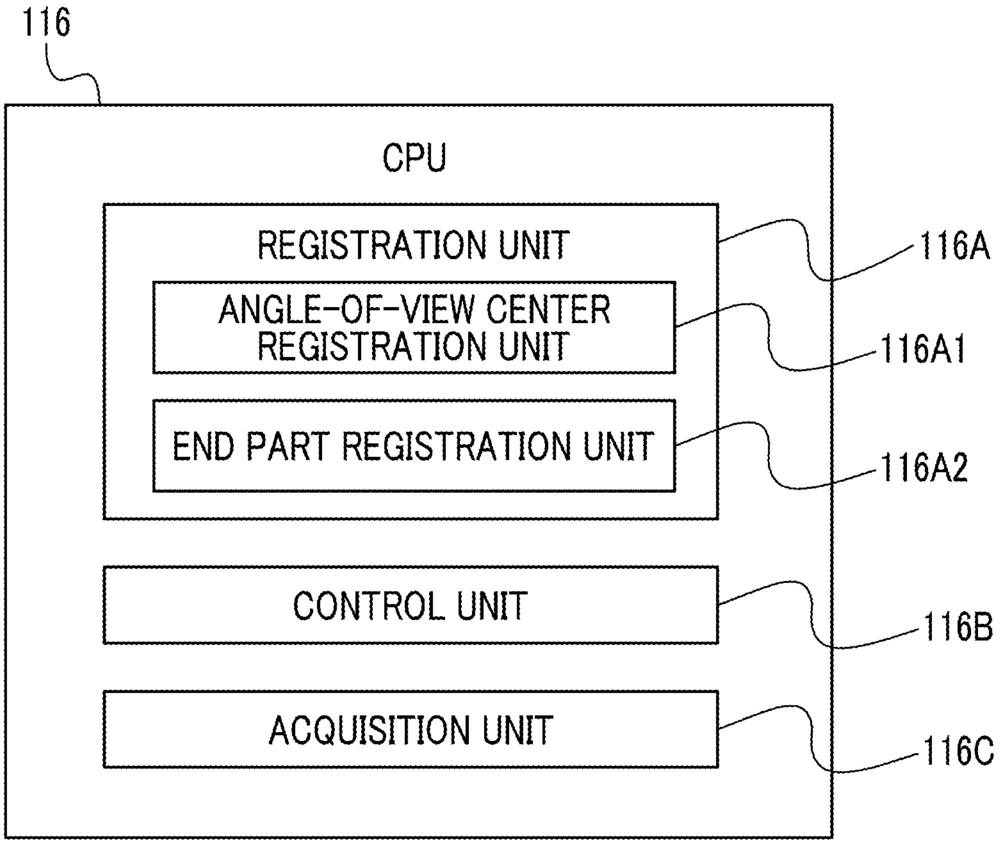
FIG. 6 is a functional block diagram showing an example of a function of the CPU of the management device.

As shown in FIG. 6 as an example, the CPU 116 is operated as a registration unit 116A, a control unit 116B, and an acquisition unit 116C by executing the registration process program 158. In addition, the registration unit 116A includes an angle-of-view center registration unit 116A1 and an end part registration unit 116A2.

Figure 7:
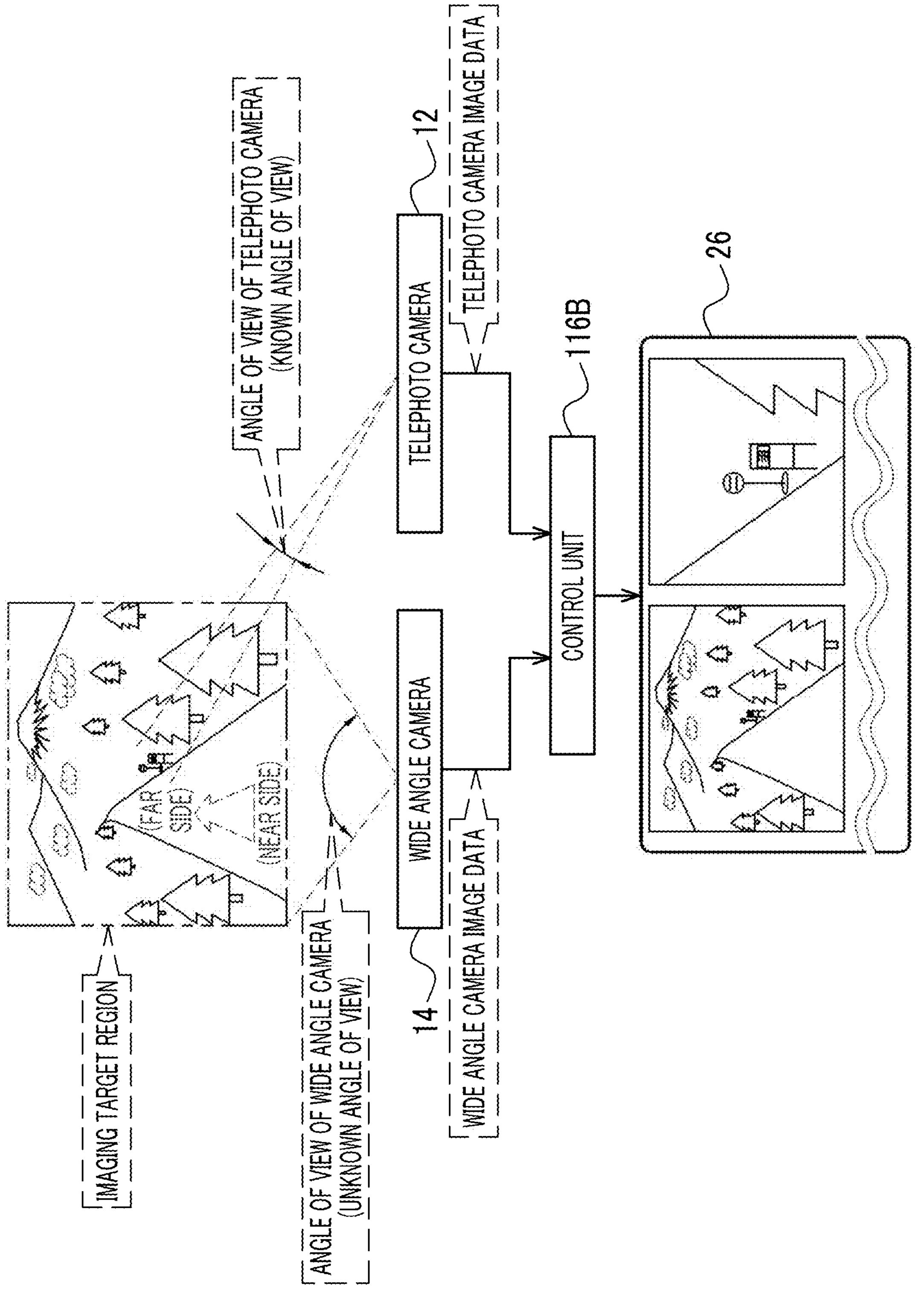
FIG. 7 is a conceptual diagram showing an example of process contents in which a telephoto camera image and a wide angle camera image obtained by imaging an imaging target region by the telephoto camera and the wide angle camera are displayed on a display.

As shown in FIG. 7 as an example, in the present embodiment, the optical information related to the imaging optical system 38 of the telephoto camera 12 is known, and the optical information related to the imaging optical system 72 of the wide angle camera 14 is unknown. For example, the angle of view of the telephoto camera 12 (hereinafter, also referred to as an "angle of view of the telephoto camera") is a known angle of view, and the angle of view of the wide angle camera 14 (hereinafter, also referred to as an "angle of view of the wide angle camera") is an unknown angle of view. The details will be described below, but in the present embodiment, the CPU 116 performs the registration process, so that the angle of view of the wide angle camera is derived and information including the derived angle of view of the wide angle camera is acquired as the angle-of-view related information by the control unit 116B and the acquisition unit 116C (see FIGS. 6 and 18).

The control unit 116B acquires the telephoto camera image data from the telephoto camera 12, and displays the telephoto camera image indicated by the acquired telephoto camera image data on the display 26 as a live view image. In addition, the control unit 116B acquires the wide angle camera image data from the wide angle camera 14, and displays the wide angle camera image indicated by the acquired wide angle camera image data on the display 26 as a live view image. The display 26 displays the telephoto camera image and the wide angle camera image on separate screens. In the example shown in FIG. 7, among the two screens arranged side by side in a front view in the display 26, the telephoto camera image is displayed on the screen on a left side in the front view, and the wide angle camera image is displayed on the screen on a right side in the front view.

It should be noted that the form example is described in which the telephoto camera image and the wide angle camera image are displayed on the display 26 as the live view image, but the technology of the present disclosure is not limited to this, and an image other than the live view image may be displayed. Examples of the image other than the live view image include a postview image.

Figure 8:
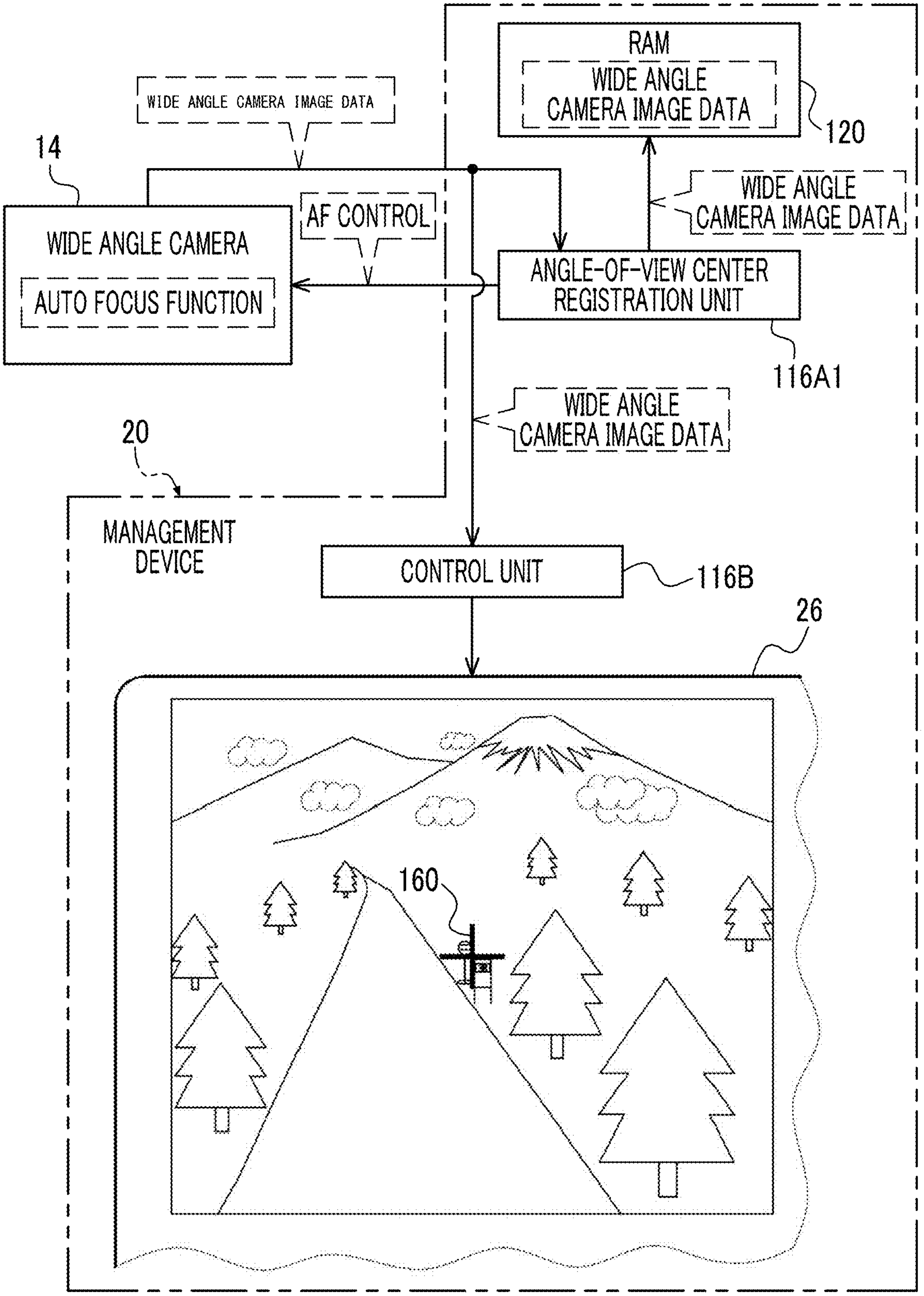
FIG. 8 is a conceptual diagram showing an example of process contents performed by an angle-of-view center registration unit on the wide angle camera and process contents performed by a control unit.

As shown in FIG. 8 as an example, the control unit 116B performs control of displaying a reticle 160 in a superimposed manner on the center of the wide angle camera image in the display 26. The angle-of-view center registration unit 116A1 performs the AF control on the wide angle camera 14. That is, the wide angle camera 14 has an AF function, and the angle-of-view center registration unit 116A1 activates the AF function of the wide angle camera 14 to focus on the center of the angle of view of the wide angle camera. Here, the center of the angle of view of the wide angle camera corresponds to the center of the wide angle camera image. Therefore, the display 26 displays the wide angle camera image obtained by imaging with the wide angle camera 14 in a state in which the center of the angle of view of the wide angle camera is in focus.

In addition, the angle-of-view center registration unit 116A1 stores, in the RAM 120 the wide angle camera image data obtained by imaging with the wide angle camera 14 in a state in which the center of the angle of view of the wide angle camera is in focus. It should be noted that the wide angle camera image data stored in the RAM 120 is updated each time imaging for one frame is performed.

Figure 9:
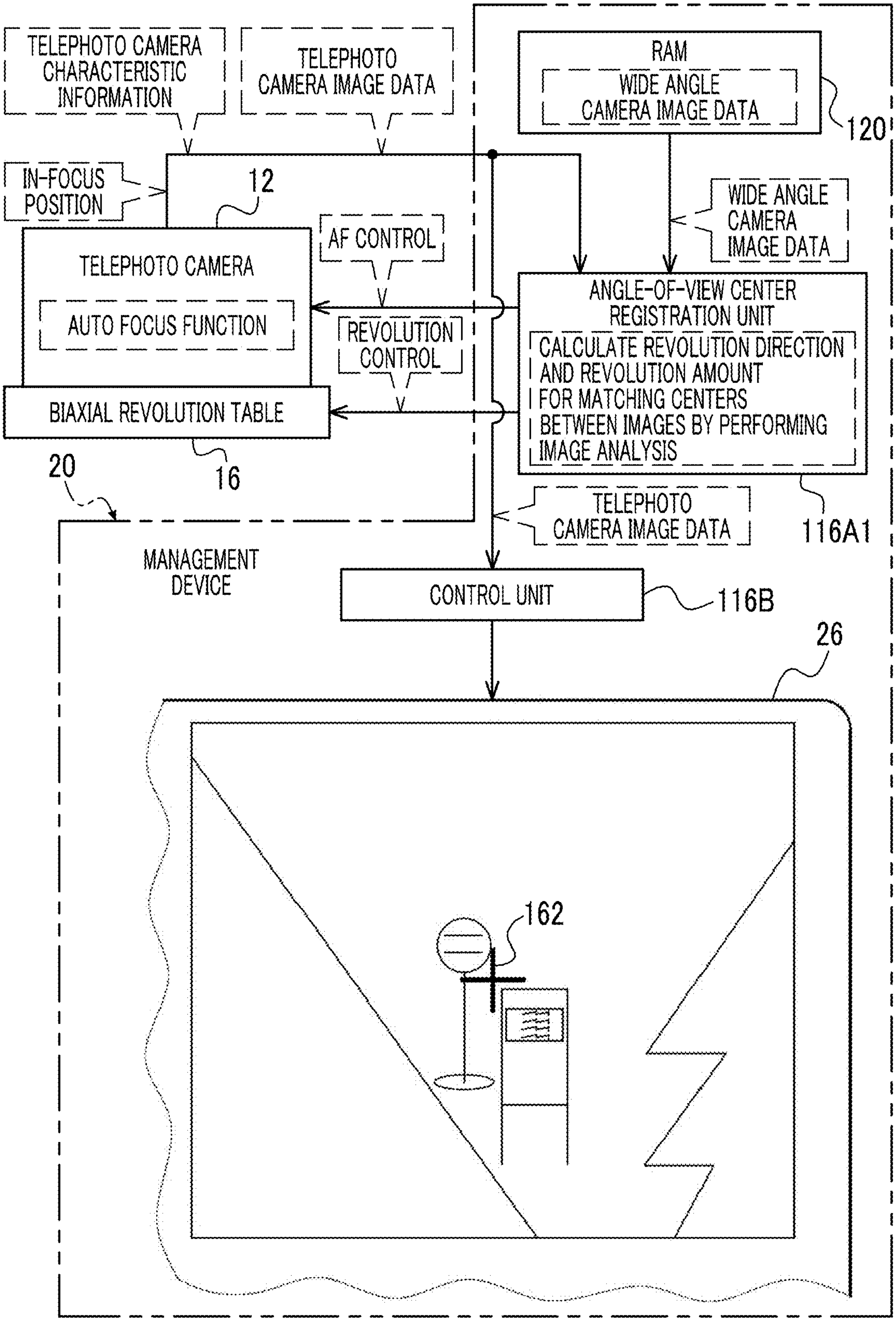
FIG. 9 is a conceptual diagram showing an example of process contents performed by the angle-of-view center registration unit on the telephoto camera and the process contents performed by the control unit.

As shown in FIG. 9 as an example, the control unit 116B performs control of displaying a reticle 162 in a superimposed manner on the center of the telephoto camera image in the display 26. The angle-of-view center registration unit 116A1 performs the AF control on the telephoto camera 12. That is, the telephoto camera 12 has the AF function, and the angle-of-view center registration unit 116A1 activates the AF function of the telephoto camera 12 to focus on the center of the angle of view of the telephoto camera. Here, the center of the angle of view of the telephoto camera corresponds to the center of the telephoto camera image. Therefore, the display 26 displays the telephoto camera image obtained by imaging with the telephoto camera 12 in a state in which the center of the angle of view of the telephoto camera is in focus.

The angle-of-view center registration unit 116A1 acquires the telephoto camera image data obtained by imaging with the telephoto camera 12 in a state in which the center of the angle of view of the telephoto camera is in focus, from the telephoto camera 12. In addition, the angle-of-view center registration unit 116A1 acquires the wide angle camera image data from the RAM 120. Then, the angle-of-view center registration unit 116A1 performs the registration between the center of the angle of view of the telephoto camera and the center of the angle of view of the wide angle camera by using an image analysis based on the telephoto camera image data acquired from the telephoto camera 12 and the wide angle camera image data acquired from the RAM 120.

In this case, first, the angle-of-view center registration unit 116A1 calculates a revolution direction and a revolution amount of the telephoto camera 12 by performing the image analysis on the telephoto camera image data acquired from the telephoto camera 12 and the wide angle camera image data acquired from the RAM 120. Here, the revolution direction and the revolution amount of the telephoto camera 12 refer to the revolution direction and the revolution amount required for matching the centers between the wide angle camera image and the telephoto camera image. Specifically, the angle-of-view center registration unit 116A1 calculates the revolution direction and the revolution amount required for matching the center of the telephoto camera image with the subject positioned at the center of the wide angle camera image (for example, a point image) (for example, to match the center of the reticle 162 shown in FIG. 9 with the center of the reticle 160 shown in FIG. 8), as the revolution direction and the revolution amount of the telephoto camera 12. It should be noted that, in the following description, for convenience of description, "revolution" will be described on the premise that revolution means pan unless otherwise specified. That is, the revolution direction refers to a pan direction, and the revolution amount refers to a pan amount.

Next, the angle-of-view center registration unit 116A1 performs the revolution control on the biaxial revolution table 16 based on the calculated revolution direction and revolution amount. That is, the angle-of-view center registration unit 116A1 pans the telephoto camera 12 by operating the biaxial revolution table 16 in the calculated revolution direction and revolution amount.

The angle-of-view center registration unit 116A1 derives a subject distance by using the AF function of the telephoto camera 12. Therefore, the angle-of-view center registration unit 116A1 acquires the in-focus position and telephoto camera characteristic information from the telephoto camera 12. The in-focus position is acquired by the angle-of-view center registration unit 116A1 each time the AF control is performed. The telephoto camera characteristic information is information indicating a characteristic of the telephoto camera 12 and refers to information required for deriving the subject distance. Examples of the information required for deriving the subject distance include information related to the specifications of the imaging optical system 38 of the telephoto camera 12 and information related to the specifications of the image sensor 36.

Figure 10:
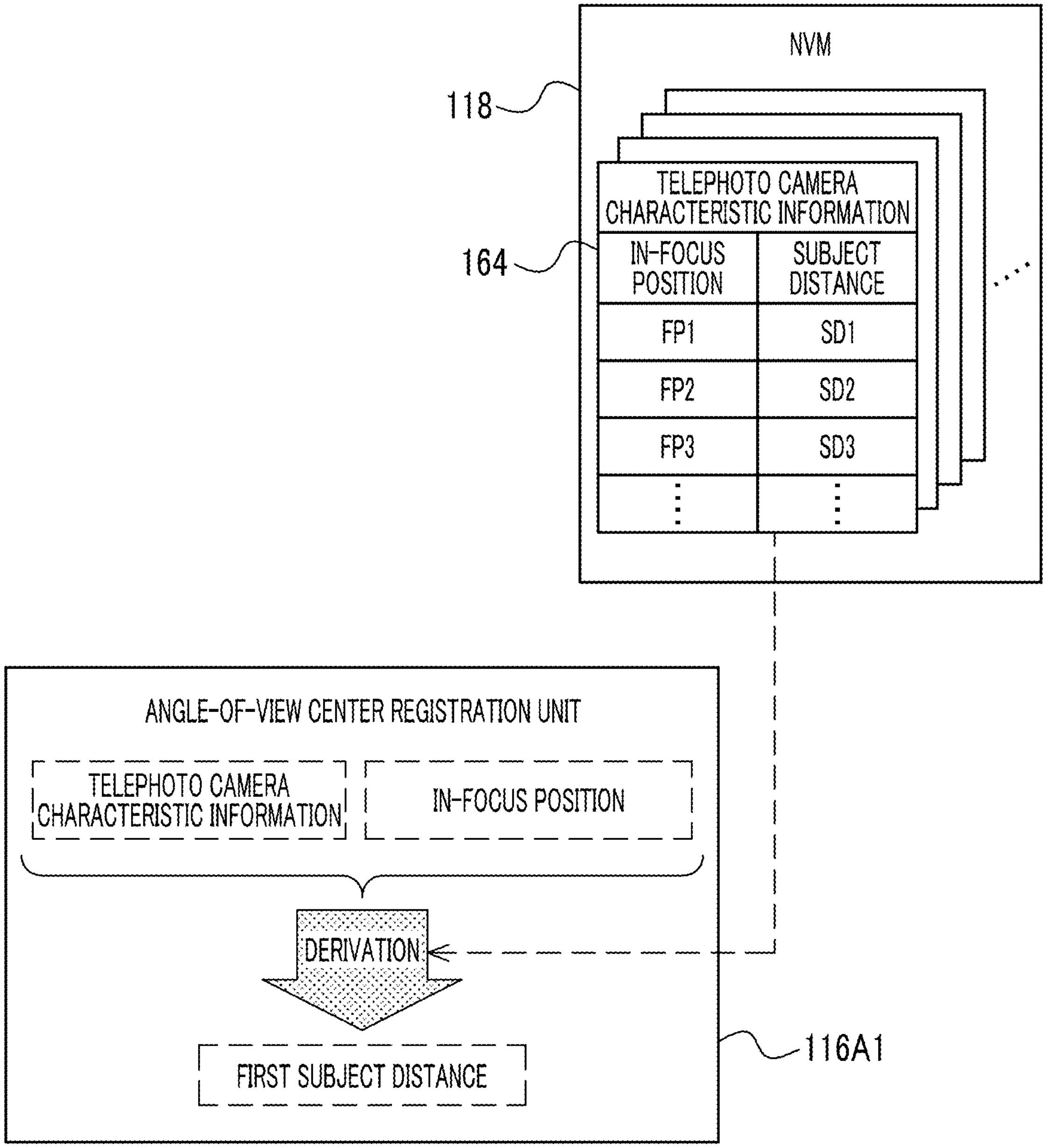
FIG. 10 is a conceptual diagram provided for describing a derivation method of a first subject distance.

As shown in FIG. 10 as an example, a subject distance derivation table 164 is stored in the NVM 118. The subject distance derivation table 164 is provided for each of a plurality of different telephoto camera characteristic information. The subject distance derivation table 164 for each of the plurality of telephoto camera characteristic information is a table in which the in-focus position and the subject distance are associated with each other. The angle-of-view center registration unit 116A1 acquires the subject distance derivation table 164 corresponding to the telephoto camera characteristic information acquired from the telephoto camera 12 from the NVM 118. Then, the angle-of-view center registration unit 116A1 derives the subject distance corresponding to the in-focus position acquired from the telephoto camera 12 from the subject distance derivation table 164 acquired from the NVM 118. The subject distance derived by the angle-of-view center registration unit 116A1 as described above is an example of a "first subject distance" according to the technology of the present disclosure. In addition, in the following, for convenience of description, the subject distance derived by the angle-of-view center registration unit 116A1 will also be referred to as a "first subject distance". It should be noted that the form example has been described in which the first subject distance is derived from the subject distance derivation table 164, but the technology of the present disclosure is not limited to this, and the first subject distance may be calculated in accordance with an arithmetic expression in which the telephoto camera characteristic information and the in-focus position are independent variables and the first subject distance is a dependent variable.

Figure 11:
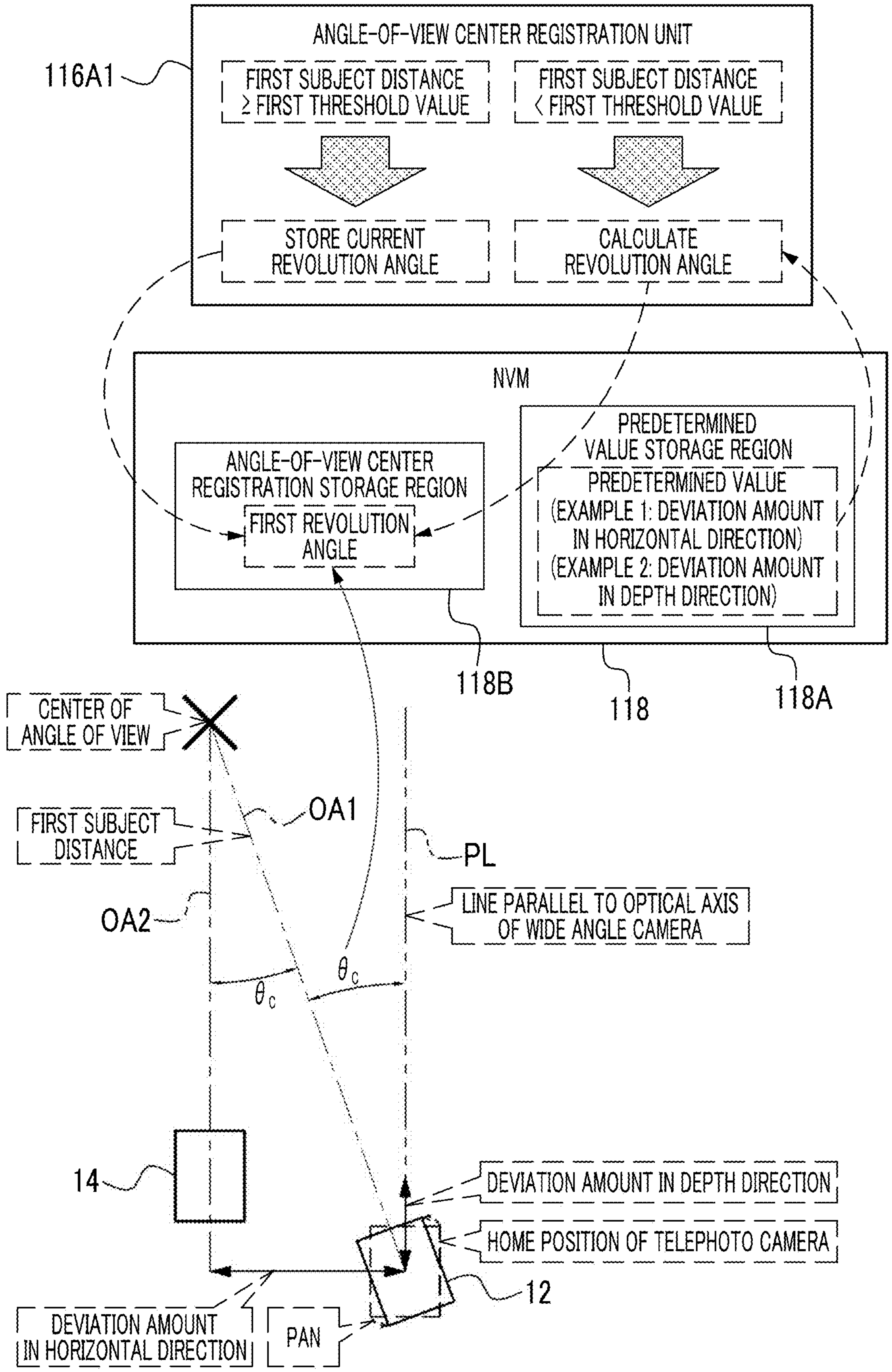
FIG. 11 is a conceptual diagram provided for describing a first revolution angle.

As shown in FIG. 11 as an example, the NVM 118 is provided with a predetermined value storage region 118A and an angle-of-view center registration storage region 118B. In the predetermined value storage region 118A, a predetermined value, which is an example of "position specification information" according to the technology of the present disclosure, is stored. The predetermined value is a value that specifies a positional relationship between the telephoto camera 12 and the wide angle camera 14. Examples of the predetermined value include a deviation amount in a horizontal direction and a deviation amount in a depth direction. Here, the deviation amount in the horizontal direction refers to the deviation amount in the horizontal direction between the telephoto camera 12 and the wide angle camera 14. In addition, the deviation amount in the depth direction refers to the deviation amount in a front-rear direction between the telephoto camera 12 and the wide angle camera 14, that is, the deviation amount in the depth direction between the telephoto camera 12 and the wide angle camera 14. It should be noted that the deviation amount in the horizontal direction and the deviation amount in the depth direction are examples of "deviation amount between the first imaging apparatus and the second imaging apparatus" according to the technology of the present disclosure.

The angle-of-view center registration unit 116A1 determines whether or not the first subject distance is equal to or more than a first threshold value. Here, the first threshold value is a fixed value that is obtained in advance by test with an actual machine and/or by computer simulation, as the subject distance at which the telephoto camera 12 cannot appropriately image the real space area designated by the user through the wide angle camera image due to the parallax based on the deviation amount in the horizontal direction and the deviation amount in the depth direction. It should be noted that, here, the fixed value is described as the first threshold value, but the technology of the present disclosure is not limited to this, and the first threshold value may be a variable value that is changed by an instruction given from an outside and/or an imaging condition.

In a case in which the first subject distance is equal to or more than the first threshold value, the angle-of-view center registration unit 116A1 overwrites and stores a current revolution angle in the angle-of-view center registration storage region 118B. Here, the current revolution angle refers to a revolution angle of the telephoto camera 12 that is revolved by the angle-of-view center registration unit 116A1 performing the revolution control shown in FIG. 9 on the biaxial revolution table 16. In the example shown in FIG. 11, the revolution angle of the telephoto camera 12 is shown as "O". That is, an angle formed by a parallel line PL (line parallel to the optical axis OA2) that matches the optical axis OA1 in a state in which the telephoto camera 12 is at a home position (initial state before revolving the telephoto camera 12) with the optical axis OA1 after revolving the telephoto camera 12 is the revolution angle Oc.

In a case in which the first subject distance is less than the first threshold value, the angle-of-view center registration unit 116A1 performs the angle-of-view center registration process. Here, the angle-of-view center registration process refers to a process of performing the registration between the center of the angle of view of the telephoto camera and the center of the angle of view of the wide angle camera by using the predetermined value. Here, performing the registration between the center of the angle of view of the telephoto camera and the center of the angle of view of the wide angle camera refers to calculating the revolution angle $\theta_c$ required for matching the center of the angle of view of the telephoto camera with the center of the angle of view of the wide angle camera by using the predetermined value, and overwriting and storing the calculated revolution angle $\theta_c$ in the angle-of-view center registration storage region 118B. That is, the angle-of-view center registration unit 116A1 calculates the revolution angle $\theta_c$ by performing the angle-of-view center registration process, and overwrites and stores the calculated revolution angle $\theta_c$ in the angle-of-view center registration storage region 118B.

It should be noted that, in the following, for convenience of description, the revolution angle stored and overwritten by the angle-of-view center registration unit 116A1 in the angle-of-view center registration storage region 118B is also referred to as a "first revolution angle".

Figure 12:
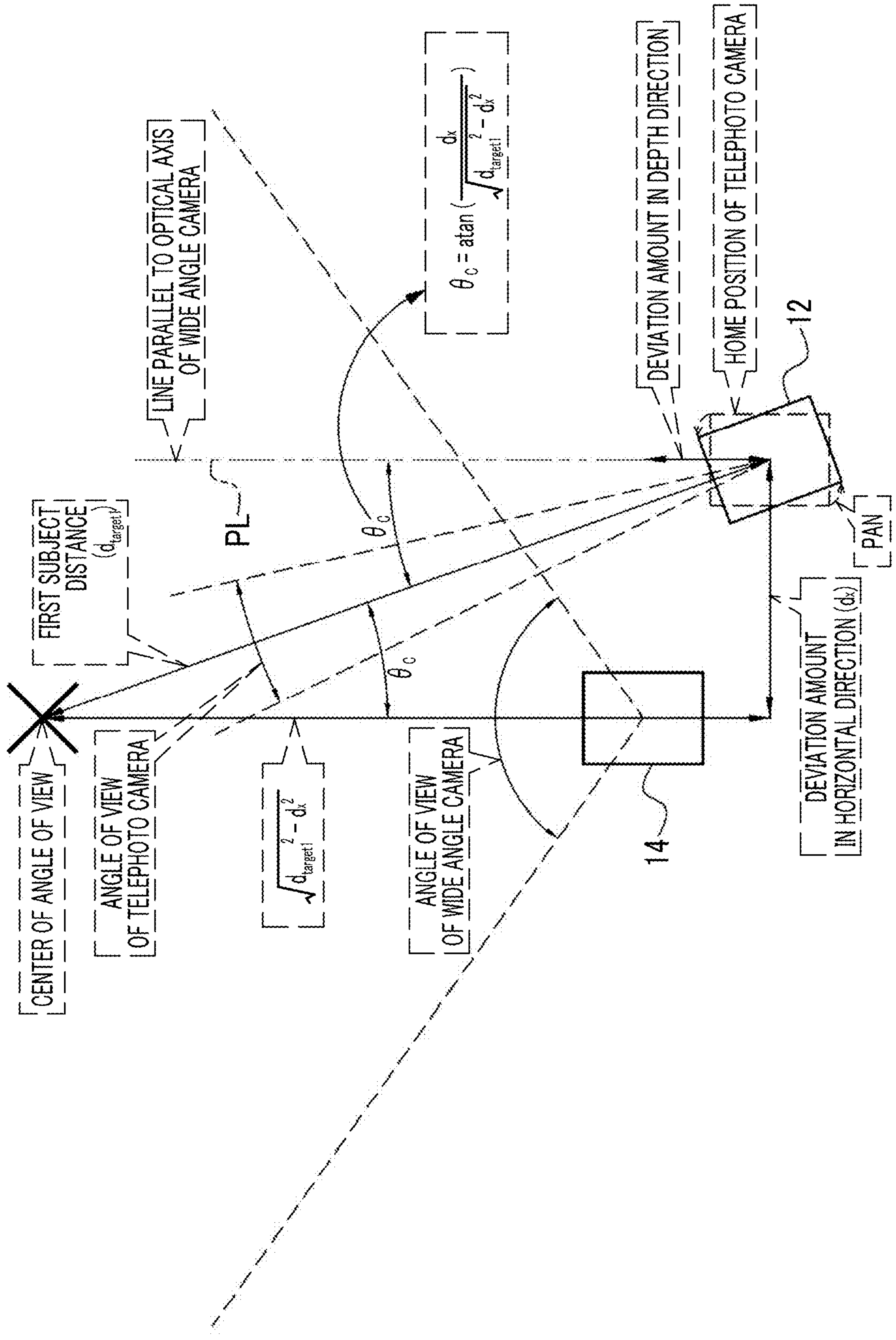
FIG. 12 is a conceptual diagram provided for describing a calculation method of the first revolution angle.

As an example, as shown in FIG. 12, in a case in which the first subject distance is "$d_{target1}$" and the deviation amount in the horizontal direction is "$d_x$", the revolution angle θ, is calculated by the angle-of-view center registration unit 116A1 from Expression (1). Then, the revolution angle $\theta_c$ calculated by the angle-of-view center registration unit 116A1 is overwritten and stored as the first revolution angle in the angle-of-view center registration storage region 118B. It should be noted that the first revolution angle is an example of an "angle-of-view center registration result obtained by performing registration between the center of the angle of view of the first imaging apparatus and a center of the angle of view of the second imaging apparatus" according to the technology of the present disclosure.

$$\theta_c = a\tan\left(\frac{d_x}{\sqrt{d_{target1}^2 - d_x^2}}\right) \quad (1)$$

In a case in which the angle-of-view center registration process is performed by the angle-of-view center registration unit 116A1 in this way, next, an end part registration process is performed by the end part registration unit 116A2. In the following, the description thereof will be made in detail.

Figure 13:
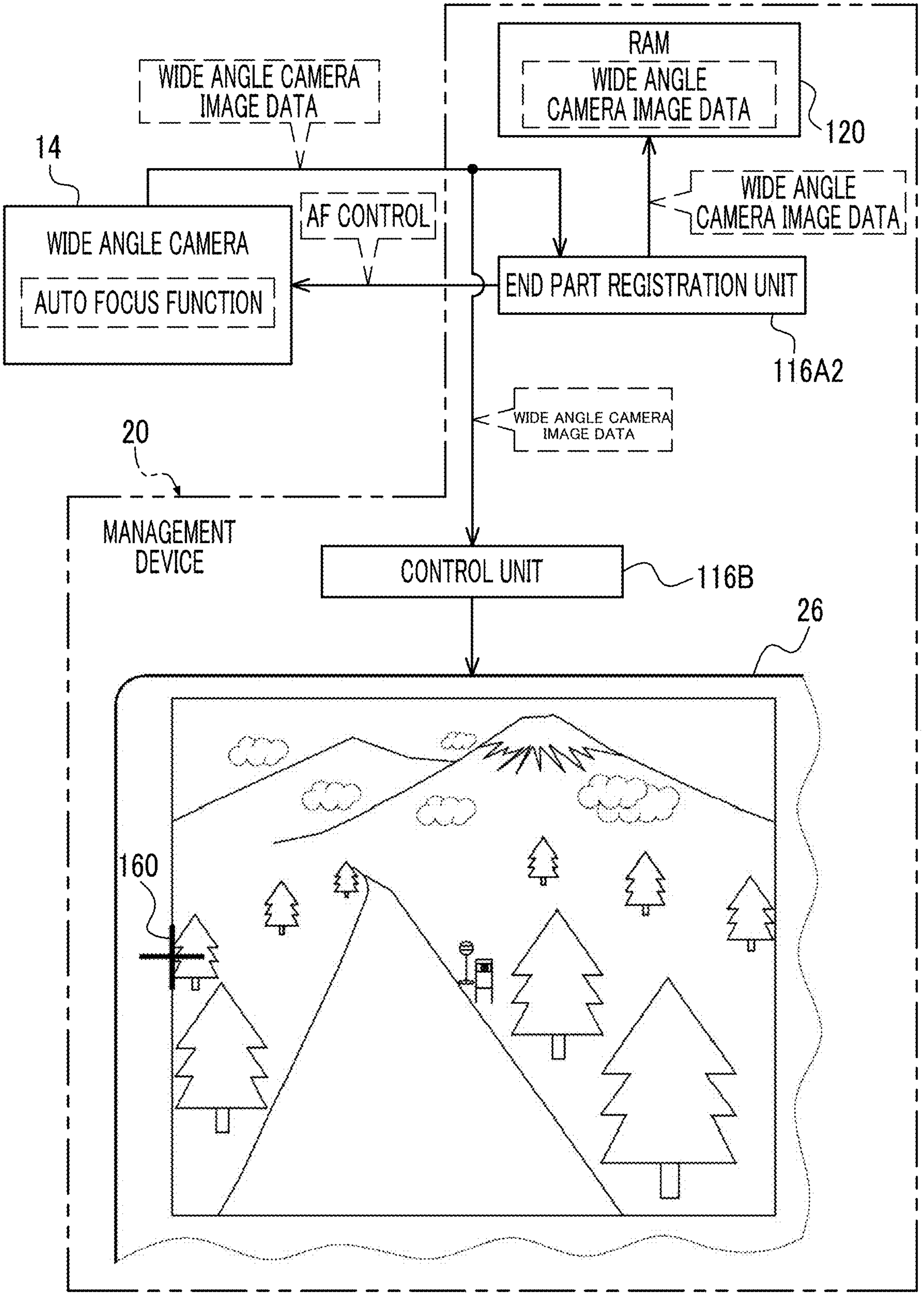
FIG. 13 is a conceptual diagram showing an example of process contents performed by an end part center registration unit on the wide angle camera and the process contents performed by the control unit.

As shown in FIG. 13 as an example, the control unit 116B performs control of displaying the reticle 160 in a superimposed manner on one end of the wide angle camera image in the display 26 (center of the left side in the front view of the wide angle camera image in the display 26 in the example shown in FIG. 13). The end part registration unit 116A2 performs the AF control on the wide angle camera 14. That is, the end part registration unit 116A2 activates the AF function of the wide angle camera 14 to focus on one end of the angle of view of the wide angle camera. Here, one end of the angle of view of the wide angle camera corresponds to one end of the wide angle camera image. Therefore, the display 26 displays the wide angle camera image obtained by imaging with the wide angle camera 14 in a state in which one end of the angle of view of the wide angle camera is in focus.

In addition, the end part registration unit 116A2 stores, in the RAM 120 the wide angle camera image data obtained by imaging with the wide angle camera 14 in a state in which one end of the angle of view of the wide angle camera is in focus. It should be noted that the wide angle camera image data stored in the RAM 120 is updated each time imaging for one frame is performed.

Figure 14:
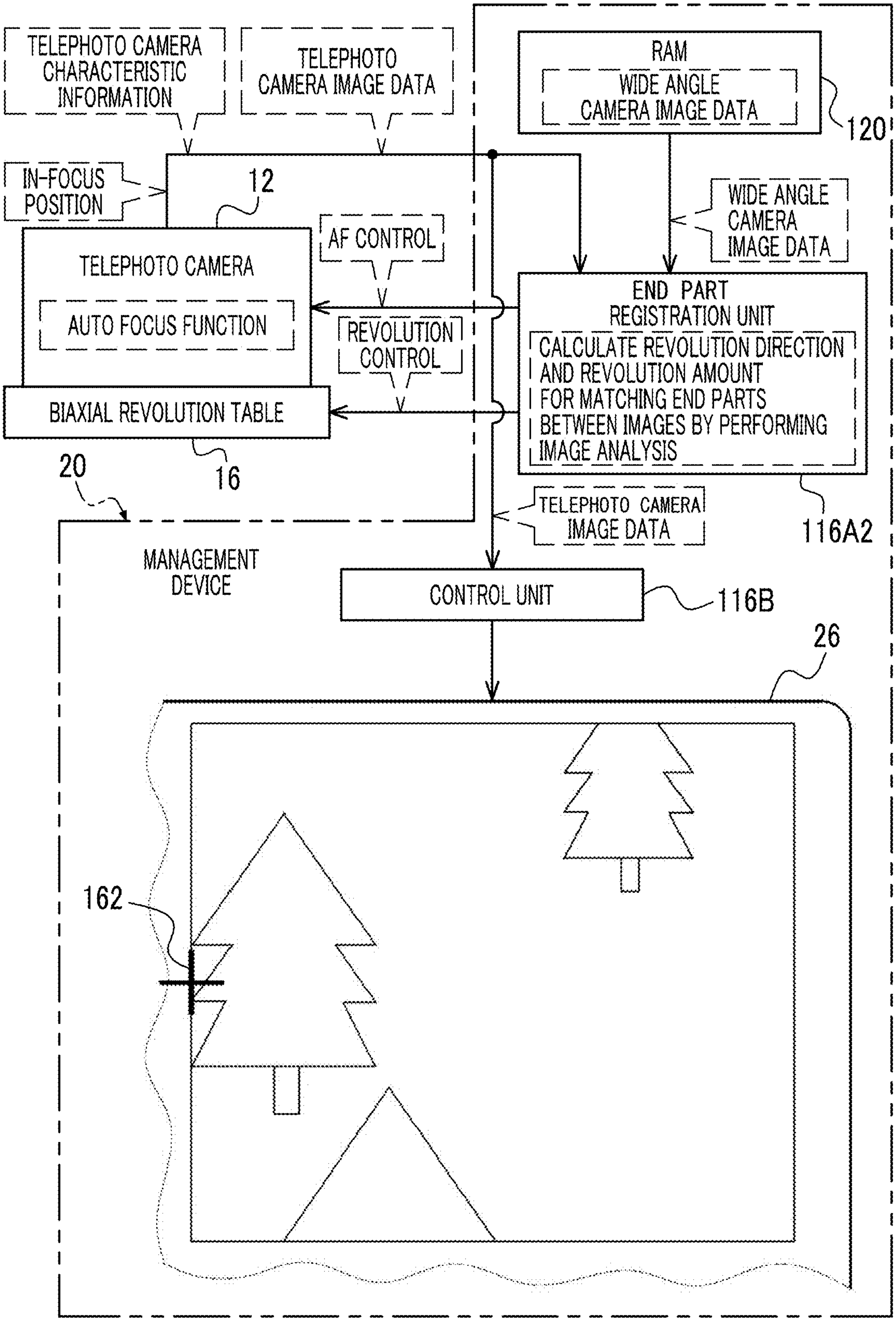
FIG. 14 is a conceptual diagram showing an example of process contents performed by the end part center registration unit on the telephoto camera and the process contents performed by the control unit.

As shown in FIG. 14 as an example, the control unit 116B performs control of displaying the reticle 162 in a superimposed manner on one end of the telephoto camera image in the display 26 (center of the left side in the front view of the telephoto camera image in the display 26 in the example shown in FIG. 14). The end part registration unit 116A2 performs the AF control on the telephoto camera 12. That is, the end part registration unit 116A2 activates the AF function of the telephoto camera 12 to focus on one end of the angle of view of the telephoto camera. Here, one end of the angle of view of the telephoto camera corresponds to one end of the telephoto camera image. Therefore, the display 26 displays the telephoto camera image obtained by imaging with the telephoto camera 12 in a state in which one end of the angle of view of the telephoto camera is in focus.

The end part registration unit 116A2 acquires the telephoto camera image data obtained by imaging with the telephoto camera 12 in a state in which one end of the angle of view of the telephoto camera is in focus, from the telephoto camera 12. In addition, the end part registration unit 116A2 acquires the wide angle camera image data from the RAM 120. Then, the end part registration unit 116A2 performs the registration between one end of the angle of view of the telephoto camera and one end of the angle of view of the wide angle camera by using an image analysis based on the telephoto camera image data acquired from the telephoto camera 12 and the wide angle camera image data acquired from the RAM 120. Here, one end of the angle of view of the telephoto camera is an example of a "first end part of the angle of view of the first imaging apparatus" according to the technology of the present disclosure, and one end of the angle of view of the wide angle camera is an example of a "second end part on an end part side of the angle of view of the first imaging apparatus among both end parts of an angle of view of the second imaging apparatus" according to the technology of the present disclosure.

In a case in which the registration between one end of the angle of view of the telephoto camera and one end of the angle of view of the wide angle camera is performed, first, the end part registration unit 116A2 calculates the revolution direction and the revolution amount of the telephoto camera 12 by performing the image analysis on the telephoto camera image data acquired from the telephoto camera 12 and the wide angle camera image data acquired from the RAM 120. Here, the revolution direction and the revolution amount of the telephoto camera 12 refer to the revolution direction and the revolution amount required for matching the end part of the wide angle camera image with the end part of the telephoto camera image. Specifically, the end part registration unit 116A2 calculates the revolution direction and the revolution amount required for matching the center of one end of the telephoto camera image with the subject positioned at the center of one end of the wide angle camera image (for example, a point image) (for example, to match the center of the reticle 162 shown in FIG. 14 with the center of the reticle 160 shown in FIG. 13), as the revolution direction and the revolution amount of the telephoto camera 12.

Next, the end part registration unit 116A2 performs the revolution control on the biaxial revolution table 16 based on the calculated revolution direction and revolution amount. That is, the end part registration unit 116A2 pans the telephoto camera 12 by operating the biaxial revolution table 16 in the calculated revolution direction and revolution amount.

The end part registration unit 116A2 derives the subject distance by using the AF function of the telephoto camera 12. Therefore, the end part registration unit 116A2 acquires the in-focus position and the telephoto camera characteristic information from the telephoto camera 12. The in-focus position is acquired by the end part registration unit 116A2 each time the AF control is performed.

Figure 15:
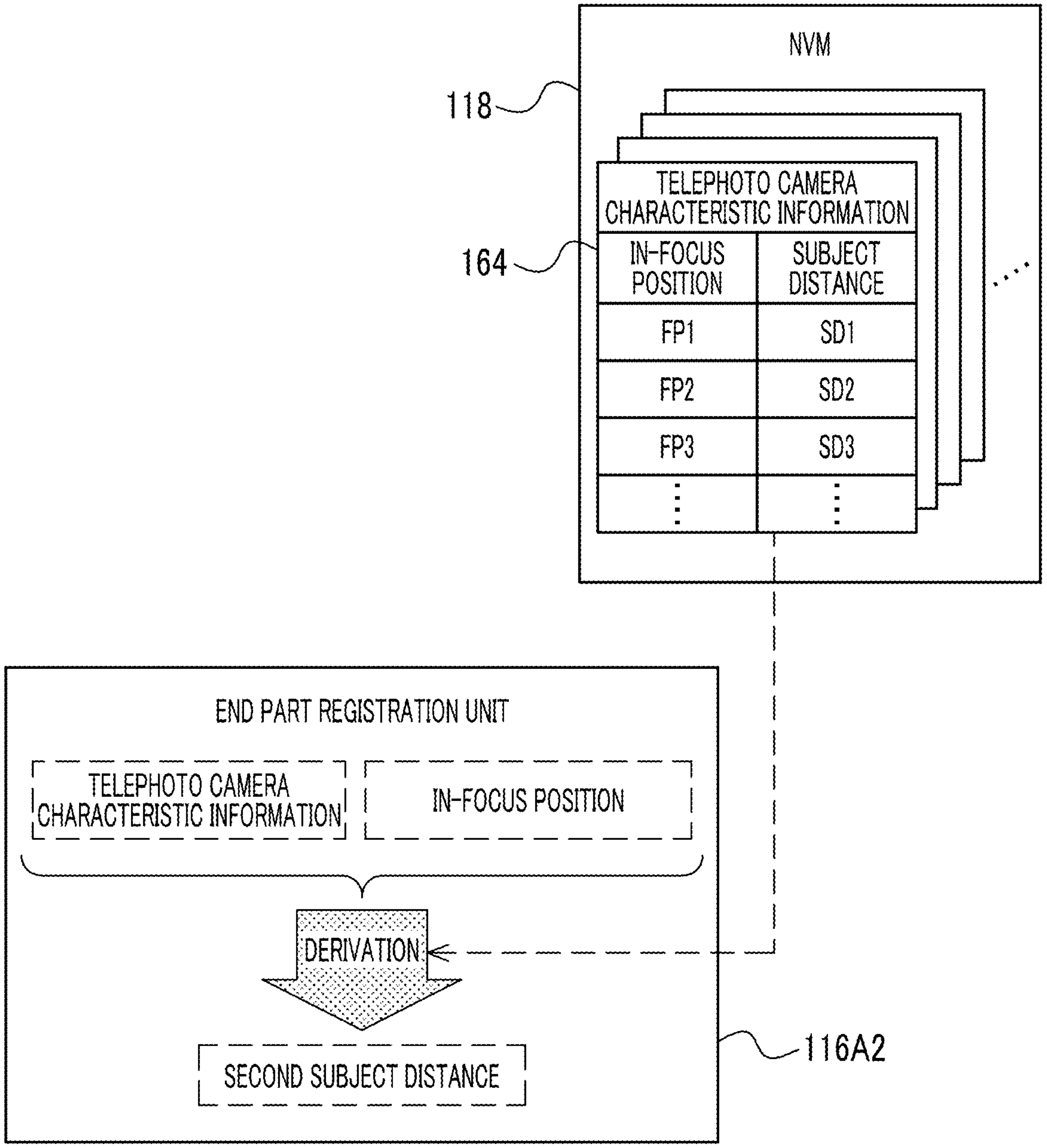
FIG. 15 is a conceptual diagram provided for describing a derivation method of a second subject distance.

As shown in FIG. 15 as an example, the end part registration unit 116A2 acquires the subject distance derivation table 164 corresponding to the telephoto camera characteristic information acquired from the telephoto camera 12 from the NVM 118. Then, the end part registration unit 116A2 derives the subject distance corresponding to the in-focus position acquired from the telephoto camera 12 from the subject distance derivation table 164 acquired from the NVM 118. The subject distance derived by the end part registration unit 116A2 as described above is an example of a "second subject distance" according to the technology of the present disclosure. In addition, in the following, for convenience of description, the subject distance derived by the end part registration unit 116A2 will also be referred to as a "second subject distance". It should be noted that the form example has been described in which the second subject distance is derived from the subject distance derivation table 164, but the technology of the present disclosure is not limited to this, and the second subject distance may be calculated in accordance with an arithmetic expression in which the telephoto camera characteristic information and the in-focus position are independent variables and the second subject distance is a dependent variable.

Figure 16:
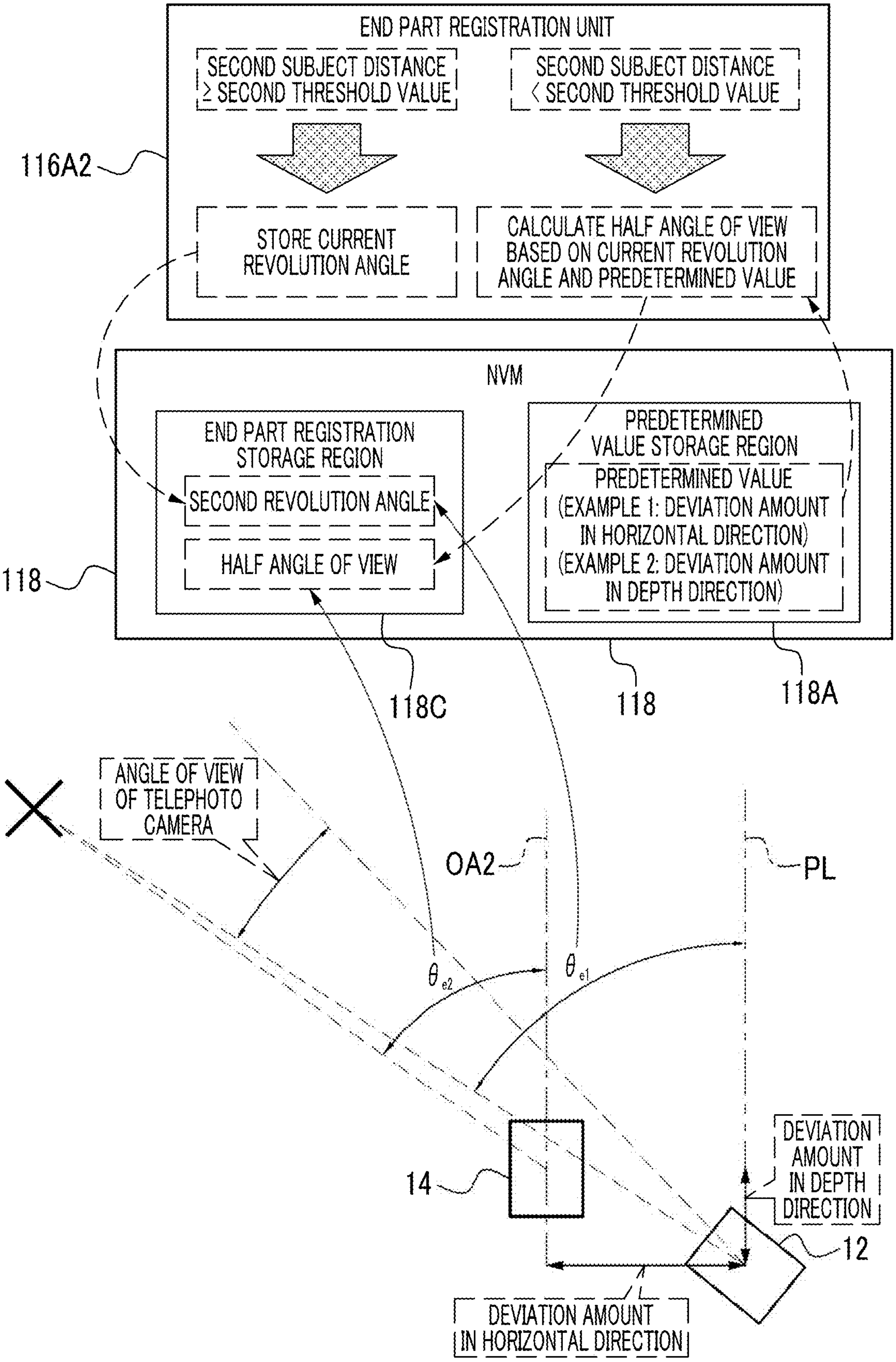
FIG. 16 is a conceptual diagram provided for describing the first revolution angle and a half angle of view.

As shown in FIG. 16 as an example, the NVM 118 is provided with an end part registration storage region 118C. Each of a second revolution angle described below and a half angle of view which is half the angle of view of the wide angle camera (hereinafter, also simply referred to as a "half angle of view") is individually overwritten and stored in the end part registration storage region 118C.

The end part registration unit 116A2 determines whether or not the second subject distance is equal to or more than a second threshold value. Here, the second threshold value is a fixed value that is obtained in advance by test with an actual machine and/or by computer simulation, as the subject distance at which the telephoto camera 12 cannot appropriately image the real space area designated by the user through the wide angle camera image due to the parallax based on the deviation amount in the horizontal direction and the deviation amount in the depth direction. It should be noted that, here, the fixed value is described as the second threshold value, but the technology of the present disclosure is not limited to this, and the second threshold value may be a variable value that is changed by an instruction given from an outside and/or an imaging condition.

In a case in which the second subject distance is equal to or more than the second threshold value, the end part registration unit 116A2 overwrites and stores the current revolution angle in the end part registration storage region 118C. Here, the current revolution angle refers to an angle obtained by adding the revolution angle of the telephoto camera 12 that is revolved by the end part registration unit 116A2 performing the revolution control shown in FIG. 14 on the biaxial revolution table 16 to the first revolution angle (see FIG. 11). In the example shown in FIG. 16, the revolution angle of the telephoto camera 12 is shown as "$\theta_{e1}$".

It should be noted that, in the following, for convenience of description, the revolution angle $\theta_{e1}$ overwritten and stored in the end part registration storage region 118C by the end part registration unit 116A2 is also referred to as the "second revolution angle".

In a case in which the second subject distance is less than the second threshold value, the end part registration unit 116A2 performs the end part registration process. Here, the end part registration process refers to a process of performing the registration between one end of the angle of view of the telephoto camera and one end of the angle of view of the wide angle camera by using the predetermined value.

Here, performing the registration of one end of the angle of view of the telephoto camera and one end of the angle of view of the wide angle camera refers to a process of calculating the half angle of view based on the current revolution angle (revolution angle $\theta_{e1}$ in the example shown in FIG. 16) and the predetermined value and overwriting and storing the calculated half angle of view in the end part registration storage region 118C. That is, the end part registration unit 116A2 calculates the half angle of view by performing the end part registration process, and overwrites and stores the calculated half angle of view in the end part registration storage region 118C.

Figure 17:
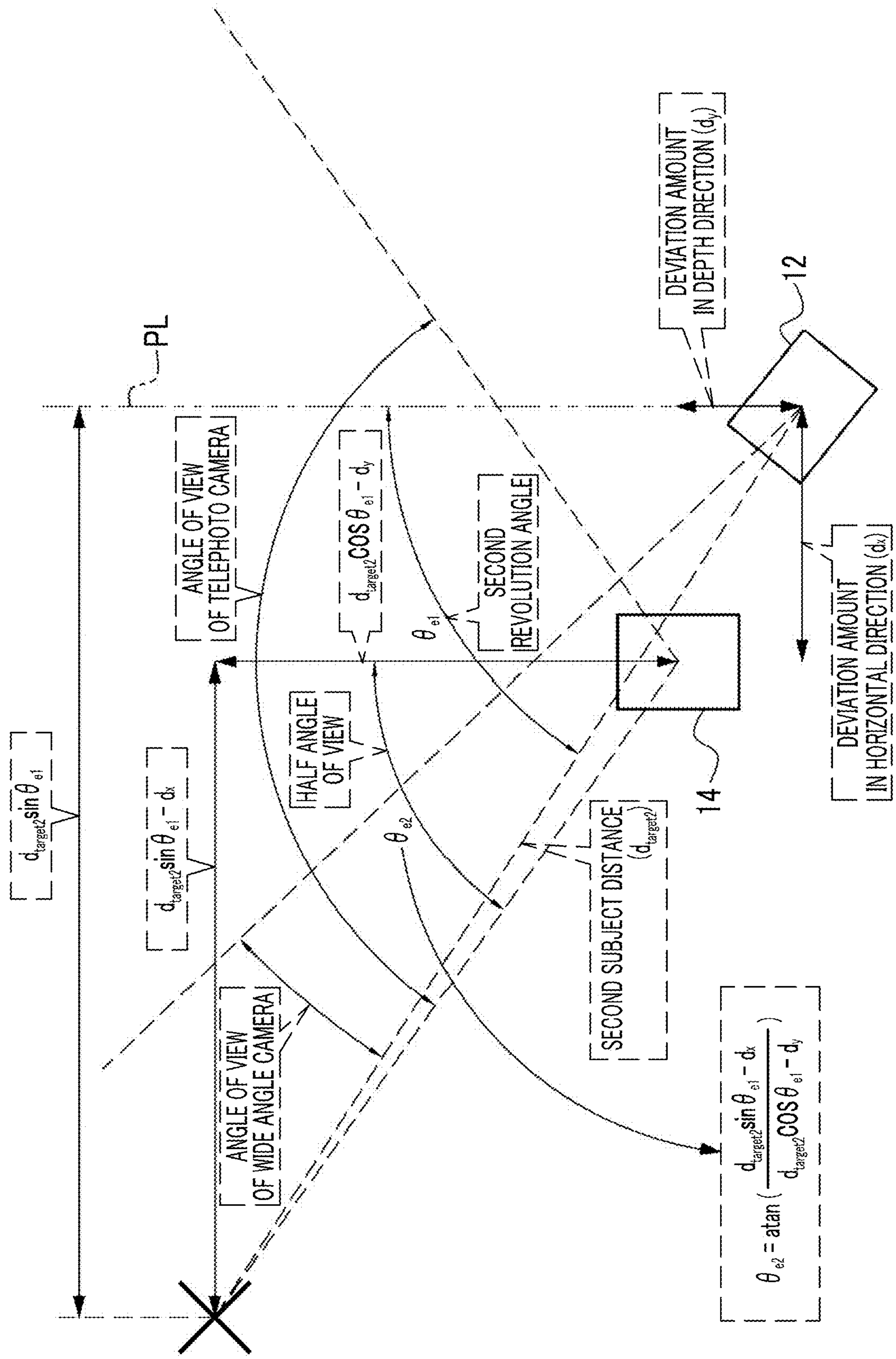
FIG. 17 is a conceptual diagram provided for describing a calculation method of the half angle of view.

As an example, as shown in FIG. 17, in a case in which the second subject distance is "$d_{target2}$", the deviation amount in the horizontal direction is "$d_x$", and the deviation amount in the depth direction is "$d_y$", the half angle of view $\theta_{e2}$ is calculated by the end part registration unit 116A2 from Expression (2). Then, the half angle of view $\theta_{e2}$ calculated by the end part registration unit 116A2 is overwritten and stored in the end part registration storage region 118C. It should be noted that the half angle of view $\theta_{e2}$ and the second revolution angle (revolution angle $\theta_{e1}$) are examples of an "end part registration result obtained by performing registration between a first end part of an angle of view of the first imaging apparatus and a second end part on an end part side of the angle of view of the first imaging apparatus among both end parts of an angle of view of the second imaging apparatus" according to technology of the present disclosure.

$$\theta_{e2} = a\tan\left(\frac{d_{target2}\sin\theta_{e1} - d_x}{d_{target2}\cos\theta_{e1} - d_y}\right) \quad (2)$$

Figure 18:
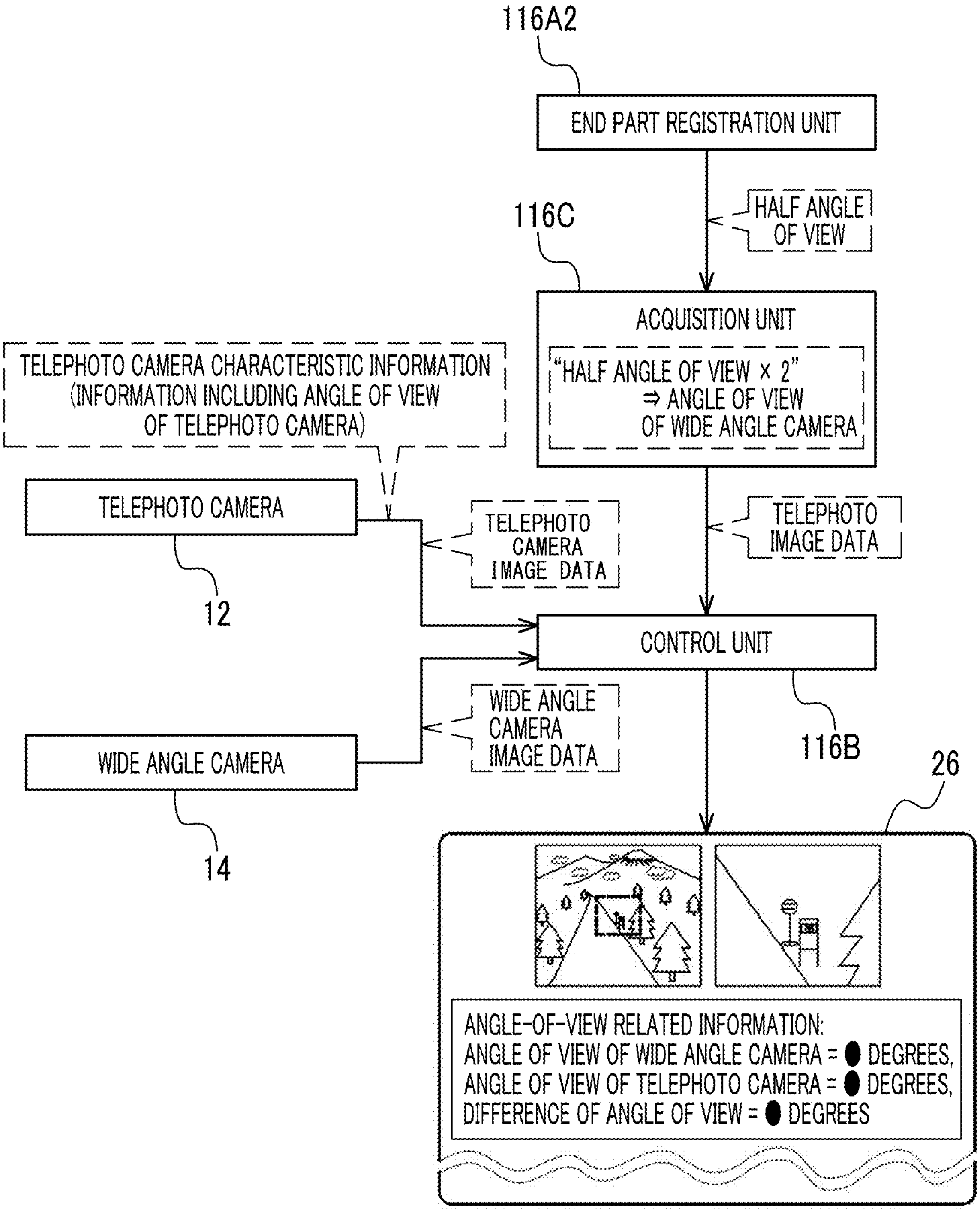
FIG. 18 is a conceptual diagram showing an example of process contents of an acquisition unit and the control unit.

As shown in FIG. 18 as an example, the acquisition unit 116A3 acquires the half angle of view from the end part registration unit 116A2. The half angle of view is an angle derived based on a result obtained by performing the registration between the center of the angle of view of the telephoto camera and the center of the angle of view of the wide angle camera and a result obtained by performing the registration between the end part of the angle of view of the telephoto camera and the end part of the angle of view of the wide angle camera. The acquisition unit 116A3 acquires the angle of view of the wide angle camera based on the half angle of view acquired from the end part registration unit 116A2. That is, the acquisition unit 116A3 calculates the angle of view of the wide angle camera by doubling the half angle of view acquired from the end part registration unit 116A2. It should be noted that the angle of view of the wide angle camera is an example of "angle-of-view related information" according to the technology of the present disclosure.

The control unit 116B displays, on the display 26, the telephoto camera image indicated by the telephoto camera image data and the wide angle camera image indicated by the wide angle camera image data. In addition, the control unit 116B further displays, on the display 26, the angle-of-view related information in a state in which the telephoto camera image and the wide angle camera image are displayed. The control unit 116B acquires the telephoto camera characteristic information from the telephoto camera 12. The telephoto camera characteristic information is information including the angle of view of the telephoto camera. The control unit 116B displays, on the display 26, information including the angle of view of the wide angle camera, the angle of view of the telephoto camera, and a difference between the angle of view of the telephoto camera and the angle of view of the wide angle camera (for example, a value obtained by subtracting the angle of view of the telephoto camera from the angle of view of the wide angle camera) as the angle-of-view related information. In addition, the control unit 116B performs control of displaying a mark (dashed rectangular frame in the example shown in FIG. 18) indicating which region in the wide angle camera image corresponds to the telephoto camera image in a superimposed manner on the wide angle camera image.

Next, an action of a portion of the imaging system 10 according to the technology of the present disclosure will be described with reference to FIGS. 19 to 21. FIG. 19 shows an example of a flow of the registration process executed by the CPU 116 in a case in which a predetermined timing has arrived (for example, in a case in which a predetermined time point has arrived or in a case in which an instruction to start the registration process is given from the outside). It should be noted that the flow of the registration process shown in FIG. 19 is an example of an "operation method of an imaging system" according to the technology of the present disclosure.

Figure 20:
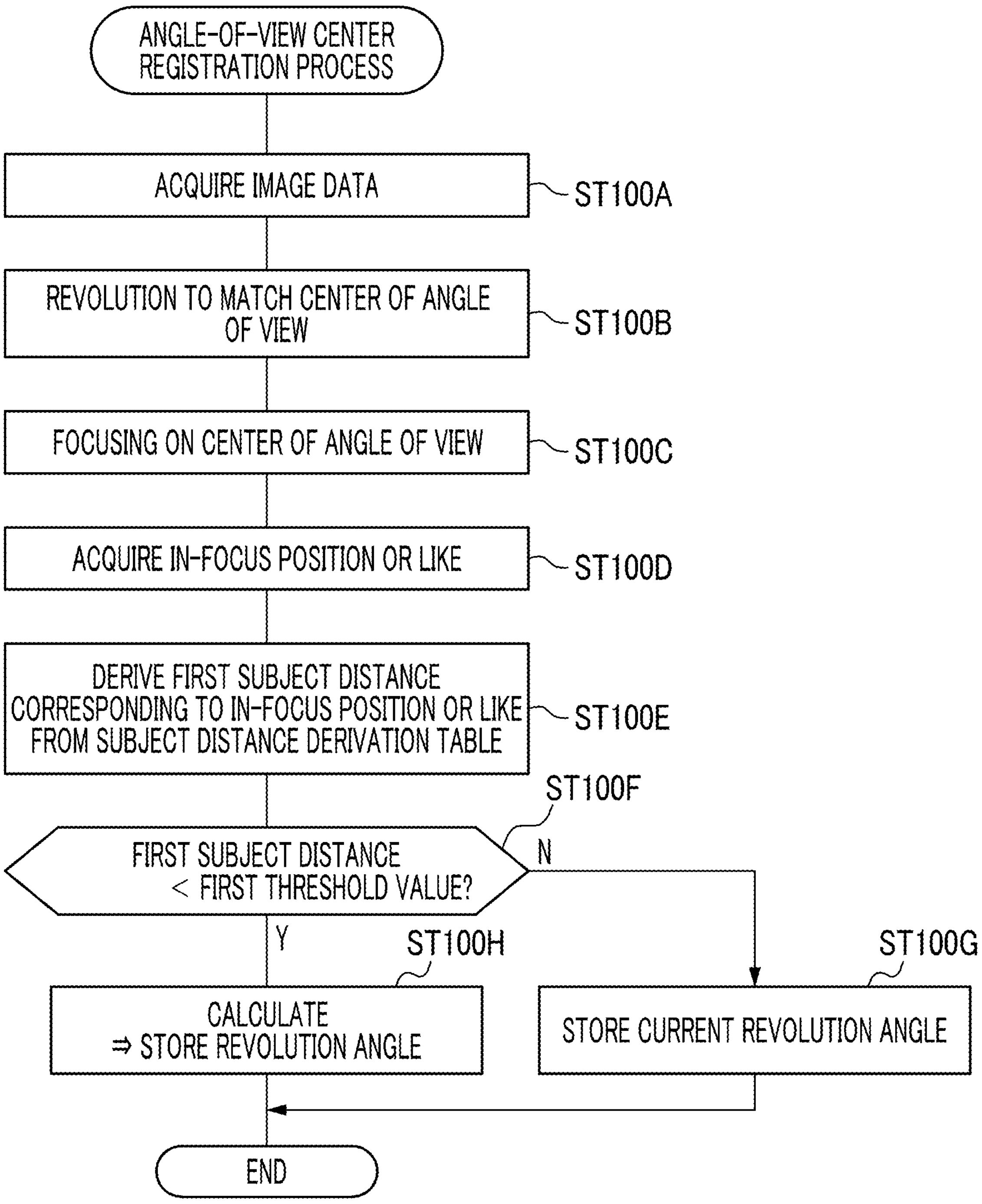
FIG. 20 is a flowchart showing an example of a flow of an angle-of-view center registration process.

In the registration process shown in FIG. 19, first, in step ST100, the angle-of-view center registration unit 116A1 performs the angle-of-view center registration process shown in FIG. 20 as an example.

In the angle-of-view center registration process shown in FIG. 20, first, in step ST100A, the angle-of-view center registration unit 116A1 acquires the telephoto camera image data from the telephoto camera 12 and acquires the wide angle camera image data from the wide angle camera 14.

In next step ST100B, the angle-of-view center registration unit 116A1 performs the image analysis on the telephoto camera image data and the wide angle camera image data acquired in step ST100A, thereby revolving the telephoto camera 12 such that the center of the angle of view of the telephoto camera is matched with the center of the angle of view of the wide angle camera.

In next step ST100C, the angle-of-view center registration unit 116A1 performs the AF control on the telephoto camera 12 to focus on the center of the angle of view of the telephoto camera.

In next step ST100D, the angle-of-view center registration unit 116A1 acquires the in-focus position and the telephoto camera characteristic information from the telephoto camera 12.

In next step ST100E, the angle-of-view center registration unit 116A1 acquires the subject distance derivation table 164 corresponding to the telephoto camera characteristic information acquired in the step ST100D from the NVM 118. Then, the angle-of-view center registration unit 116A1 derives the subject distance corresponding to the in-focus position acquired in step ST100D from the subject distance derivation table 164 acquired from the NVM 118 as the first subject distance.

In next step ST100F, the angle-of-view center registration unit 116A1 determines whether or not the first subject distance derived in step ST100E is less than the first threshold value. In step ST100F, in a case in which the first subject distance is equal to or more than the first threshold value, a negative determination is made, and the angle-of-view center registration process proceeds to step ST100G. In step ST100F, in a case in which the first subject distance is less than the first threshold value, a positive determination is made, and the angle-of-view center registration process proceeds to step ST100H.

In step ST100G, the angle-of-view center registration unit 116A1 overwrites and stores the current revolution angle as the first revolution angle in the angle-of-view center registration storage region 118B, and then the angle-of-view center registration process ends.

In step ST100H, the angle-of-view center registration unit 116A1 calculates the first revolution angle in accordance with Expression (1) from the predetermined value stored in the predetermined value storage region 118A and the first subject distance derived in step ST100E. Then, the angle-of-view center registration unit 116A1 overwrites and stores the calculated first revolution angle in the angle-of-view center registration storage region 118B, and then the angle-of-view center registration process ends.

Figure 21:
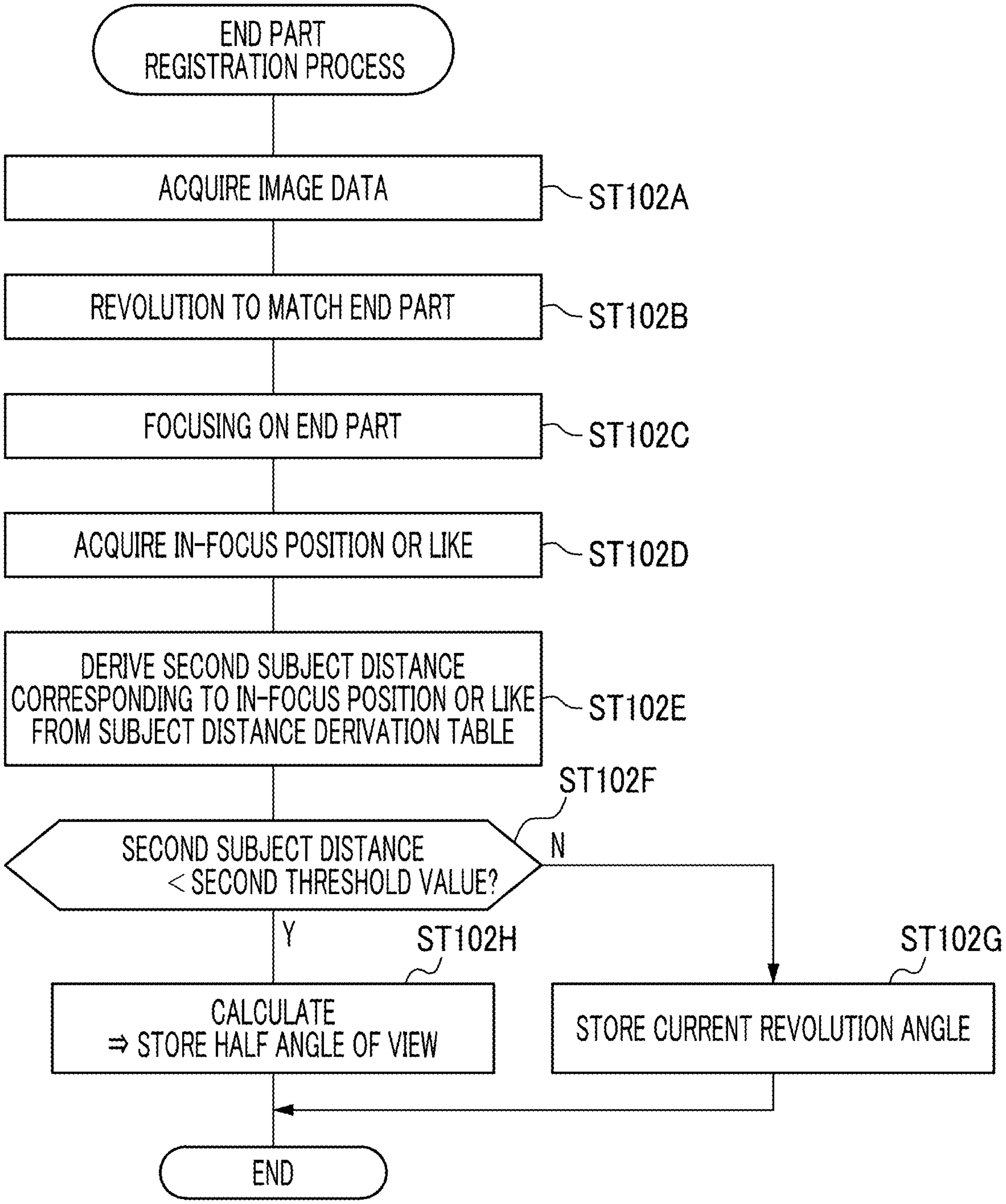
FIG. 21 is a flowchart showing an example of a flow of an end part registration process.

In step ST102 shown in FIG. 19, the end part registration unit 116A2 executes the end part registration process shown in FIG. 21 as an example.

In the end part registration process shown in FIG. 21, first, in step ST102A, the end part registration unit 116A2 acquires the telephoto camera image data from the telephoto camera 12 and acquires the wide angle camera image data from the wide angle camera 14.

In next step ST102B, the end part registration unit 116A2 performs the image analysis on the telephoto camera image data and the wide angle camera image data acquired in step ST102A, thereby revolving the telephoto camera 12 such that the end part of the angle of view of the wide angle camera (for example, one end of the angle of view of the wide angle camera) is matched with the end part of the angle of view of the telephoto camera (for example, one end of the angle of view of the telephoto camera).

In next step ST102C, the end part registration unit 116A2 performs the AF control on the telephoto camera 12 to focus on the end part of the angle of view of the telephoto camera.

In next step ST102D, the end part registration unit 116A2 acquires the in-focus position and the telephoto camera characteristic information from the telephoto camera 12.

In next step ST102E, the end part registration unit 116A2 acquires the subject distance derivation table 164 corresponding to the telephoto camera characteristic information acquired in the step ST102D from the NVM 118. Then, the end part registration unit 116A2 derives the subject distance corresponding to the in-focus position acquired in step ST102D from the subject distance derivation table 164 acquired from the NVM 118 as the second subject distance.

In next step ST102F, the end part registration unit 116A2 determines whether or not the second subject distance derived in step ST102E is less than the second threshold value. In step ST102F, in a case in which the second subject distance is equal to or more than the second threshold value, a negative determination is made, and the end part registration process proceeds to step ST102G. In step ST102F, in a case in which the second subject distance is less than the second threshold value, a positive determination is made, and the end part registration process proceeds to step ST102H.

In step ST102G, the end part registration unit 116A2 overwrites and stores the current revolution angle as the second revolution angle in the end part registration storage region 118C, and then the end part registration process ends.

In step ST102H, the end part registration unit 116A2 calculates the half angle of view in accordance with Expression (2) from the predetermined value stored in the predetermined value storage region 118A, the first revolution angle stored in the angle-of-view center registration storage region 118B, and the first subject distance derived in step ST100E. Then, the end part registration unit 116A2 overwrites and stores the calculated half angle of view in the end part registration storage region 118C, and then the end part registration process ends.

In step ST104 shown in FIG. 19, the acquisition unit 116C determines whether or not the half angle of view is calculated by executing the end part registration process. In step ST104, in a case in which the half angle of view is not calculated by executing the end part registration process, a negative determination is made, and the registration process ends. In a case in which the half angle of view is calculated by executing the end part registration process in step ST104, a positive determination is made, and the end part registration process proceeds to step ST106.

In step ST106, the acquisition unit 116C calculates the angle of view of the wide angle camera based on the half angle of view calculated by executing the end part registration process. Then, the control unit 116B acquires the angle-of-view related information including the angle of view of the wide angle camera calculated by the acquisition unit 116C and displays the acquired angle-of-view related information on the display 26, and then the registration process ends.

As described above, in the imaging system 10, the registration between the telephoto camera image obtained by imaging with the telephoto camera 12 and the wide angle camera image obtained by imaging with the wide angle camera 14 is performed in two locations of the center of the angle of view used for imaging with the imaging system 10 and the end part of the angle of view. Then, based on the registration result, the angle-of-view related information is acquired as the information related to the angle of view used for imaging with the imaging system 10. Therefore, with the present configuration, it is possible to obtain the information related to the angle of view (for example, an angle of view of the wide angle camera) required for a case in which the telephoto camera 12 and the wide angle camera 14 are used in cooperation with each other.

In addition, in the imaging system 10, the angle of view of the wide angle camera is acquired based on the angle-of-view center registration result obtained by performing the registration between the center of the angle of view of the telephoto camera and the center of the angle of view of the wide angle camera, and the end part registration result obtained by performing the registration between one end of the angle of view of the telephoto camera and one end of the angle of view of the wide angle camera. Therefore, with the present configuration, even in a case in which the angle of view of the wide angle camera is an unknown angle of view, the angle of view of the wide angle camera can be specified.

In addition, in the imaging system 10, the first revolution angle is calculated based on the deviation amount in the horizontal direction, and the half angle of view is calculated based on the deviation amount in the horizontal direction and the deviation amount in the depth direction. Therefore, with the present configuration, it is possible to realize the registration between the center of the angle of view of the telephoto camera and the center of the angle of view of the wide angle camera with higher accuracy and the registration between the end part of the angle of view of the telephoto camera and the end part of the angle of view of the wide angle camera with higher accuracy than in a case in which neither the deviation amount in the horizontal direction and the deviation amount in the depth direction is used. In addition, even in a case in which the positions of the telephoto camera 12 and the wide angle camera 14 are deviated from each other, it is possible to obtain the information related to the angle of view required in a case in which the telephoto camera 12 and the wide angle camera 14 are used in cooperation with each other.

In addition, in the imaging system 10, the angle-of-view center registration process is performed by using the deviation amount in the horizontal direction in a case in which the first subject distance is less than the first threshold value, and the end part registration process is performed by using the deviation amount in the horizontal direction and the deviation amount in the depth direction in a case in which the second subject distance is less than the second threshold value. Therefore, with the present configuration, even in a case in which it is more likely to be affected by the parallax due to the reduction of the subject distance, the information related to the angle of view required in a case in which the telephoto camera 12 and the wide angle camera 14 are used in cooperation with each other can be obtained.

In addition, in the imaging system 10, the first subject distance is derived by the angle-of-view center registration unit 116A1, and the second subject distance is derived by the end part registration unit 116A2. Therefore, with the present configuration, the subject distance used for the registration can be obtained more quickly than in a case in which the operation of giving the subject distance to the imaging system 10 is performed by the user.

In addition, in the imaging system 10, the angle-of-view center registration process (process of step ST100 shown in FIG. 19) is performed, and then the end part registration process (process of step ST102 shown in FIG. 19) is performed. Therefore, with the present configuration, as the information related to the angle of view required in a case in which the telephoto camera 12 and the wide angle camera 14 are used in cooperation with each other, the information having higher accuracy can be obtained than in a case in which the end part registration process is performed without performing the angle-of-view center registration process (see step ST100 and step ST102).

In addition, in the imaging system 10, the angle-of-view center registration process and the end part registration process are performed by using the image analysis based on the telephoto camera image and the wide angle camera image. Therefore, with the present configuration, the registration can be performed with higher accuracy than in a case in which the processes corresponding to the angle-of-view center registration process and the end part registration process are manually performed. It should be noted that any of the angle-of-view center registration process or the end part registration process may be performed by using the image analysis based on the telephoto camera image and the wide angle camera image.

In addition, in the imaging system 10, the optical information related to the imaging optical system 38 of the telephoto camera 12 is known, and the optical information related to the imaging optical system 72 of the wide angle camera 14 is unknown. Therefore, with the present configuration, the angle of view of the wide angle camera can be specified even in a case in which the optical information related to the imaging optical system 72 of the wide angle camera 14 is unknown.

Further, in the imaging system 10, the focal length of the imaging optical system 38 of the telephoto camera 12 is at least twice the focal length of the imaging optical system 72 of the wide angle camera 14. Therefore, with the present configuration, even in a case in which the focal length of the imaging optical system 38 of the telephoto camera 12 is at least twice the focal length of the imaging optical system 72 of the wide angle camera 14, the information related to the angle of view required in a case in which the telephoto camera 12 and the wide angle camera 14 are used in cooperation with each other can be obtained.

It should be noted that, in the embodiment described above, in the end part registration process, the registration between one end of the angle of view of the telephoto camera and one end of the angle of view of the wide angle camera is performed by the end part registration unit 116A2, but the technology of the present disclosure is not limited to this, and the end part registration unit 116A2 may perform an opposite side end part registration process in addition to the registration between one end of the angle of view of the telephoto camera and one end of the angle of view of the wide angle camera. The opposite side end part registration process refers to a process of performing the registration between the other end of the angle of view of the telephoto camera and the other end of the angle of view of the wide angle camera. Here, the other end of the angle of view of the telephoto camera is an example of a "first opposite side end part positioned on an opposite side to the first end part among both end parts of the angle of view of the first imaging apparatus" according to the technology of the present disclosure, and the other end of the angle of view of the wide angle camera is an example of a "second opposite side end part positioned on an opposite side to the second end part among both end parts of the angle of view of the second imaging apparatus" according to the technology of the present disclosure.

In this way, in a case in which the end part registration process and the opposite side end part registration process are performed by the end part registration unit 116A2, the acquisition unit 116C need only acquire the angle of view of the wide angle camera based on a first result (for example, one half angle of view of the wide angle camera 14) obtained by performing the registration between one end of the angle of view of the telephoto camera and one end of the angle of view of the wide angle camera in the end part registration process and a second result (for example, the other half angle of view of the wide angle camera 14) obtained by performing the registration between the other end of the angle of view of the telephoto camera and the other end of the angle of view of the wide angle camera in the opposite side end part registration process.

Figure 22A:
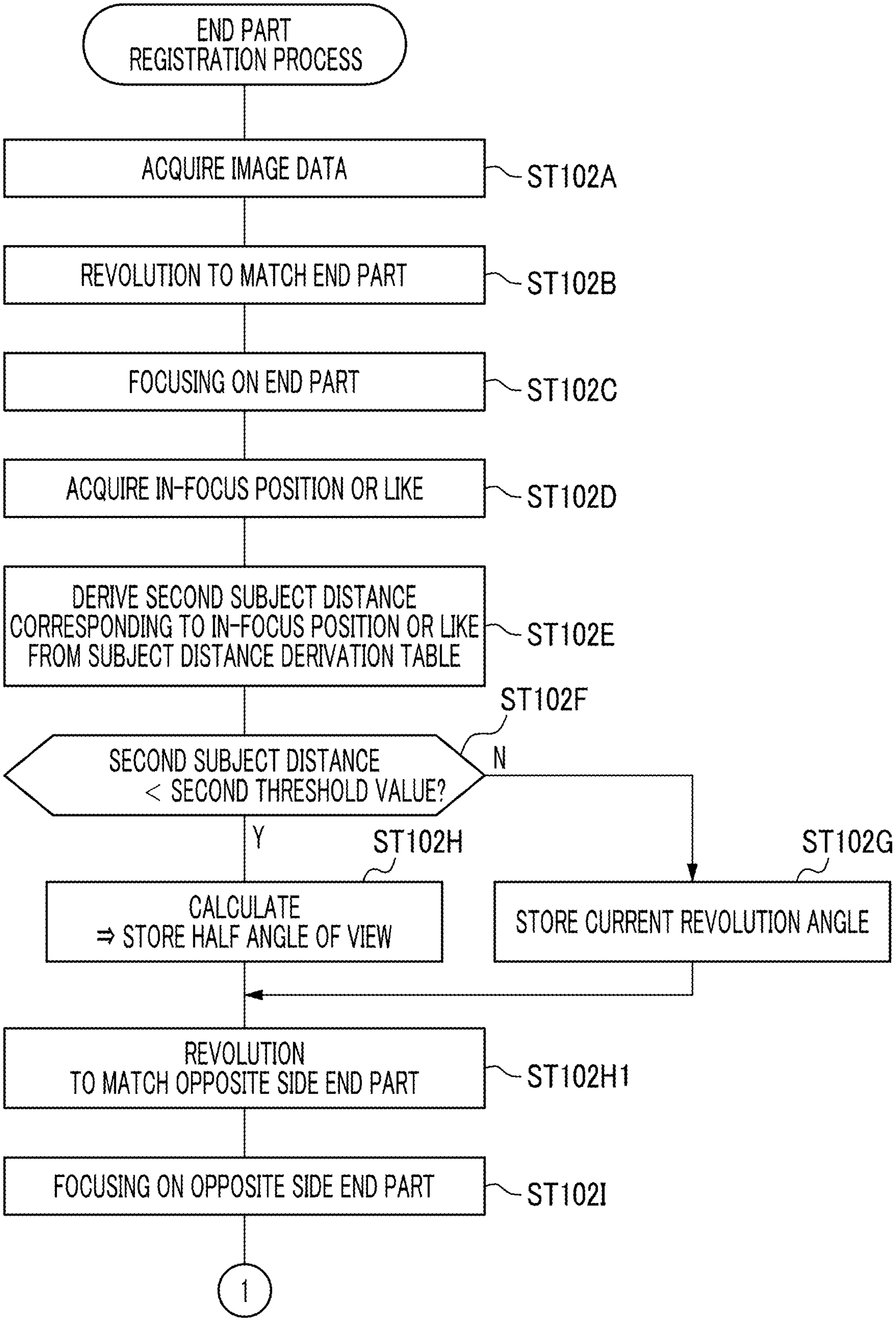
FIG. 22A is a flowchart showing a first modification example of the flow of the end part registration process.
Figure 22B:
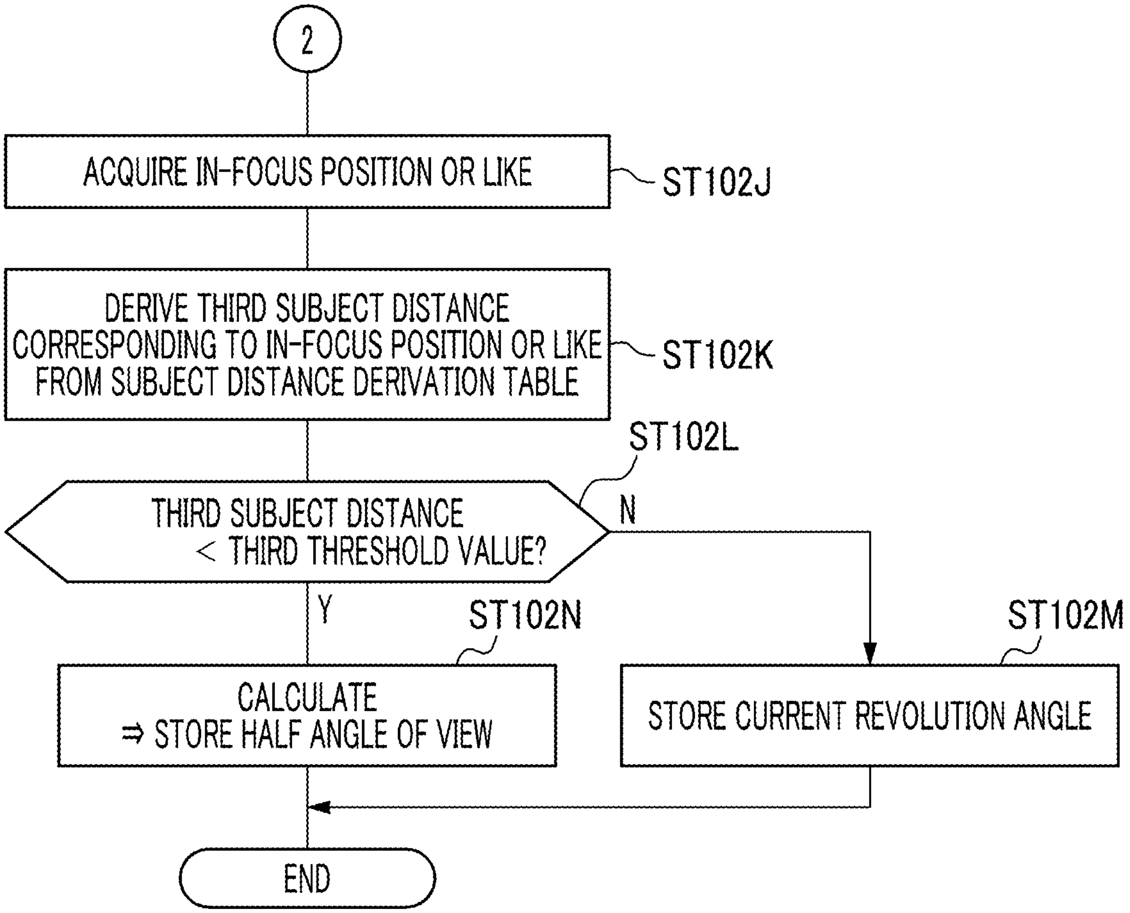
FIG. 22B is a continuation of the flowchart shown in FIG. 22A.

In this case, for example, the end part registration process shown in FIGS. 22A and 22B is executed by the CPU 116. Since the flowcharts shown in FIGS. 22A and 22B are different from the flowchart shown in FIG. 21 only in that step ST102H to step ST102N are provided, steps different from the flowchart shown in FIG. 21 will be described below.

In step ST102H1 shown in FIG. 22A, the end part registration unit 116A2 performs the image analysis on the telephoto camera image data and the wide angle camera image data acquired in step ST102A, thereby revolving the telephoto camera 12 such that an opposite side end part of the angle of view of the wide angle camera (for example, the other end of the angle of view of the wide angle camera) is matched with an opposite side end part of the angle of view of the telephoto camera (for example, the other end of the angle of view of the telephoto camera).

In next step ST102I, the end part registration unit 116A2 performs the AF control on the telephoto camera 12 to focus on the opposite side end part of the angle of view of the telephoto camera.

In next step ST102J, the end part registration unit 116A2 acquires the in-focus position and the telephoto camera characteristic information from the telephoto camera 12.

In next step ST102K, the end part registration unit 116A2 acquires the subject distance derivation table 164 corresponding to the telephoto camera characteristic information acquired in the step ST102J from the NVM 118. Then, the end part registration unit 116A2 derives the subject distance corresponding to the in-focus position acquired in step ST102J from the subject distance derivation table 164 acquired from the NVM 118 as a third subject distance. It should be noted that the form example has been described in which the third subject distance is derived from the subject distance derivation table 164, but the technology of the present disclosure is not limited to this, and the third subject distance may be calculated in accordance with an arithmetic expression in which the telephoto camera characteristic information and the in-focus position are independent variables and the third subject distance is a dependent variable.

In next step ST102L, the end part registration unit 116A2 determines whether or not the third subject distance derived in step ST102K is less than a third threshold value. The third threshold value need only be, for example, the same value as the second threshold value described above. In step ST102L, in a case in which the third subject distance is equal to or more than the third threshold value, a negative determination is made, and the end part registration process proceeds to step ST102M. In step ST102L, in a case in which the third subject distance is less than the third threshold value, a positive determination is made, and the end part registration process proceeds to step ST102N.

In step ST102M, the end part registration unit 116A2 overwrites and stores the current revolution angle as the third revolution angle in the end part registration storage region 118C, and then the end part registration process ends.

In step ST102N, the end part registration unit 116A2 calculates the half angle of view in accordance with Expression (2) from the predetermined value stored in the predetermined value storage region 118A, the first revolution angle stored in the angle-of-view center registration storage region 118B, and the third subject distance derived in step ST100K. Here, the half angle of view refers to a half angle of view which is paired with the half angle of view calculated in step ST102H. That is, the half angle of view calculated in step ST102H is one half angle of view of the wide angle camera 14, whereas the half angle of view calculated in step ST102N is the other half angle of view of the wide angle camera 14. It should be noted that the half angle of view calculated in step ST102H is an example of a "first result" according to the technology of the present disclosure, and the half angle of view calculated in step ST102N is an example of a "second result" according to the technology of the present disclosure.

Then, in step ST102N, the end part registration unit 116A2 overwrites and stores the calculated half angle of view in the end part registration storage region 118C, and then the end part registration process ends.

In this way, one half angle of view of the wide angle camera 14 and the other half angle of view of the wide angle camera 14 are calculated by performing the end part registration process shown in FIGS. 22A and 22B, so that the acquisition unit 116C need only acquire the angle of view of the wide angle camera by calculating the sum of one half angle of view of the wide angle camera 14 and the other half angle of view of the wide angle camera 14. As a result, even in a case in which the angle of view of the wide angle camera is an unknown angle of view, the angle of view of the wide angle camera can be specified.

Figure 23:
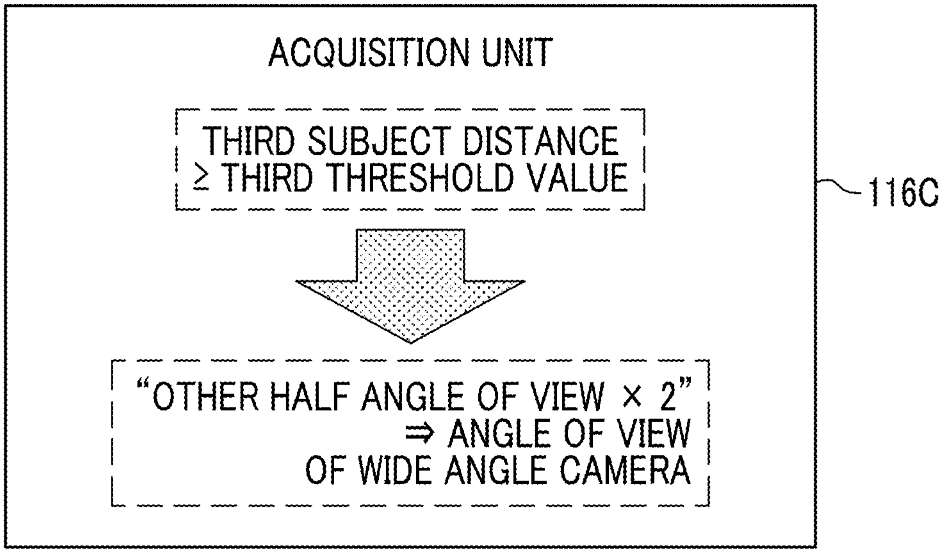
FIG. 23 is a conceptual diagram showing a modification example of the process contents of the acquisition unit.

It should be noted that, here, the acquisition unit 116C calculates the sum of one half angle of view of the wide angle camera 14 and the other half angle of view of the wide angle camera 14, but the technology of the present disclosure is not limited to this. For example, the end part registration unit 116A2 may calculate the other half angle of view of the wide angle camera 14 in a case in which the position of the other end of the angle of view of the telephoto camera is matched with the position of the other end of the angle of view of the wide angle camera under the condition that the third subject distance is equal to or more than the third threshold value, as shown in FIG. 23 as an example, the acquisition unit 116C may acquire the angle of view of the wide angle camera based only on the other half angle of view of the wide angle camera 14. Here, "acquiring an angle of view of the wide angle camera based only on the other half angle of view of the wide angle camera 14" means that, for example, a value obtained by doubling the other half angle of view of the wide angle camera 14 is acquired as the angle of view of the wide angle camera.

The reason why the acquisition unit 116C acquires the angle of view of the wide angle camera based only on the other half angle of view of the wide angle camera 14 in this way is that, under the premise that "second threshold value=third threshold value", the other half angle of view of the wide angle camera 14 in a case in which the position of the other end of the angle of view of the telephoto camera is matched with the position of the other end of the angle of view of the wide angle camera under the condition that the third subject distance is equal to or more than the third threshold value has higher accuracy than one half angle of view of the wide angle camera 14 in a case in which the position of one end of the angle of view of the telephoto camera is matched with the position of one end of the angle of view of the wide angle camera under the condition that the second subject distance is less than the second threshold value. That is, the reason of the above is that the third subject distance is longer than the second subject distance, and the other half angle of view of the wide angle camera 14 is less likely to be affected by the parallax caused by the deviation between the telephoto camera 12 and the wide angle camera 14 than one half angle of view of the wide angle camera 14. Therefore, with the present configuration, the angle of view having higher accuracy can be specified as the angle of view of the wide angle camera than in a case in which the angle of view of the wide angle camera is calculated based only on one half angle of view of the wide angle camera 14 in a case in which the position of the other end of the angle of view of the telephoto camera is matched with the position of the other end of the angle of view of the wide angle camera under the condition that the third subject distance is equal to or more than the third threshold value.

In the embodiment described above, the form example is described in which the end part registration process is performed without considering the scale ratio between the telephoto camera image and the wide angle camera image, but the technology of the present disclosure is not limited to this, and the end part registration unit 116A2 may perform, in the end part registration process, the registration between one end of the angle of view of the telephoto camera and one end of the angle of view of the wide angle camera based on the scale ratio between the telephoto camera image and the wide angle camera image used in the image analysis in the angle-of-view center registration process.

Figure 24:
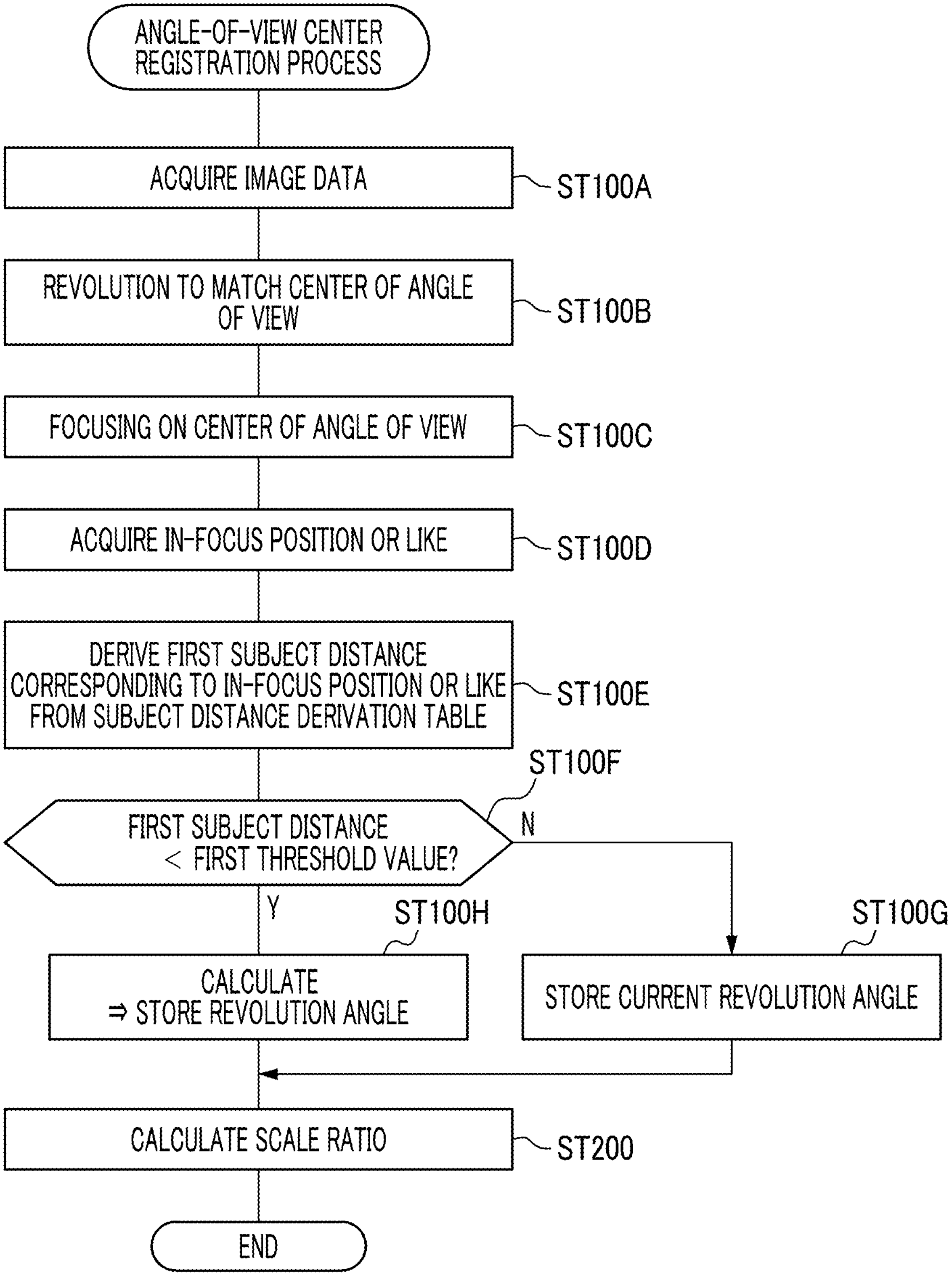
FIG. 24 is a flowchart showing a first modification example of the flow of the angle-of-view center registration process.
Figure 25:
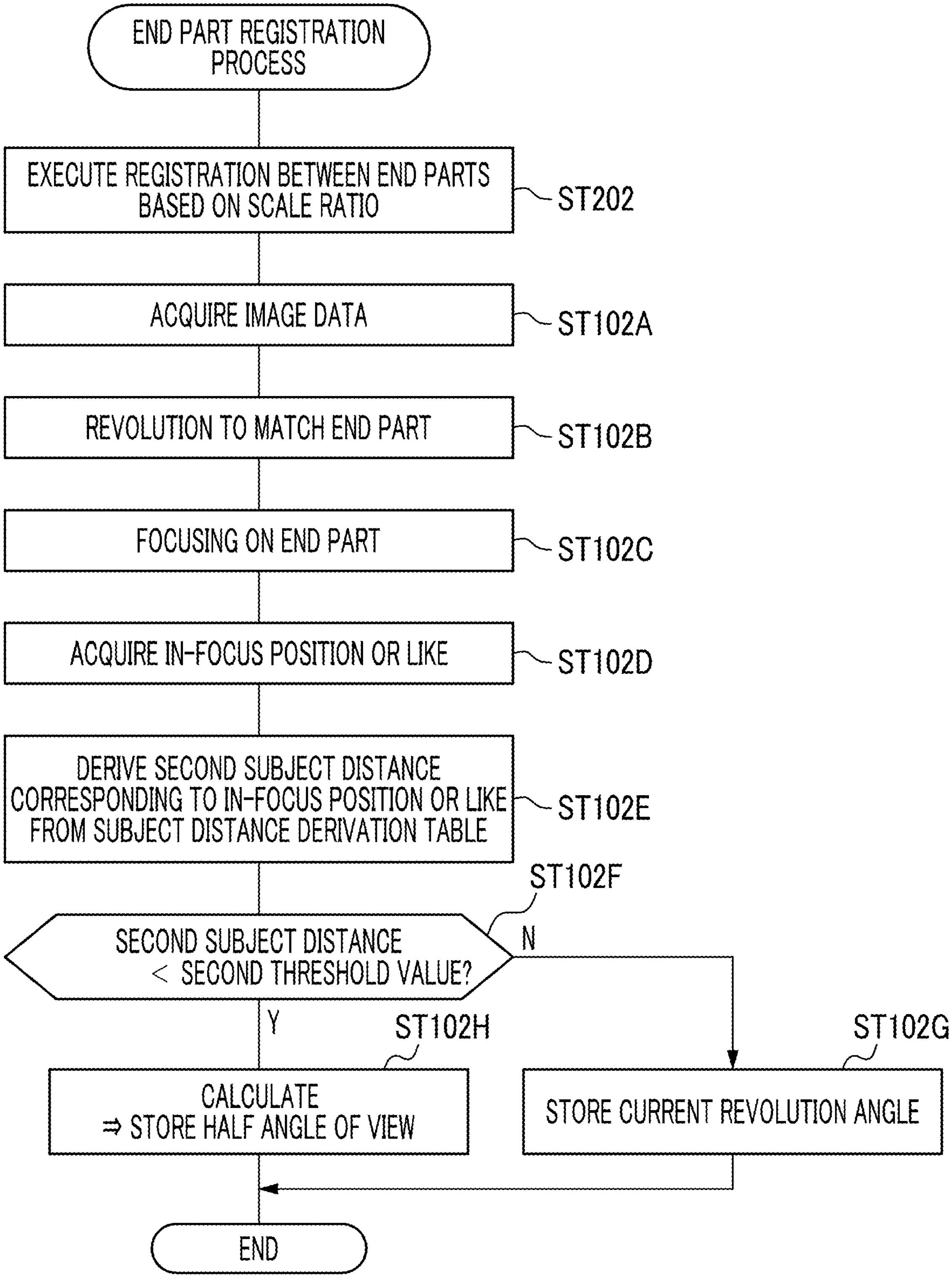
FIG. 25 is a flowchart showing a second modification example of the flow of the end part registration process.

In this case, the angle-of-view center registration process shown in FIG. 24 is executed by the CPU 116, and the end part registration process shown in FIG. 25 is executed by the CPU 116. Since the flowchart shown in FIG. 24 is different from the flowchart shown in FIG. 20 in that step ST200 is provided, and the flowchart shown in FIG. 25 is different from the flowchart shown in FIG. 21 in that step ST202 is provided, steps different from the flowcharts shown in FIGS. 20 and 21 will be described.

In step ST200 shown in FIG. 24, the angle-of-view center registration unit 116A1 calculates the scale ratio between the telephoto camera image and the wide angle camera image based on the telephoto camera image data and the wide angle camera image data acquired in step ST100A. Here, the scale ratio refers to, for example, a ratio of an area of an image region in the wide angle camera image to an area of the image region in the telephoto camera image for a specific subject included in the imaging target region (see FIG. 7).

In step ST202 shown in FIG. 25, the end part registration unit 116A2 executes the registration between one end of the angle of view of the telephoto camera and one end of the angle of view of the wide angle camera based on the scale ratio calculated in step ST200 shown in FIG. 24. In this case, for example, the end part registration unit 116A2 calculates the revolution angle of the telephoto camera 12 in accordance with a revolution angle arithmetic expression in which the scale ratio is an independent variable and the revolution angle of the telephoto camera 12 is a dependent variable, and revolves the telephoto camera 12 by the calculated revolution angle. As a result, before the process of step ST102B is executed, one end of the angle of view of the telephoto camera can be brought close to or matched with one end of the angle of view of the wide angle camera, and as a result, a time required for the end part registration process can be made shorter than in a case in which the scale ratio is not used.

In the embodiment described above, the description is made on the premise that the derivation of the first subject distance using the AF function is successful in the angle-of-view center registration process, but the technology of the present disclosure is not limited to this. For example, in a case in which the derivation of the first subject distance using the AF function has failed, the angle-of-view center registration unit 116A1 may derive the first subject distance by using the AF function by controlling the biaxial revolution table 16 based on the telephoto camera image to match the center of the angle of view of the telephoto camera with the subject having high contrast (hereinafter, also referred to as a "high-contrast subject") in the vicinity of the center of the angle of view of the telephoto camera.

Figure 26:
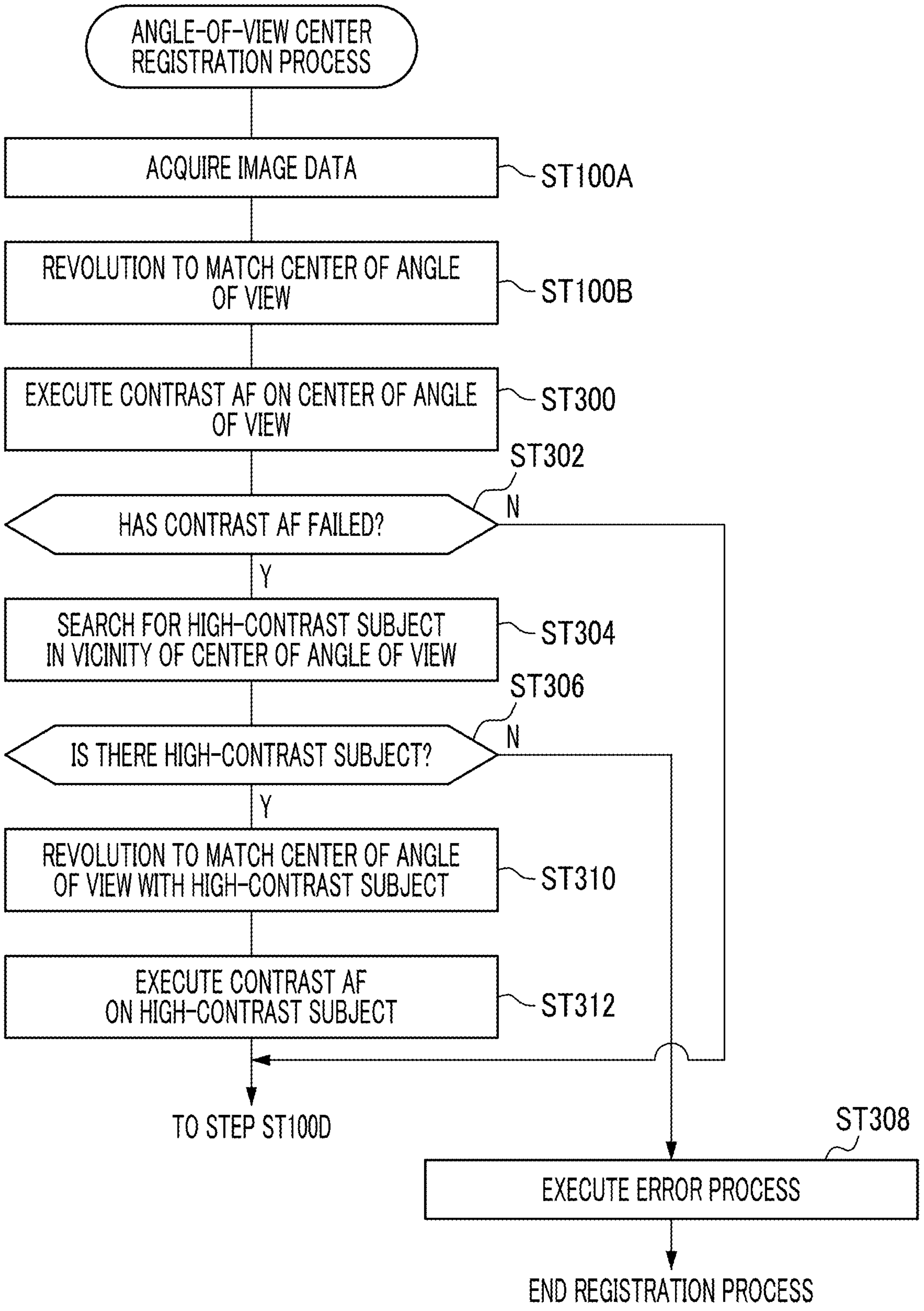
FIG. 26 is a flowchart showing a second modification example of the flow of the angle-of-view center registration process.

In this case, for example, the angle-of-view center registration process shown in FIG. 26 is executed by the CPU 116. The flowchart shown in FIG. 26 is different from the flowchart shown in FIG. 20 in that step ST300 to step ST312 are provided instead of step ST100C. Therefore, here, steps different from the flowchart shown in FIG. 20 will be described.

In step ST300 shown in FIG. 26, the angle-of-view center registration unit 116A1 executes contrast AF on the center of the angle of view of the telephoto camera. Here, the contrast AF is a process of performing focusing such that the contrast at a specific location in the image obtained by imaging (here, a location corresponding to the center of the angle of view of the telephoto camera in the telephoto camera image) is highest.

In step ST302, the angle-of-view center registration unit 116A1 determines whether or not the contrast AF executed in step ST300 has failed. The failure of the contrast AF means that, for example, an event in which, since a high-frequency component equal to or more than a predetermined value cannot be detected from the specific location in the image obtained by imaging (here, a location corresponding to the center of the angle of view of the telephoto camera in the telephoto camera image), focusing cannot be performed.

In step ST302, in a case in which the contrast AF has not failed, a negative determination is made, and the angle-of-view center registration process proceeds to step ST100D. In a case in which the contrast AF has failed in step ST302, a positive determination is made, and the angle-of-view center registration process proceeds to step ST304.

In step ST304, the angle-of-view center registration unit 116A1 searches for the high-contrast subject in the vicinity of the center of the angle of view of the telephoto camera by analyzing the telephoto camera image data acquired in step ST100A. Here, the high-contrast subject in the vicinity of the center of the angle of view of the telephoto camera refers to, for example, the high-contrast subject closest to the center of the angle of view of the telephoto camera. Here, the high-contrast subject refers to a subject having a degree of contrast that can be used for the contrast AF.

In step ST306, the angle-of-view center registration unit 116A1 determines whether or not the high-contrast subject is present in the vicinity of the center of the angle of view of the telephoto camera. In step ST306, in a case in which the high-contrast subject is not present in the vicinity of the center of the angle of view of the telephoto camera, a negative determination is made, and the angle-of-view center registration process proceeds to step ST308. In step ST306, in a case in which the high-contrast subject is present in the vicinity of the center of the angle of view of the telephoto camera, a positive determination is made, and the angle-of-view center registration process proceeds to step ST310.

In step ST308, the angle-of-view center registration unit 116A1 executes an error process, and then the registration process ends. Here, the error process refers to, for example, a process of displaying a message, such as "auto focus has failed", "Registration has failed", and/or "Please change the subject to be positioned at the center of the angle of view", on the display 26, or outputting the same message by voice from a speaker (not shown).

In step ST310, the angle-of-view center registration unit 116A1 revolves the telephoto camera 12 such that the center of the angle of view of the telephoto camera is matched with the high-contrast subject searched for by executing the process of step ST304.

In step ST312, the angle-of-view center registration unit 116A1 executes the contrast AF to focus on the high-contrast subject positioned at the center of the angle of view of the telephoto camera.

In this way, by executing the angle-of-view center registration process shown in FIG. 26, the contrast AF can be successful even in a case in which the high-contrast subject is not present at the center of the angle of view of the telephoto camera. In a case in which the contrast AF is successful, since the angle-of-view center registration unit 116A1 can acquire the in-focus position from the telephoto camera 12, it is also possible to derive the first subject distance based on the in-focus position.

Therefore, with the present configuration, even in a case in which the high-contrast subject is not present at the center of the angle of view of the telephoto camera, the first subject distance can be derived with higher accuracy than in a case in which the center of the angle of view of the telephoto camera is matched with the high-contrast subject positioned spaced from the vicinity of the center of the angle of view of the telephoto camera and then the AF function is used to derive the subject distance.

Here, the form example is described in which the telephoto camera 12 is revolved and then the contrast AF is executed again, but the technology of the present disclosure is not limited to this, and, for example, in a case in which the contrast AF is executed on the closest side, the contrast AF may be executed again while zooming out to the wide angle side to an in-focus range.

In addition, here, the modification example is described in which processes of step ST300 to step ST312 (see FIG. 26) are applied to the angle-of-view center registration process shown in FIG. 20, but the technology of the present disclosure is not limited to this, and processes corresponding to the processes of step ST300 to step ST312 may be applied to the end part registration process. In this case, it is possible to contribute to the derivation of the second subject distance with high accuracy.

In the angle-of-view center registration process shown in FIG. 26, the form example is described in which the registration between the center of the angle of view of the telephoto camera and the center of the angle of view of the wide angle camera is performed regardless of the focal length of the imaging optical system 38 of the telephoto camera 12, but the technology of the present disclosure is not limited to this. For example, the angle-of-view center registration unit 116A1 may cause the telephoto camera 12 to perform focusing in a state in which the focal length of the imaging optical system 38 of the telephoto camera 12 is longest, to derive the first subject distance based on a result of the focusing (for example, the in-focus position).

Figure 27:
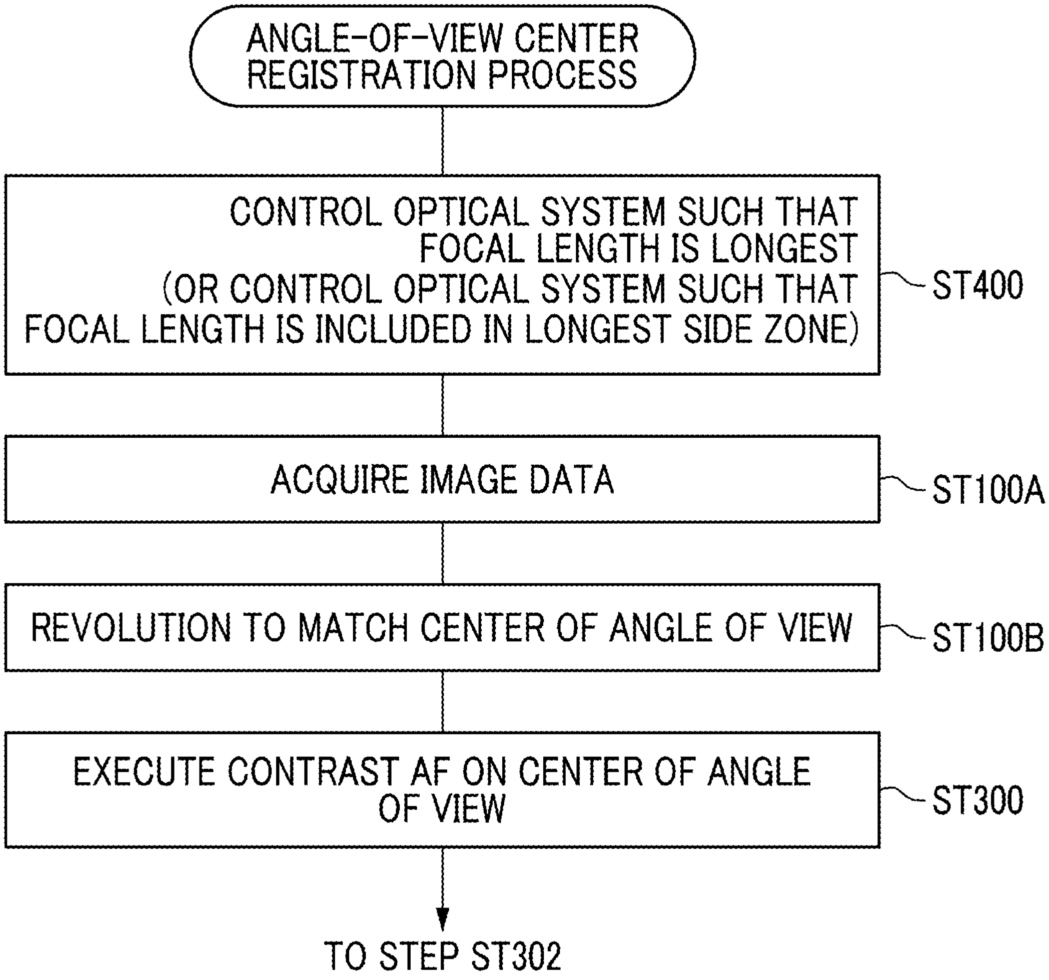
FIG. 27 is a flowchart showing a third modification example of the flow of the angle-of-view center registration process.

In this case, for example, instead of the angle-of-view center registration process shown in FIG. 26, the angle-of-view center registration process shown in FIG. 27 is executed by the CPU 116. Since the flowchart shown in FIG. 27 is different from the flowchart shown in FIG. 26 in that step ST400 is provided, here, a step different from the flowchart shown in FIG. 26 will be described.

In step ST400 shown in FIG. 27, the angle-of-view center registration unit 116A1 controls the imaging optical system 38 of the telephoto camera 12 (specifically, for example, the zoom lens 44) such that the focal length of the imaging optical system 38 of the telephoto camera 12 is longest. As a result, the angle-of-view center registration unit 116A1 can cause the telephoto camera 12 to perform focusing in a state in which a depth of field is shallower than in a state in which the focal length of the imaging optical system 38 of the telephoto camera 12 is shortest. In addition, in a case in which the subject distance to the subject which is a registration target is shorter than the shortest subject distance at a telephoto end, focusing may be performed while gradually changing the focal length toward the wide angle side. Therefore, with the present configuration, the derivation of the first subject distance based on the result of the focusing can be performed with higher accuracy than in a case in which the telephoto camera 12 is caused to perform focusing in a state in which the focal length of the imaging optical system 38 of the telephoto camera 12 is shortest. It should be noted that the technology of the present disclosure is not limited to this, and a process corresponding to the process of step ST400 may be applied to the end part registration process. In this case, it is possible to contribute to the derivation of the second subject distance with high accuracy.

In the above description, the form example is described in which the imaging optical system 38 of the telephoto camera 12 is controlled such that the focal length of the imaging optical system 38 of the telephoto camera 12 is longest, but the technology of the present disclosure is not limited to this. For example, as shown in step ST400 of FIG. 27, the angle-of-view center registration unit 116A1 may control the imaging optical system 38 of the telephoto camera 12 (specifically, for example, the zoom lens 44) such that the focal length of the imaging optical system 38 of the telephoto camera 12 is included in a longest side zone among a plurality of zones in which the focal length of the imaging optical system 38 of the telephoto camera 12 is divided and defined in a stepwise manner. In this case as well, the derivation of the first subject distance based on the result of the focusing can be performed with higher accuracy than in a case in which the telephoto camera 12 is caused to perform focusing in a state in which the focal length of the imaging optical system 38 of the telephoto camera 12 is shortest.

It should be noted that the technology of the present disclosure is not limited to this, and a process corresponding to the process of step ST400 (process of controlling the imaging optical system 38 of the telephoto camera 12 such that the focal length of the imaging optical system 38 of the telephoto camera 12 is included in the longest side zone) may be applied to the end part registration process. In this case, it is possible to contribute to the derivation of the second subject distance with high accuracy.

In the embodiment described above, the deviation amount in the horizontal direction and the deviation amount in the depth direction are described as the predetermined values stored in the predetermined value storage region 118A, but the technology of the present disclosure is not limited to this, and information related to a height difference (for example, the height difference itself) between the telephoto camera 12 and the wide angle camera 14 may be applied as the predetermined value.

Figure 28:
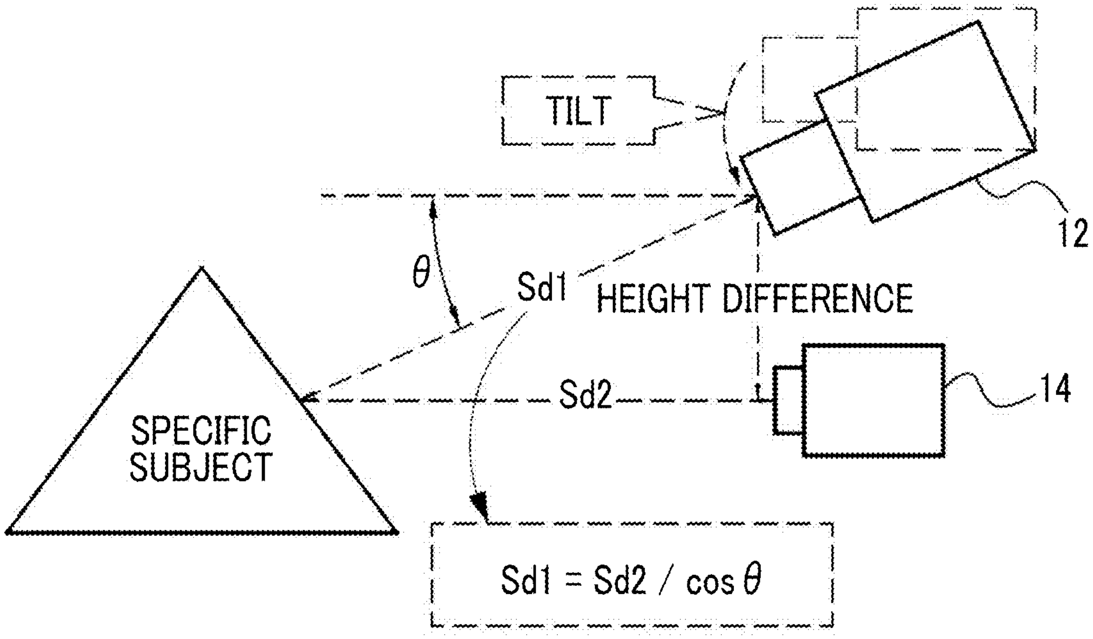
FIG. 28 is a conceptual diagram showing an example of a method in which registration is performed in consideration of a height difference between the telephoto camera and the wide angle camera.

For example, as shown in FIG. 28, in a case in which the registration process for the pan direction (horizontal angle of view) of the telephoto camera 12 is performed in a situation in which there is the height difference between the telephoto camera 12 and the wide angle camera 14, in a case in which a tilt angle in a case in which the telephoto camera 12 is tilted such that the center of the angle of view of the telephoto camera is matched with the specific subject is "0", a distance to the specific subject from the telephoto camera 12 is "Sd1", and a distance to the specific subject from the wide angle camera 14 is "Sd2", the registration unit 116A derives "Sd1" in accordance with "Sd1=Sd2/cos θ", and uses the derived "Sd1" to perform the registration process for the pan direction (horizontal angle of view) of the telephoto camera 12. In this way, by performing the registration process for the pan direction (horizontal angle of view) of the telephoto camera 12 in consideration of the height difference between the telephoto camera 12 and the wide angle camera 14, even in a case in which there is the height difference between the telephoto camera 12 and the wide angle camera 14, the information related to the angle of view required in a case in which the telephoto camera 12 and the wide angle camera 14 are used in cooperation with each other can be obtained.

It should be noted that, in the technology of the present disclosure, the registration process in consideration of the height difference between the telephoto camera 12 and the wide angle camera 14 is not always needed, and the registration process may be executed while ignoring the height difference between the telephoto camera 12 and the wide angle camera 14.

In the embodiment described above, the form example is described in which one end of the angle of view of the telephoto camera is matched with one end of the angle of view of the wide angle camera by executing the end part registration process by the CPU 116, but the technology of the present disclosure is limited to this. For example, one end part of the angle of view of the telephoto camera may be matched with one end part of the angle of view of the wide angle camera.

Figure 29:
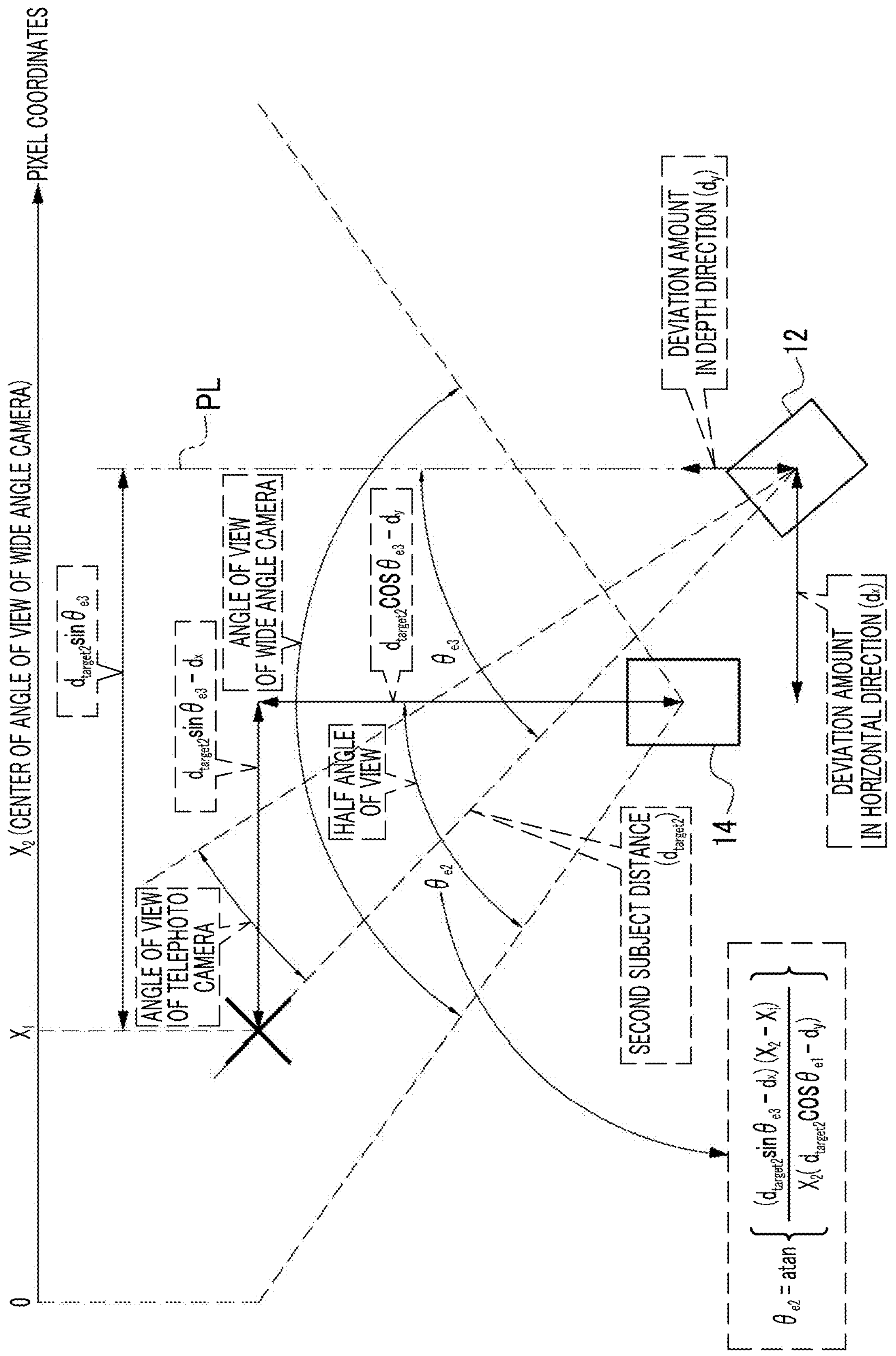
FIG. 29 is a conceptual diagram provided for describing a modification example of the calculation method of the half angle of view.

Here, the one end part of the angle of view refers to a location other than the center of the angle of view. In this case, for example, as shown in FIG. 29, the half angle of view of the wide angle camera 14 is calculated by using coordinates (hereinafter, also referred to as "pixel coordinates") for specifying a position of a pixel in a pixel row in a direction corresponding to the pan direction of the telephoto camera 12 among pixel groups included in the image sensor 70 of the wide angle camera 14. Specifically, in a case in which the half angle of view of the wide angle camera 14 is "0.2", a distance (second subject distance) to the specific subject positioned in the location other than the center of the angle of view is "$d_{target2}$", the revolution angle from the home position of the telephoto camera 12 is "023", the pixel coordinates corresponding to one end of the angle of view of the wide angle camera is "0 (origin)", the pixel coordinates corresponding to the position of the specific subject in the real space is "$x_1$", the pixel coordinates corresponding to the center of the angle of view of the wide angle camera is "$x_2$", the deviation amount in the horizontal direction is "$d_x$" and the deviation amount in the depth direction is "$d_y$", the end part registration unit 116A2 calculates the half angle of view $\theta_{e2}$ in accordance with Expression (3).

$$\theta_{e2} = a\tan\left\{\frac{(d_{target2}\sin\theta_{e3} - d_x)(x_2 - x_1)}{x_2(d_{target2}\cos\theta_{e3} - d_y)}\right\} \tag{3}$$

In this way, the location in which the registration between the telephoto camera image and the wide angle camera image is performed is not limited to the center of the angle of view and the end of the angle of view, may be the location other than the center of the angle of view of the wide angle camera, and the half angle of view of the wide angle camera 14 can be obtained as long as the registration between the telephoto camera image and the wide angle camera image is performed in at least two locations of one location other than the center of the angle of view of the wide angle camera and another location other than the one location of the angle of view of the wide angle camera.

In the embodiment described above, the form example is described in which the first subject distance and the second subject distance are calculated by the CPU 116 based on the in-focus position, but the technology of the present disclosure is not limited to this. For example, any of the first subject distance or the second subject distance may be received by the reception device 24 or the like, or may be obtained by a distance measurement device performing the distance measurement using a phase difference AF method or a TOF method.

In the embodiment described above, the pan is described as the "revolution", but the technology of the present disclosure is not limited to this, and the technology of the present disclosure can be applied to the tilt. In this case, even for the angle of view (vertical angle of view) in the tilt direction, the process corresponding to the registration process described in the embodiment need only be executed by the CPU 116.

In the embodiment described above, the form example is described in which the registration process is executed by the CPU 116 regardless of the change in the scale ratio between the wide angle camera image and the telephoto camera image, but the registration process may be executed by the CPU 116 in consideration of the change in the scale ratio. In this case, for example, in a case in which the optical information related to the wide angle camera 14 (for example, specifications of the image sensor 70 and the focal length) is known, the CPU 116 may utilize the optical information related to the wide angle camera 14 to limit the change in the scale ration to some extent.

In the embodiment described above, one end of the angle of view of the telephoto camera is matched with one end of the angle of view of the wide angle camera in a case in which the end part registration process is performed, but the technology of the present disclosure is not limited to this, and the center of the angle of view of the telephoto camera may be matched with one end of the angle of view of the wide angle camera in a case in which the end part registration process is performed. In this case, the image analysis (for example, matching) for the registration need only be performed by using half of the wide angle camera image and half of the telephoto camera image.

In addition, in step ST102H1 shown in FIG. 22A, the opposite side end part of the angle of view of the telephoto camera is matched with the opposite side end part of the angle of view of the wide angle camera, but the technology of the present disclosure is not limited to this, and the center of the angle of view of the telephoto camera may be matched with the opposite side end part of the angle of view of the wide angle camera in step ST102H1 shown in FIG. 22A. In this case as well, the same effect as that of the example shown in FIG. 22A can be obtained.

In the embodiment described above, the form example is described in which the registration process is executed by the computer 104 of the management device 20, but the technology of the present disclosure is not limited to this, and the registration process may be executed by the control device 60 of the telephoto camera 12, may be executed by the control device 94 of the wide angle camera 14, or may be distributed and executed by at least two of the computer 104 of the management device 20, the control device 60 of the telephoto camera 12, or the control device 94 of the wide angle camera 14.

In addition, the registration process may be executed by a device including an ASIC, an FPGA, and/or a PLD instead of the computer 104, and the registration process may be realized by a combination of a hardware configuration and a software configuration.

Figure 30:
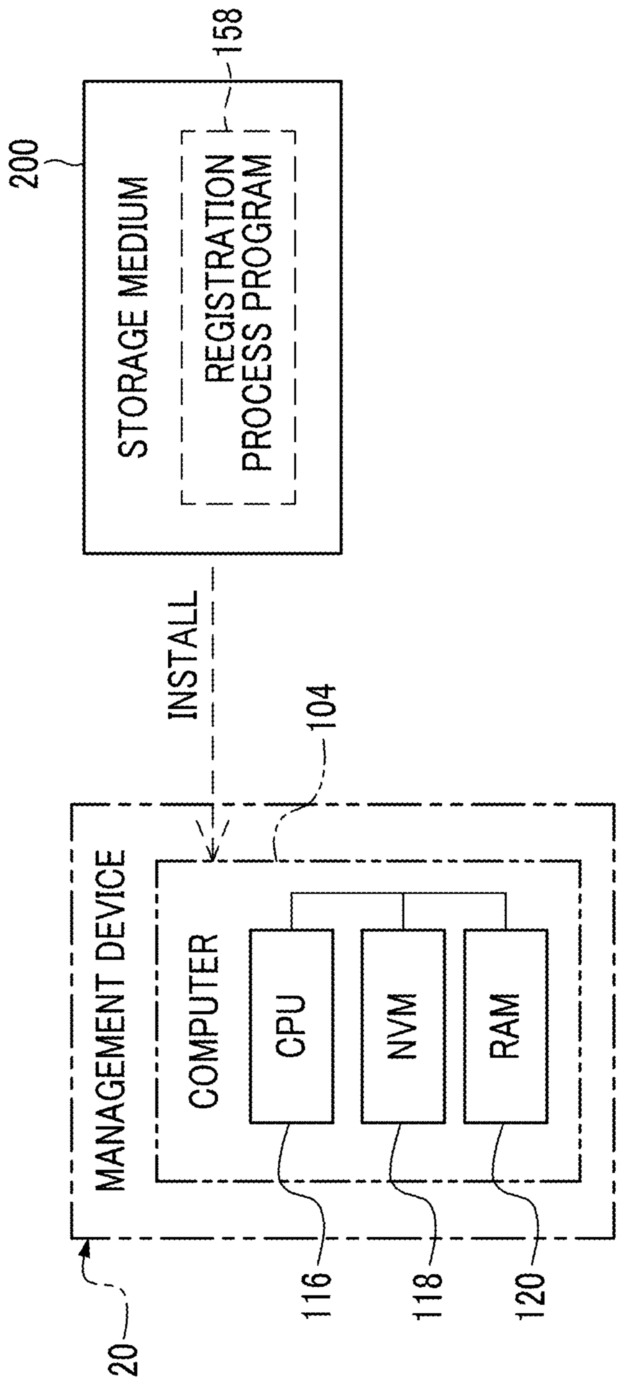
FIG. 30 is a conceptual diagram showing an example of an aspect in which the registration process program is installed in a computer of the management device from a storage medium in which the registration process program is stored.

In addition, in the embodiment described above, the registration process program 158 is stored in the NVM 118 (see FIG. 5), but the technology of the present disclosure is not limited to this, and as shown in FIG. 30 as an example, the registration process program 158 may be stored in any portable type storage medium 200 which is a non-transitory storage medium, such as an SSD or a USB memory. In this case, the registration process program 158 stored in the storage medium 200 is installed in the computer 104, and the CPU 116 executes the registration process described above in accordance with the registration process program 158.

In addition, the registration process program 158 may be stored in a storage device of another computer or server device connected to the computer 104 via a communication network (not shown), and the registration process program 158 may be downloaded and installed on the computer 104 in response to a request of the management device 20. In this case, the registration process is executed by the computer 104 in accordance with the installed registration process program 158.

The following various processors can be used as a hardware resource for executing the registration process described above. Examples of the processor include a CPU which is a general-purpose processor functioning as the hardware resource for executing the registration process by executing software, that is, the registration process program 158. In addition, examples of the processor include a dedicated electric circuit which is a processor having a circuit configuration specially designed for executing a specific process, such as an FPGA, a PLD, or an ASIC. A memory is built in or connected to any processor, and any processor executes the registration process by using the memory.

The hardware resource for executing the registration process may be composed of one of the various processors or may be composed of a combination of two or more processors that are the same type or different types (for example, combination of a plurality of FPGAs or combination of a CPU and an FPGA). In addition, the hardware resource for executing the registration process may be one processor.

As an example in which the hardware resource is configured by one processor, first, there is a form in which one processor is configured by a combination of one or more CPUs and software, and the processor functions as the hardware resource for executing the registration process, as represented by a computer, such as a client and a server. Secondly, as represented by SoC, there is a form in which a processor that realizes the functions of the entire system including a plurality of hardware resources for executing the registration process with one IC chip is used. As described above, the registration process is realized by using one or more of the various processors described above as the hardware resource.

Further, as the hardware structure of these various processors, more specifically, it is possible to use an electric circuit in which circuit elements, such as semiconductor elements, are combined.

In addition, the registration process described above is merely an example. Therefore, it is needless to say that the deletion of an unneeded step, the addition of a new step, and the change of a process order may be employed within a range not departing from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the description contents and shown contents above within a range that does not deviate from the gist of the technology of the present disclosure. In addition, in order to avoid complications and facilitate understanding of the parts according to the technology of the present disclosure, the description of common technical knowledge or the like, which does not particularly require the description for enabling the implementation of the technology of the present disclosure, is omitted in the described contents and the shown contents above.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be incorporated by reference.

What is claimed is:

1. An imaging system comprising:

a processor;

a first imaging apparatus including a first optical system; and a second imaging apparatus including a second optical system, wherein a focal length of the first optical system is longer than a focal length of the second optical system, and wherein the processor is configured to perform registration between a first captured image obtained by imaging with the first imaging apparatus and a second captured image obtained by imaging with the second imaging apparatus, acquire information that is related to a registration result, and output the first captured image, the second captured image, and the information to a display, wherein the processor is configured to acquire angle-of-view related information that is related to the angle of view based on the registration result, and acquire the angle-of-view related information based on an end part registration result obtained by performing registration between a first end part of an angle of view of the first imaging apparatus or a center of the angle of view of the first imaging apparatus and a second end part of an angle of view of the second imaging apparatus, wherein the first end part of the angle of view of the first imaging apparatus is closer to the second end part of the angle of view of the second imaging apparatus than to any other end part of the angle of view of the second imaging apparatus.

2. The imaging system according to claim 1, wherein the information is angle-of-view related information that is acquired based on the registration result and used for imaging with the imaging system.

3. The imaging system according to claim 2, wherein the angle-of-view related information includes a first angle of view that is an angle of view of the first imaging apparatus, a second angle of view that is an angle of view of the second imaging apparatus, and difference information indicating a difference between the first angle of view and the second angle of view.

4. The imaging system according to claim 1, wherein the processor superimposes and displays a mark in a region corresponding to the first captured image in the second captured image.

5. The imaging system according to claim 1, wherein the processor acquires the angle-of-view related information based on an angle-of-view center registration result obtained by performing registration between the center of the angle of view of the first imaging apparatus and a center of the angle of view of the second imaging apparatus.

6. The imaging system according to claim 5, wherein the processor derives the angle-of-view center registration result and the end part registration result based on position specification information for specifying a positional relationship between the first imaging apparatus and the second imaging apparatus.

7. The imaging system according to claim 6, wherein the position specification information is information including a deviation amount between the first imaging apparatus and the second imaging apparatus.

8. The imaging system according to claim 6, wherein the position specification information includes information related to a height difference between the first imaging apparatus and the second imaging apparatus.

9. The imaging system according to claim 6, wherein the processor performs an angle-of-view center registration process of performing the registration between the center of the angle of view of the first imaging apparatus and the center of the angle of view of the second imaging apparatus by using the position specification information in a case in which a first subject distance is less than a first threshold value, and performs an end part registration process of performing the registration between the first end part or the center of the angle of view of the first imaging apparatus and the second end part by using the position specification information in a case in which a second subject distance is less than a second threshold value.

10. The imaging system according to claim 9, wherein the processor derives at least one of the first subject distance or the second subject distance.

11. The imaging system according to claim 10, wherein the first imaging apparatus has an auto focus function, and is installed on a revolution table to allow revolution, and the processor derives, in a case in which at least one subject distance of the first subject distance or the second subject distance is derived, the subject distance by using the auto focus function, and matches the center of the angle of view of the first imaging apparatus with a subject having high contrast in a vicinity of the center of the angle of view of the first imaging apparatus and then derives the subject distance by using the auto focus function by controlling the revolution table based on the first captured image in a case in which the derivation of the subject distance using the auto focus function has failed.

12. The imaging system according to claim 10, wherein the processor causes the first imaging apparatus to perform focusing in a state in which the focal length of the first optical system is included in a longest side zone among a plurality of zones in which the focal length of the first optical system is divided and defined in a stepwise manner, and derives at least one of the first subject distance or the second subject distance based on a result of the focusing.

13. The imaging system according to claim 12, wherein the processor causes the first imaging apparatus to perform focusing in a state in which the focal length of the first optical system is longest, and derives at least one of the first subject distance or the second subject distance based on a result of the focusing.

14. The imaging system according to claim 9, wherein the processor performs the angle-of-view center registration process and then performs the end part registration process.

15. The imaging system according to claim 9, wherein the processor performs at least one of the angle-of-view center registration process or the end part registration process by using an image analysis based on the first captured image and the second captured image.

16. The imaging system according to claim 15, wherein, in the end part registration process, the processor performs the registration between the first end part or the center of the angle of view of the first imaging apparatus and the second end part based on a scale ratio between the first captured image and the second captured image used in the image analysis in the angle-of-view center registration process.

17. The imaging system according to claim 9, wherein the processor further performs an opposite side end part registration process of performing registration between a first opposite side end part positioned on an opposite side to the first end part among both end parts of the angle of view of the first imaging apparatus or the center of the angle of view of the first imaging apparatus and a second opposite side end part positioned on an opposite side to the second end part among both end parts of the angle of view of the second imaging apparatus, and acquires the angle of view of the second imaging apparatus as the angle-of-view related information based on at least one of a first result obtained by matching a position of the first end part or the center of the angle of view of the first imaging apparatus with a position of the second end part in the end part registration process or a second result obtained by matching a position of the first opposite side end part or the center of the angle of view of the first imaging apparatus with a position of the second opposite side end part in the opposite side end part registration process.

18. The imaging system according to claim 17, wherein, under a condition that a third subject distance is equal to or more than a third threshold value, in a case in which the position of the first opposite side end part or the center of the angle of view of the first imaging apparatus is matched with the position of the second opposite side end part, the processor acquires the angle of view of the second imaging apparatus as the angle-of-view related information based on the second result.

19. The imaging system according to claim 1, wherein optical information related to the first optical system is known, and optical information related to the second optical system is unknown.

20. The imaging system according to claim 1, wherein the focal length of the first optical system is at least twice the focal length of the second optical system.

21. An imaging system comprising:

a processor; and a first imaging apparatus that is used together with a second imaging apparatus including a second optical system and includes a first optical system, wherein a focal length of the first optical system is longer than a focal length of the second optical system, and wherein the processor is configured to perform registration between a first captured image obtained by imaging with the first imaging apparatus and a second captured image obtained by imaging with the second imaging apparatus, acquire information that is related to a registration result, and output the first captured image, the second captured image, and the information to a display, wherein the processor is configured to acquire angle-of-view related information that is related to the angle of view based on the registration result, and acquire the angle-of-view related information based on an end part registration result obtained by performing registration between a first end part of an angle of view of the first imaging apparatus or a center of the angle of view of the first imaging apparatus and a second end part of an angle of view of the second imaging apparatus, wherein the first end part of the angle of view of the first imaging apparatus is closer to the second end part of the angle of view of the second imaging apparatus than to any other end part of the angle of view of the second imaging apparatus.

22. An operation method of an imaging system including a processor, a first imaging apparatus including a first optical system, and a second imaging apparatus including a second optical system, in which a focal length of the first optical system is longer than a focal length of the second optical system, the method comprising:

performing registration between a first captured image obtained by imaging with the first imaging apparatus and a second captured image obtained by imaging with the second imaging apparatus;

acquiring angle-of-view related information that is related to the angle of view based on a registration result, and acquiring the angle-of-view related information based on an end part registration result obtained by performing registration between a first end part of an angle of view of the first imaging apparatus or a center of the angle of view of the first imaging apparatus and a second end part of an angle of view of the second imaging apparatus, wherein the first end part of the angle of view of the first imaging apparatus is closer to the second end part of the angle of view of the second imaging apparatus than to any other end part of the angle of view of the second imaging apparatus; and outputting the first captured image, the second captured image, and the angle-of-view related information to a display.

23. A non-transitory computer-readable storage medium storing a program executable by a computer that is applied to an imaging system including a processor, a first imaging apparatus including a first optical system, and a second imaging apparatus including a second optical system, in which a focal length of the first optical system is longer than a focal length of the second optical system, to perform a process comprising:

performing registration between a first captured image obtained by imaging with the first imaging apparatus and a second captured image obtained by imaging with the second imaging apparatus;

acquiring angle-of-view related information that is related to the angle of view based on a registration result, and acquiring the angle-of-view related information based on an end part registration result obtained by performing registration between a first end part of an angle of view of the first imaging apparatus or a center of the angle of view of the first imaging apparatus and a second end part of an angle of view of the second imaging apparatus, wherein the first end part of the angle of view of the first imaging apparatus is closer to the second end part of the angle of view of the second imaging apparatus than to any other end part of the angle of view of the second imaging apparatus; and outputting the first captured image, the second captured image, and the angle-of-view related information to a display.

* * * * *